(12) United States Patent
Yamada et al.

(10) Patent No.: US 7,359,441 B2
(45) Date of Patent: Apr. 15, 2008

(54) PACKET DATA PROCESSING DETERMINATION APPARATUS

(75) Inventors: Mikihiko Yamada, Ibaraki (JP); Shouichi Gotoh, Ibaraki (JP); Norihiko Mizobata, Habikino (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 886 days.

(21) Appl. No.: 10/467,448

(22) PCT Filed: Mar. 27, 2002

(86) PCT No.: PCT/JP02/02953

§ 371 (c)(1),
(2), (4) Date: Aug. 7, 2003

(87) PCT Pub. No.: WO02/082721

PCT Pub. Date: Oct. 17, 2002

(65) Prior Publication Data

US 2004/0081148 A1   Apr. 29, 2004

(30) Foreign Application Priority Data

Mar. 30, 2001   (JP) ............................... 2001-099730

(51) Int. Cl.
*H04N 7/18* (2006.01)
(52) U.S. Cl. .............................. 375/240.25; 375/240.26

(58) Field of Classification Search ..............................
375/240.25–240.29
See application file for complete search history.

(56) References Cited

U.S. PATENT DOCUMENTS

| | | | |
|---|---|---|---|
| 5,675,654 A * | 10/1997 | Ryan | ........................... 380/227 |
| 5,844,478 A | 12/1998 | Blatter et al. | |
| 5,966,385 A | 10/1999 | Fujii et al. | |
| 6,078,594 A * | 6/2000 | Anderson et al. | ........... 370/498 |
| 6,088,357 A | 7/2000 | Anderson et al. | |
| 6,201,815 B1 | 3/2001 | Nomura | |

FOREIGN PATENT DOCUMENTS

| | | |
|---|---|---|
| EP | 0 785 675 A2 | 7/1997 |
| EP | 0 840 518 A2 | 5/1998 |

\* cited by examiner

*Primary Examiner*—Anand Rao
(74) *Attorney, Agent, or Firm*—Wenderoth, Lind & Ponack, L.L.P.

(57) ABSTRACT

In a packet data processing determination apparatus (DBA1) for respectively and sequentially determining a plurality of packet data (P) composing an inputted transport stream (TS), a packet data storage section (270) stores the packet data (P) for a predetermined time period in the order in which they came. A stored packet data identifying section (270, 260) reads identification information (PIDe) from the stored packet data (P). A target packet data determining section (400) compares the read identification information (PIDe) with predetermined process information (PIDd) to determine whether the packet data (P) is to be processed.

30 Claims, 33 Drawing Sheets

Fig. 36 - PRIOR ART
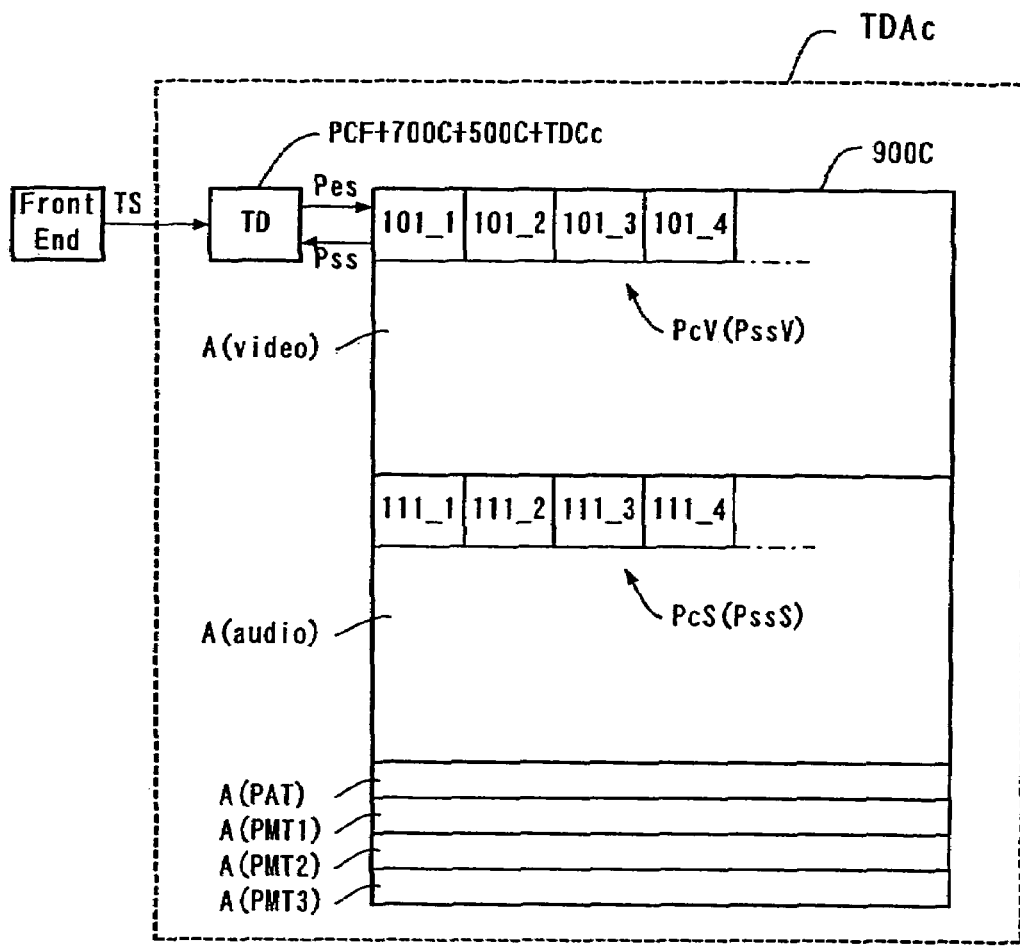
Fig. 37 - PRIOR ART
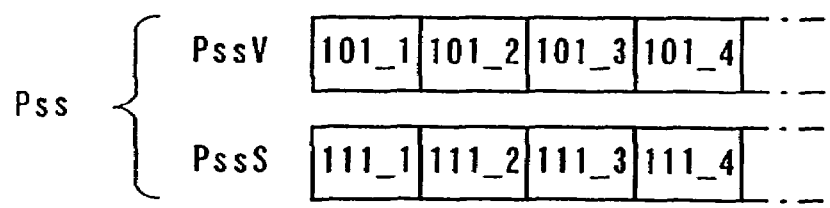

PACKET DATA PROCESSING DETERMINATION APPARATUS

CROSS-REFERENCE TO RELATED APPLICATIONS

This application is the National Stage of International Application No. PCT/JP02/02953, filed on Mar. 27, 2002.

BACKGROUND OF THE INVENTION

1. Field of the Invention

The present invention relates to a packet data access control apparatus supplied with a transport stream composed of a plurality pieces of packet data, the apparatuses for determining, on a real-time basis, whether each packet data is the subject of a predetermined process (target data) and, when the data is the target data, enabling the predetermined process. More specifically, the packet data access control apparatus is incorporated in a transport stream decoder for enabling various applications to perform their respective processes on each packet data.

2. Description of the Related Art

Processing and editing digital contents for subsidiary use have been possible only by contents creators or distributors such as broadcast stations. With advances in recent digital technology, however, the situation has gradually changed. In recent years, digital distribution systems have been progressing in quality and quantity, thereby bringing significant progress in transport stream for distributing digital contents, improvement in performance of hardware required for user's operation, and reduction in cost for the operation. As a result, processing that used to be available only to broadcast stations, etc., such as editing a transport stream and packet data composing the transport stream, gradually has become available to users.

To enable the user to carry out a desired process on each digital content, what is required is a means capable of selecting, on a real-time basis, packet data composing a sequentially-supplied transport stream, and allowing access from processing means for carrying out the specific process on the selected packet data.

Example means and apparatus capable of identifying and selectively extracting respective packet data composing a transport stream are illustrated in FIG. 34. A transport stream decoder shown in this drawing extracts only a packet data group composing a specific program from a single transport stream composed of packet data strings forming a plurality of programs, and outputs the extracted packet data group to an AV decoder. In other words, as described later, the transport stream decoder is provided with a means for selectively extracting specific packet data from a plurality of packet data composing a single transport stream.

The transport stream decoder TDAc includes a stream input unit 500 for receiving a transport stream TS supplied from a transport stream source externally provided (not shown), a program packet filter PCF, a main memory controller 700C, main memory 900C, and a TD controller TDCc for controlling the entire operation of the transport stream decoder TDAc.

Prior to description of these components, described is the single transport stream TS supplied to the transport stream decoder TDAc with reference to FIG. 7. The transport stream TS is composed of a plurality of packet data P each represented by a rectangle in FIG. 7. Each packet data is provided with a unique packet identifier (Packet ID) PID for identification.

These packet data P are grouped into three types: program content packet data (herein after referred to as PC packet data) Pc, which is a component of $\alpha$ ($\alpha$ is an integer not less than 2) types of program contents; a program map table PMT containing the packet identifiers PID of the plurality of PC packet data Pc for the respective programs to manage PC packet data Pc; and a program association table PAT containing the packet identifiers PID of the program map tables PMT for the respective programs to manage the program contents.

The program map table PMT and the program association table PAT containing information for managing the PC packet data Pc are collectively called management packet data PcA. Illustrated in FIG. 7 is an example structure of the transport stream TS when at least three different programs 1, 2, and 3 are provided ($\alpha \geq 3$).

PC packet data Pc101_1, Pc101_2, . . . are video data for the program 1, and PC packet data Pc111_1, Pc111_2, . . . are audio data for the program 1. Similarly, PC packet data Pc201_1, Pc201_2, . . . are video data for the program 2, and PC packet data Pc211_1, Pc211_2, . . . are audio data for the program 2.

Furthermore, PC packet data Pc301_1, Pc301_2, . . . are video data for the program 3, and PC packet data Pc311_1, Pc311_2, . . . are audio data for the program 3. The PC packet data containing video data is generally called program content video packet data (herein after, video packet data) PcV, and the PC packet data containing audio data is generally called program content audio packet data (herein after, audio packet data) PcS.

The number of distributed programs ($\alpha$) is not restricted to three. The transport stream TS includes PC packet data Pc as many as required corresponding to the number of distributed programs. Furthermore, the PC packet data Pc may contain information other than audio (teletext information, for example) depending on the program.

More specifically, the transport stream TS is structured so that the program association table PAT and the program map tables PMT are arranged among the PC packet data Pc at frequencies determined by the transmission path and processing factors. In FIG. 7, program map tables PMT1, PMT2, and PMT3 and the program association table PAT are arranged preceding the plurality of PC packet data Pc101_1, Pc111_1, Pc201_1, Pc211_1, Pc_301, and Pc311_1 composing the three types of programs 1, 2, and 3. The program map tables PMT1, PMT2, and PMT 3 respectively describe the packet identifiers PID of the PC packet data Pc for the respective programs. The program association table PAT indicates a correspondence among the packet identifiers PID of these program map tables PMTs.

Note that, in Specification, the same components or signals are provided with a common reference character or numeral for identification. To identify the respective components or signals, the reference character or numeral is further provided with a numerical or alphabetical suffix. More specifically, the PC packet data Pc101 is a common name for PC packet data Pc101_1, Pc101_2, . . . , Pc101_$\beta$ ($\beta$ is an arbitrary natural number). The same goes for the PC packet data Pc111, Pc201, Pc211, Pc301, and Pc401.

The program association table PAT describes the packet identifiers PID of the program map tables PMT for all programs included in the transport stream TS. That is, the packet identifier PID of the program map table PMT for the program 1 is 100, the one for the program 2 is 200, the one for the program 3 is 300, and the one for the program $\alpha$ is $\alpha$00.

Furthermore, preceding PC packet data Pc101_2, Pc111_2, Pc201_2, Pc211_2, Pc301_2, and Pc311_2, management packet data PcA composed of the program map tables PMT1, PMT2, PMT3 and program association table PAT is arranged. Note that, when the transport stream TS includes four or more programs ($\alpha \geq 4$) although not shown, the management packet data PcA further contains program map tables PMT4 to PMT$\alpha$, and the transport stream TS further contains PC packet data Pc corresponding to these programs.

How frequently the management packet data PcA appears greatly varies depending upon the type of the packet data P contained in the transport stream TS. Moreover, the management packet data PcA does not have to be placed as the head of a collection of the packet data P as typically illustrated in FIG. 7. In some cases, the program association table PAT and the program map tables PMT composing the management packet data and the PC packet data Pc may have some other packet data P inserted thereamong.

Referring back to FIG. 34, described is the components of the transport stream decoder TDAc. The stream input unit 500C temporarily holds, in an input buffer incorporated therein, the transport stream TS supplied from an external transport stream source (not shown), and transfers the transport stream TS to the program packet filter PCF by a transfer unit TSd.

The program packet filter PCF includes at least three packet filters: a packet filter 1100_00 for selectively outputting only the management packet data PcA; a packet filter 1100_01 for selectively outputting only the video packet data PcV of a specific program; and a packet filter 1100_02 for selectively outputting only the audio packet data PcS of the specific program. These packet filters output data based on the packet identifiers PID provided to the respective PC packet data Pc transferred by the transfer unit TSd from the stream input unit 500C. Note herein that the management packet data PcA and the PC packet data Pc (PcV, PcS) composing a specific program that are extracted from the entire packet data P contained in the incoming transport stream TS are collectively referred to as a single program packet data string Pes.

As stated above, when three types of packet filters included in the program packet filter PCF have to be respectively identified for extracting the management packet data PcA, the video packet data PcV, and the audio packet data PcS, they are denoted as the management packet filter 1100_00, the video packet filter 1100_01, and the audio packet filter 1100_02. When they do not have to be identified particularly, they are denoted simply as the packet filter 1100.

The program packet filters PCF are provided according to the number of content types $\gamma$ ($\gamma$ is a natural number) composing a program to be extracted. That is, based on the number of types of the PC packet data Pc to be extracted, packet filters 1100_01 to 1100_0$\gamma$ and a management packet filter 1100_00 for extracting the management packet data PcA from the transport stream TS are provided. In short, $\gamma+1$ packet filters 1100_00 to 1100_0$\gamma$ are provided. For convenience in description, assume herein that only three types of packet filters are provided: the management packet filter 1100_00, the video packet filter 1100_01, and the audio packet filter 1100_02.

From the PC packet data Pc composing a plurality of programs contained in the transport stream TS, the management packet data PcA (PAT, PMT1, PMT2, and PMT3), and video packet data PcV (Pc101_1, Pc101_2, . . . ) and audio packet data PcS (Pc111_1, Pc111_2, . . . ) composing the program 1 are sequentially extracted by the management packet filter 1100_00, the video packet filter 1100_01, and the audio packet filter 1100_02, respectively, in the order in which they arrived at the transport stream decoder TDAc.

The extracted program association table PAT, program map tables PMT1, PMT2, and PMT3, and PC packet data Pc101_1, Pc111_1, Pc101_2, Pc111_2, . . . are sequentially outputted to the main memory controller 700C as a selected single program packet data string Pes in the order in which they arrived at the transport stream decoder TDAc.

As such, the program packet filter PCF can individually identify the packet data of the incoming transport stream TS on a real-time basis for selective extraction.

The main memory controller 700C temporarily holds, by the transfer unit TSd, the selected single program packet data string Pes supplied from the program packet filter PCF. The main memory controller 700C also controls the main memory 900C so that the management packet data PcA and the selected single program packet data string Pes are stored in predetermined areas as the management packet data PcA, a single program video content packet data string (herein after, SP video packet data string) PssV and a single program audio content packet data string (herein after, SP audio packet data string) PssS.

In other words, the main memory 900C identifies each packet data P included in the selected single program packet data string Pes coming from the program packet filter PCF through the main memory controller 700C as either one of the management packet data PcA, the video packet data PcV, and the audio packet data PcS. The packet data P identified as the management packet data PcA is stored in the main memory 900C as the management packet data PcA, the one identified as the video packet data PcV is stored therein as the SP video packet data string PssV, the one identified as the audio packet data PcV is stored therein as the SP audio packet data string PssS.

Moreover, the main memory controller 700C reads the SP video packet data string PssV and the SP audio packet data string PssS from the main memory 900C, temporarily holds them by the transfer unit TSd, and then outputs them as a single program packet data string Pss to an external device typified by an AV decoder 2000C.

The transport stream decoder TDAc generates a state signal SrWC indicating the state of operation of each of the above described components for output to the TD controller TDCc. Based on the state signal SrWC, the TD controller TDCc generates a control signal ScWC for controlling the operation of each component in the transport stream decoder TDAc for output to the transport stream decoder TDAc.

As such, the TD controller TDCc controls the entire operation of the transport stream decoder TDAc for sequentially extracting, from the single transport stream TS supplied to the transport stream decoder TDAc, only the PC packet data Pc of a single program in the order in which they arrived, and outputting the extracted data as the single program packet data string Pss to the external device such as the AV decoder 2000C. The AV decoder 2000C sequentially decodes the video packet data PcV and the audio packet data PcS contained in the inputted single program packet data string Pss to generate a video/audio signal Sav for viewing by users.

Illustrated in FIG. 35 is an example of the selected single program packet data string Pes composed of the PC packet data Pc (the video packet data PcV and the audio packet data PcS) and the management packet data PcA (PAT and PMT) extracted from three programs included in the single transport stream TS having the packet structure shown in FIG. 7.

In this example, only the PC packet data Pc101_1, Pc111_1, Pc101_2, Pc111_2, . . . for the program 1 and their program association tables PAT and the program management table PMT are extracted as the extracted packet data string Pse, and outputted from the program packet filter PCF to the main memory controller 700C.

In some cases, the program management tables for the programs the user has not specified may be extracted, such as the program management tables PMT2 and PMT3 of the program 2 and the program 3. As such, from the plurality of packet data P sequentially arranged on the input transport stream TS, only the packet data P corresponding to the specified program is discretely extracted.

Shown in FIG. 36 is an example of how the PC packet data Pc contained in the selected single program packet data string Pes are stored in the main memory 900C. The main memory 900C has a video packet storage area A(video) for storing PC packet data (video packet data PcV) Pc101_1, Pc101_2, Pc101_3, Pc101_4, . . . , and an audio packet storage area A(audio) for storing PC packet data (audio packet data PcS) Pc111_1, Pc111_2, Pc111_3, Pc111_4, . . . . Furthermore, for the management packet data PcA, the main memory 900C has a PAT storage area A(PAT) for storing information about the program association table PAT and PMT storage areas A(PMTα) for storing information about the program management tables PMT. Specifically, the program management table PMT1 of the program 1 is stored in a PMT storage area A(PMT1).

The PC packet data (video packet data PcV) Pc101_1, Pc101_2, Pc101_3, Pc101_4, . . . are sequentially stored in the video packet storage area A(video) to construct a SP video packet data string PssV. Similarly, the PC packet data (audio packet data PcS) Pc111_1, Pc111_2, Pc111_3, Pc111_4, . . . are sequentially stored in the audio packet storage area A(audio) to construct the SP audio packet data string PssS.

The SP video packet data string PssV and the SP audio packet data string PssS thus constructed in the main memory 900C are read by the main memory controller 700C as a SP packet data string Pss as exemplarily illustrated in FIG. 37, and then outputted to the AV decoder 2000C.

The above-constructed conventional transport stream decoder sufficiently works for reproducing only a single program from a single input transport stream and also presenting it to users. This is because the AV decoder sequentially only has to decode the plurality of packet data P contained in the SP packet data string Pss composing the single program in the order in which they came. However, the above transport stream decoder cannot support the following three types of reproduction irrespectively of whether the reproduced program is presented to users.

(Reproduction Type 1)

Only a single transport stream is allowed to be inputted, that is, only a single stream input section is provided. From the transport stream, a plurality of programs are to be reproduced.

(Reproduction Type 2)

A plurality of transport streams are allowed to be inputted, that is, a plurality of stream input sections are provided. This reproduction type is further classified into the following six types 2-1 to 2-6.

Type 2-1: Only a single program is to be reproduced from each of the transport streams.

Type 2-2: A plurality of programs are to be simultaneously reproduced from each of the transport streams Type 2-3: Only a single program is to be reproduced from a specific one of the transport streams.

Type 2-4: A plurality of programs are to be simultaneously reproduced from a specific one of the transport streams.

Type 2-5: A plurality of programs are to be simultaneously reproduced from several specific ones of the transport streams.

Type 2-6: Only a single program is to be reproduced from several specific ones of the transport streams.

(Reproduction Type 3)

A data process is carried out by a unit of the packet data P (Pc, PAT, PMT) contained in the selected single program packet data string Pes extracted from the transport stream. Such data process includes processing the PC packet data Pc, the program association table PAT, or the program map data PMT itself, and carries out different processes on the respective packet data P.

Described specifically below are reasons why the conventional transport stream decoder cannot be applied to the above reproduction types.

In reproduction type 1, of a plurality of programs simultaneously reproduced from the single transport stream TS, a desired specific program has to be presented to the user in a user-desired manner. In this case, which PC packet data Pc mixed in the selected single program packet data string Pes or the single program packet data string Pss correspond to which program has to be identifiable and manageable, and the identification/management results can be so presented to be usable as information.

As stated above, the conventional transport stream decoder can extract the program map tables PMT of the plurality of programs. Therefore, it is possible to know of which program the single transport stream TS contains which PC packet data Pc. However, the program packet filter PCF, filters the received plurality of PC packet data Pc composing a single specific program merely with their packet identifiers PID. Therefore, the PC packet data Pc of the programs other than the specific program cannot exist in the selected single program packet data string Pes. Accordingly, the programs corresponding to the respective PC packet data Pc and the identification/management results cannot be obtained.

In Reproduction type 2, a plurality of transport streams TS can be simultaneously supplied. That is, the respective stream input sections can be supplied with σ (σ is a positive integer not less than 2) types of transport streams TS_1 to TS_σ differed in type, scheme, or supplier. Under such circumstances, in either of Type 2-1 (a single program is to be reproduced from the transport streams TS_1 to TS_σ), Type 2-3 (a single program is to be reproduced from a specific one of the transport streams TS_1 to TS_σ), and Type 2-6 (a single program is to be reproduced from several ones of the transport streams TS_1 to TS_σ), the transport stream TS containing the program to be reproduced has to be identified, and which PC packet data Pc in the selected single program packet data string Pes or the single program packet data string Pss corresponds to which transport stream TS also has to be identifiable. Such identification cannot be made by the conventional transport stream decoder, as described above.

Moreover, in either of Type 2-2 (a plurality of programs are to be simultaneously reproduced from the transport streams TS_1 to TS_σ), Type 2-4 (a plurality of programs are to be simultaneously reproduced from specific one of the transport streams TS_1 to TS_σ), and Type 2-5 (a plurality of programs are to be simultaneously reproduced from several specific ones of the transport streams TS_1 to TS_σ), which packet data P contained in the selected signal program packet data string Pes corresponds to which of the transport streams TS_1 to TS_σ and to which program has to be identifiable. Such identification cannot be made by the conventional transport stream decoder either, as described above.

In Reproduction type 3, as requested by the user, different processes may be carried out on the respective packet data P (Pc, PAT, PMT) corresponding to the programs contained in the transport stream TS. By way of example only, consider a case where the user desires to view one program and store another program in a storage device. In this case, the PC packet data Pc corresponding to the one program is simply outputted in sequence, and decoded by the AV decoder 2000C for output at a monitor, while the PC packet data Pc corresponding to the other program is so processed as that a new transport stream TSr (now shown) containing the PC packet data Pc is constructed according to transfer requirements for the storage device and peripheral devices. For the latter, for the purpose of generating the new transport stream TSr from the PC packet data Pc, the above-stated identification/management information has to be required. This identification/management information is also required when the packet data P itself has to be processed as required, for specifying packet data P to be processed and correctly managing the processed packet data. However, such identification and management cannot be made by the conventional transport stream decoder, as described above.

As has been described, the conventional transport stream decoder is suitable for reproducing a single program for a single transport stream. However, the conventional decoder cannot identify, by program, the PC packet data Pc of the plurality of programs contained in a single transport stream.

When a plurality of transport streams are supplied, in addition to that the PC packet data Pc cannot be identified by program, the transport streams cannot be distinguished, and which PC packet data of the program to be reproduced corresponds to which transport stream cannot also be identified.

As such, the conventional transport stream decoder cannot be used for reproducing a plurality of programs irrespectively of the input transport stream is single or plural. When a plurality of transport streams are supplied, the conventional decoder cannot be used even for reproducing a single program.

Furthermore, in either of the above reproduction types, irrespectively of whether the transport stream is single or plural, for carrying out processes on the respective programs reproduced from the input transport stream(s) TS, an interface for corresponding to each process has to be provided for each packet filter. Consequently, such problems will arise as increase in size and complication in construction of the device, increase in processing load, flexibility to change in specification or process requested, and increase in cost.

In view of the above problems, the present invention is to provide a packet data processing determination apparatus for identifying on a real-time basis whether packet data composing an input transport stream is to be subjected to a specific process, and indicating the specific process to be applied to each packet data as such.

BRIEF SUMMARY OF THE INVENTION

To achieve the above objects, the present invention has the following aspects.

A first aspect of the present invention is directed to a packet data processing determination apparatus used for a transport stream processing apparatus that carries out a predetermined process on an incoming transport stream composed of a plurality of sequential packet data each provided with identification information, the packet data processing determination apparatus for individually determining whether each packet data composing the transport stream is a subject of a previously specified process so that the transport stream processing apparatus can carry out the predetermined process by a unit of packet data. The packet data processing determination apparatus includes: an identification information input section for inputting target packet data identification information for identifying a packet data to be processed; a packet data storage section for storing the packet data for a predetermined period of time in an order in which the packet data come; a stored packet data identifying section for reading the identification information provided to the packet data stored in the packet data storage section; and a target packet data determining section for comparing the read identification information with the target packet data identification information; and, generating a process-target determination signal indicative of whether the stored packet data is the subject of the previously specified process.

As described above, in the first aspect, each packet data of the sequentially-inputted transport stream is temporarily stored, and then it is determined which previously specified process is to be carried out on the stored packet data. Thus, the previously specified process can be applied by a unit of packet data.

According to a second aspect, in the first aspect, when the process-target determination signal indicates that the stored packet data is not the subject of the previously specified process, the packet data storage section is freed for storing another packet data.

According to a third aspect, in the second aspect, the packet data processing determination apparatus further includes a specified-process-completed detecting section for detecting completion of the specified process carried out by the transport stream processing apparatus on the packet data stored in the packet data storage section. After the completion of the specified process is detected, the packet data storage section is freed for storing another packet data.

As described above, in the second and third aspects, it is possible to minimize the time taken by the packet data storage section for storing the packet data. Consequently, it is also possible to minimize the capacity of the packet data storage section required for storing the packet data of the sequentially-inputted transport stream.

According to a fourth aspect, in the third aspect, the packet data storage section includes: a plurality of buffer cells for storing the sequential packet data; a buffer cell allocating section for allocating one of the plurality of buffer cells for storing one of the sequential packet data; a buffer cell freeing section for freeing the buffer cell allocated by the buffer cell allocating section for storing another packet data; and a buffer cell allocation information storage section for storing buffer cell allocation information indicating states of allocation of the respective buffer cells. The packet data allocating section determines, based on the buffer cell allocation information, which one of the plurality of buffer cells is allocated for storing subsequent packet data.

As described above, in the fourth aspect, the capacity and number of buffer cells constructing the packet data storage section capable of storing by a unit of packet data are appropriately set. Thus, the packet data storage section having enough capacity can be easily realized.

According to a fifth aspect, in the fourth aspect, a storing buffer cell pointer is provided in the plurality of buffer cells for indicating the buffer cell that stores the packet data, an access-target buffer cell pointer is provided in the plurality of buffer cells for indicating the buffer cell that stores the packet data from which the identification information is to be read by the stored packet data identifying section, and the buffer cell allocating section does not allocate, for packet data storage, the buffer cell indicated by either one of the storing buffer cell pointer and the access-target buffer cell pointer.

As described above, in the fifth aspect, with two types of pointers indicating the state of use of the buffer cell, the buffer cell can be efficiently used.

According to a sixth aspect, in the fifth aspect, the packet data processing determination apparatus further includes a first access limiting section for limiting access to the buffer cell from the stored packet data identifying section based on the storing buffer cell pointer and the access-target buffer cell pointer.

According to a seventh aspect, in the sixth aspect, the first access limiting section prohibits the stored packet data identifying section from accessing the buffer cell while the storing buffer cell pointer indicates the same buffer cell as the buffer cell indicated by the access-target buffer cell pointer.

According to an eighth aspect, in the sixth aspect, the first access limiting section permits the stored packet data identifying section to access to the buffer cell indicated by the access-target buffer cell pointer while the storing buffer cell pointer indicates a buffer cell different from the buffer cell indicated by the access-target buffer cell pointer.

As described above, in the sixth, seventh, and eighth aspects, after the packet data has been completely stored, the identification information is prohibited from being read. Thus, it is possible to prevent erroneous identification of the packet data due to incompleteness thereof.

According to a ninth aspect, in the fifth aspect, when the process-target determination signal indicates that the packet data stored in the buffer cell is not the subject of the previously specified process, the buffer cell freeing section frees the buffer cell, and the access-target buffer cell pointer indicates a buffer cell different from the freed buffer cell.

According to a tenth aspect, in the fifth aspect, after the specified-process-completed detecting section detects the completion of the previously specified process carried out by the transport stream processing apparatus on the packet data stored in the buffer cell, the buffer cell freeing section frees the buffer cell, and the access-target buffer cell pointer indicates a different buffer cell from the freed buffer cell.

As described above, in the ninth and tenth aspects, it is possible to minimize the time taken by the buffer cell for storing the packet data. Consequently, it is also possible to minimize the number of buffer cells required for storing the packet data of the sequentially-inputted transport stream.

According to an eleventh aspect, in the fifth aspect, the plurality of buffer cells are each provided with unique buffer cell identification information. The buffer cell allocation information storage section includes a buffer cell allocation information area for storing binary information indicating either one of a first value and a second value that are related to the buffer cell identification information. The buffer cell allocating section allocates the buffer cell by writing the first value in the buffer cell allocation information area, and frees the buffer cell by writing the second value in the buffer cell allocation information area.

According to a twelfth aspect, in the first aspect, each of the plurality of packet data composing the transport stream is provided with the identification information unique to a packet data group to which the packet data belongs based on ISO/IEC 13818-1 (MPEG2 system), and the target packet data identification information indicates the identification information of the packet data group.

According to a thirteenth aspect, in the first aspect, the packet data processing determination apparatus further includes a packet data management information generating section for generating management information uniquely identifying each of the plurality of packet data composing a plurality of the incoming transport streams, and providing the generated management information to the packet data. Based on the identification information and the management information, it is determined whether each of the plurality of packet data having the same identification information but composing different transport streams is the subject of the previously specified process.

According to a fourteenth aspect, in the thirteenth aspect, the management information is stream identification information assigned to each of the incoming transport streams.

According to a fifteenth aspect, in the thirteenth aspect, the management information further includes a time stamp indicating a time when the packet data is inputted.

As described above, in the thirteenth, fourteenth, and fifteenth aspects, each packet data of the inputted plurality of transport streams can be correctly identified.

According to a sixteenth aspect, in the sixth aspect, the packet data processing determination apparatus further includes: a data error detecting section for detecting data error contained in any of the incoming transport streams, and generating an error detection signal; an error flag section for indicating, based on the error detection signal, the buffer cell that stores the packet data having the data error; and a second access limiting section for limiting, based on the indication by the error flag section, access to the buffer cell by the stored packet data identifying section.

According to a seventeenth aspect, in the sixteenth aspect, the second access limiting section prohibits the stored packet data identifying section from accessing the buffer cell indicated by the access-target buffer cell pointer while the storing buffer cell pointer indicates a buffer cell different from the buffer cell indicated by the access-target buffer cell pointer and also by the error flag section, and the buffer cell freeing section frees the buffer cell.

As described above, in the sixteenth and seventeenth aspects, by limiting the process on the buffer cell that stores the packet data having data error, it is possible to prevent failure in processing and ensure processing efficiency.

An eighteenth aspect of the present invention is directed to a method of determining packet data processing used for a transport stream processing apparatus that carries out a predetermined process on an incoming transport stream composed of a plurality of sequential packet data each provided with identification information. The method individually determines whether each packet data composing the transport stream is a subject of a previously specified process so that the transport stream processing apparatus can carry out the predetermined process by a unit of packet data. The method includes: a step of for inputting target packet data identification information for identifying a packet data to be processed; a step of storing the packet data in packet data storage section for a predetermined period of time in an order in which the packet data come; a stored packet data identifying step of reading the identification information provided to the stored packet data; and a target packet data determining step of comparing the read identification information with the target packet data identification information, and generating a process-target determination signal indicative of whether the stored packet data is the subject of the previously specified process.

As described above, in the eighteenth aspect, each packet data of the sequentially-inputted transport stream is temporarily stored, and then it is determined which previously specified process is to be carried out on the stored packet data. Thus, the previously specified process can be applied by a unit of packet data.

According to a nineteenth aspect, in the eighteenth aspect, the packet data processing determination method further includes a first freeing step of freeing packet data storage section that stores the packet data indicated by the process-target determination signal as not the subject of the previously specified process.

According to a twentieth aspect, in the eighteenth aspect, the packet data processing determination method further includes: a completion detecting step of detecting that completion of the specified process carried out by the transport stream processing apparatus on the packet data stored in the packet data storage section; and a second freeing step of freeing, after the completion of the specified process is detected, the packet data storage section for storing another packet data.

As described above, in the nineteenth and twentieth aspects, it is possible to minimize the time taken by the packet data storage section for storing the packet data. Consequently, it is also possible to minimize the capacity of the packet data storage section required for storing the packet data of the sequentially-inputted transport stream.

According to a twenty-first aspect, in the twentieth aspect, the packet data storage section includes a plurality of buffer cells for storing the sequential packet data, and the packet data processing determination method further includes: a step of storing buffer cell allocation information indicating states of allocation of the respective buffer cells; a buffer cell allocating step of determining, based on the buffer cell allocation information, which one of the plurality of buffer cells is allocated for storing subsequent packet data; and a buffer cell freeing step of freeing the allocated buffer cell for storing another packet data.

As described above, in the twenty-first aspect, the capacity and number of buffer cells constructing the packet data storage section capable of storing by a unit of packet data are appropriately set. Thus, the packet data storage section having enough capacity can be easily realized.

According to a twenty-second aspect, in the twenty-first aspect, a storing buffer cell pointer is provided in the plurality of buffer cells for indicating the buffer cell that stores the packet data, an access-target buffer cell pointer is provided in the plurality of buffer cells for indicating the buffer cell that stores the packet data from which the identification information is to be read in the stored packet data identifying step, and in the buffer cell allocating step, the buffer cell indicated by either one of the storing buffer cell pointer and the access-target buffer cell pointer is not allocated for packet data storage.

As described above, in the twenty-second aspect, with two types of pointers indicating the state of use of the buffer cell, the buffer cell can be efficiently used.

According to a twenty-third aspect, in the twenty-second aspect, the packet data processing determination method further includes a first access limiting step of limiting execution of the stored packet data identifying step based on the indications by the storing buffer cell pointer and the access-target buffer cell pointer.

According to a twenty-fourth aspect, in the twenty-third aspect, the first access limiting step prohibits the stored packet data identifying step from being executed while the storing buffer cell pointer indicates the same buffer cell as the buffer cell indicated by the access-target buffer cell pointer.

According to a twenty-fifth aspect, in the twenty-third aspect, the first access limiting step permits the stored packet data identifying step to be executed while the storing buffer cell pointer indicates a buffer cell different from the buffer cell indicated by the access-target buffer cell pointer.

As described above, in the twenty-third, twenty-fourth, and twenty-fifth aspects, after the packet data has been completely stored, the identification information is prohibited from being read. Thus, it is possible to prevent erroneous identification of the packet data due to incompleteness thereof.

According to a twenty-sixth aspect, in the twenty-second aspect, the packet data processing determination method further includes a first access-target buffer cell pointer controlling step of causing the access-target buffer cell pointer to indicate a buffer cell different from the freed buffer cell when the process-target determination signal indicates that the packet data stored in the buffer cell is not the subject of the previously defined process.

According to a twenty-seventh aspect, in the twenty-second aspect, the packet data processing determination further includes a second access-target buffer cell pointer controlling step of, after the completion of the previously specified process is detected in the completion detecting step and after the buffer cell is freed in the buffer cell freeing step, causing the access-target buffer cell pointer to indicate a buffer cell different from the freed buffer cell As described above, in the twenty-sixth and twenty-seventh aspects, it is possible to minimize the time taken by the buffer cell for storing the packet data. Consequently, it is also possible to minimize the number of buffer cells required for storing the packet data of the sequentially-inputted transport stream.

According to a twenty-eighth aspect, in the twenty-second aspect, the plurality of buffer cells are each provided with unique buffer cell identification information, and the method further includes a buffer cell allocation information storing step of storing binary information indicating either one of a first value and a second value that are related to the buffer cell identification information. When the first value is stored, the corresponding buffer cell is allocated, and when the second value is stored, the corresponding buffer cell is freed.

According to a twenty-ninth aspect, in the eighteenth aspect, the packet data processing determination method further includes a step of generating management information uniquely identifying each of the plurality of packet data composing a plurality of the incoming transport streams and providing the generated management information to the packet data. Based on the identification information and the management information, it is determined whether each of the plurality of packet data having the same identification information but composing different transport streams is the subject of the previously specified process.

As described above, in the twenty-eighth and twenty-ninth aspects, each packet data of the inputted plurality of transport streams can be correctly identified.

According to a thirtieth aspect, in the twenty-ninth aspect, the packet data processing determination method further includes: a step of detecting data error contained in the incoming transport stream, and generating an error detection signal; a data error buffer cell indicating step of indicating, based on the error detection signal, the buffer cell that stores the packet data having the data error; and a second access limiting step of limiting execution of the stored packet data identifying step on the buffer cell indicated in the data error buffer cell indicating step.

As described above, in the thirtieth aspect, by limiting the process on the buffer cell that stores the packet data having data error, it is possible to prevent failure in processing and ensure processing efficiency.

BRIEF DESCRIPTION OF THE DRAWINGS

FIG. 36 is a schematic diagram showing how selected signal program packet data strings are stored in main memory shown in FIG. 34; and FIG. 37 is an illustration for demonstrating the structure of a signal program packet data string supplied to or outputted from the main memory shown in FIG. 34.

DETAILED DESCRIPTION OF THE INVENTION

First Embodiment

With reference to FIGS. 1, 2, 3, 4, 5, 7, 8, 9, 10, 11, 12, 13, and 14, described below is a packet data identification apparatus according to a first embodiment of the present invention. Note that the packet data identification apparatus according to the first embodiment is constructed as a data buffering apparatus for use in a transport stream decoder for selectively extracting content data of a plurality of programs contained in a single transport stream TS.

With reference to FIGS. 10, 11, 13, and 14, described first is a basic concept of the transport stream decoder having a packet data processing determination section according to the first embodiment.

Figure 10:
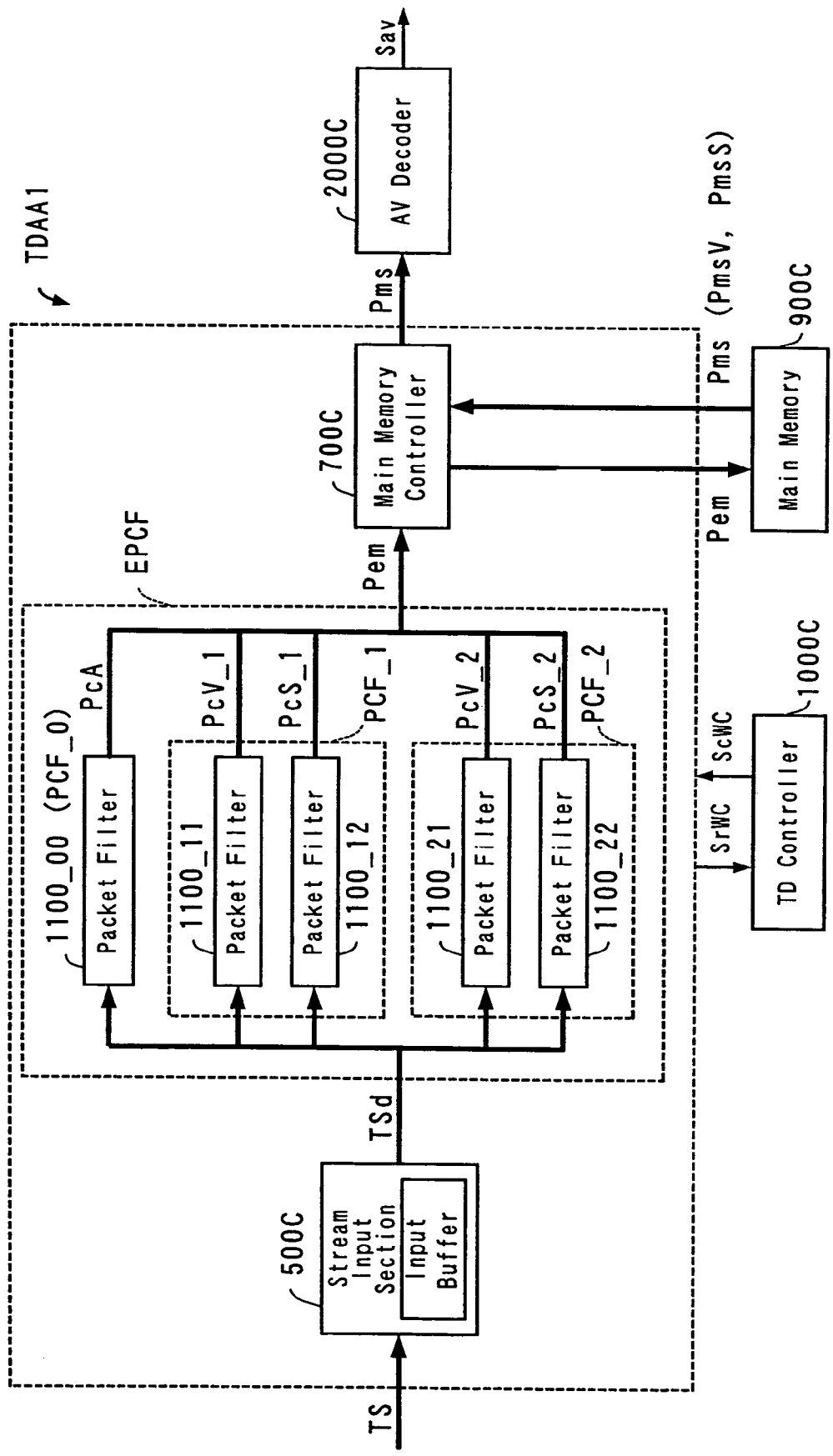
FIG. 10 is a block diagram showing the structure achieved mainly by hardware and similar in function to the transport stream decoder shown in FIG. 1.
Figure 34:
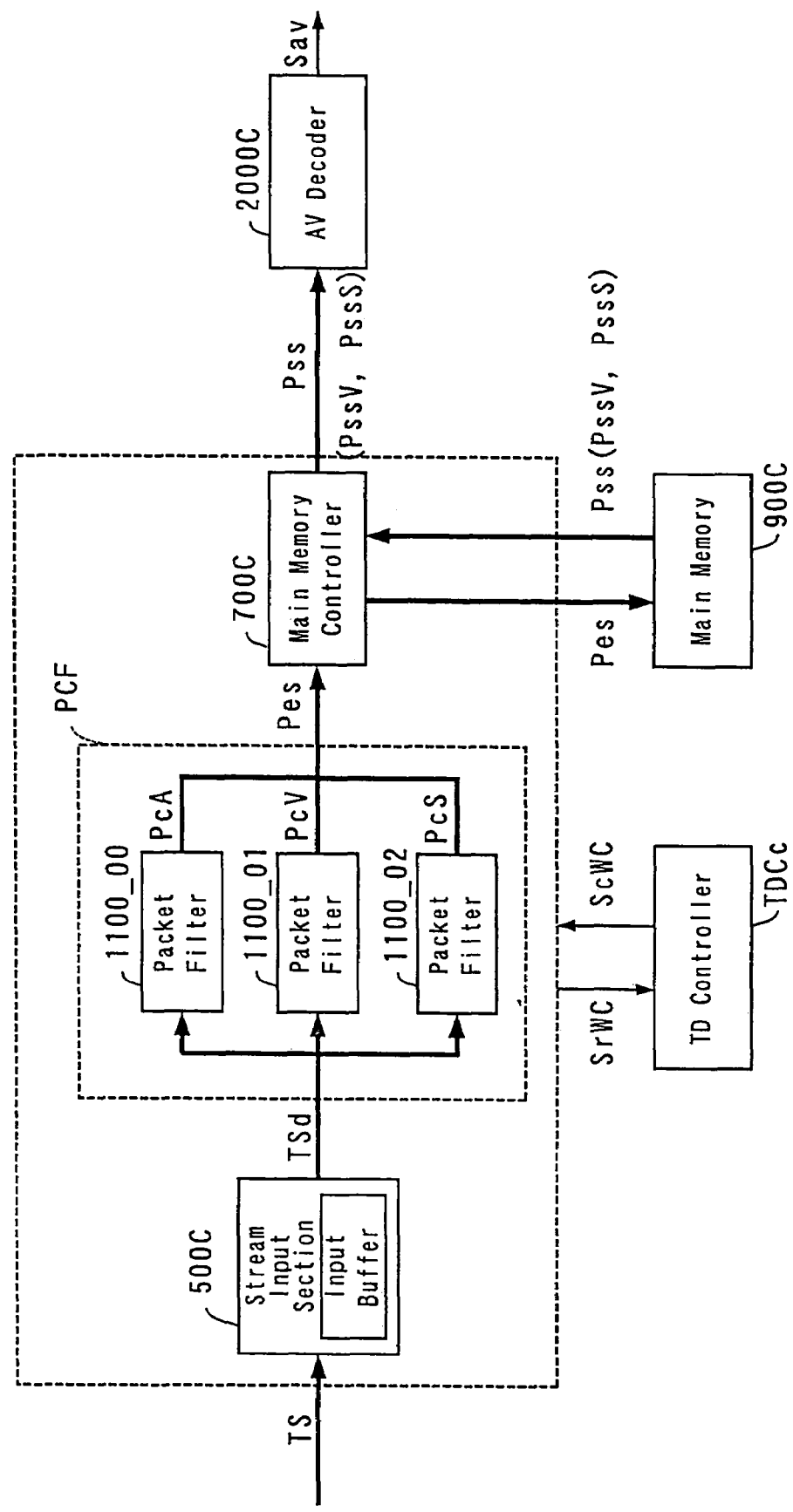
FIG. 34 is a block diagram showing the construction of a conventional transport stream decoder realized mainly by hardware, the decoder considered for use in supplying a plurality of pieces of program content packet data from a signal transport stream.
Figure 35:
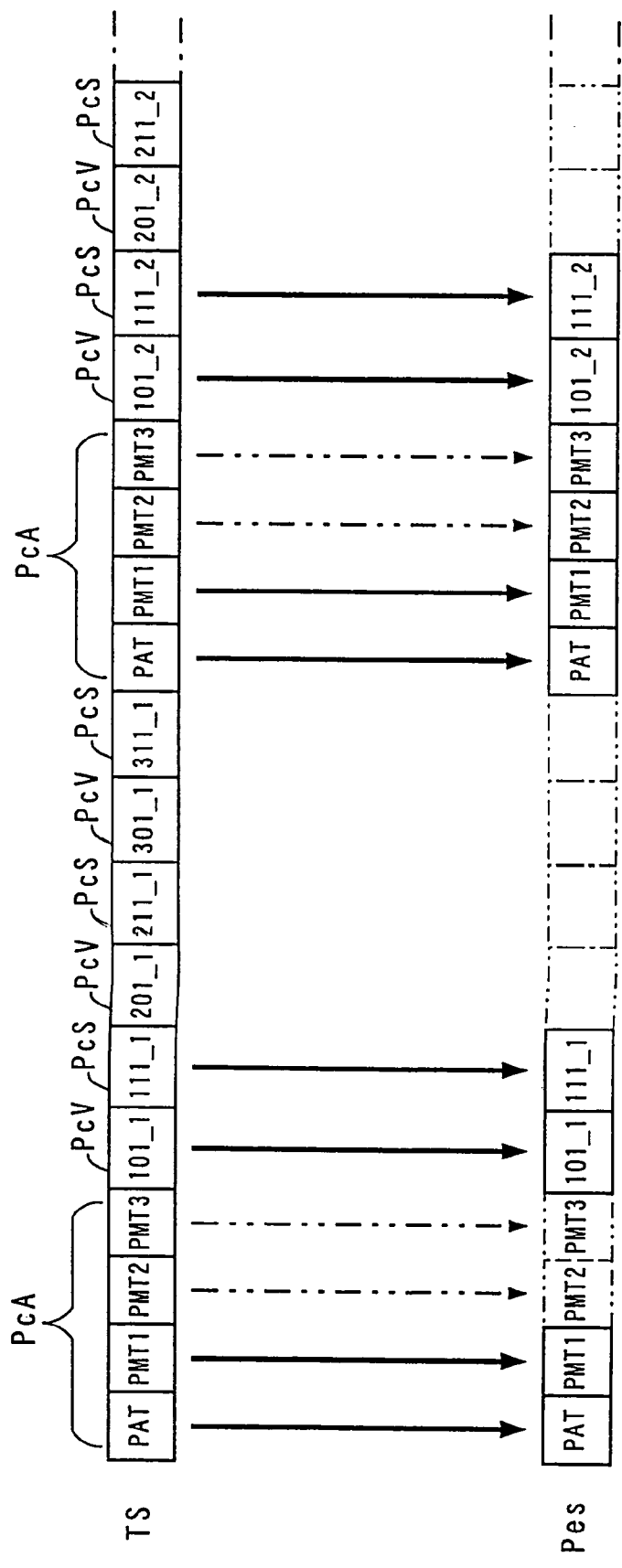
FIG. 35 is an illustration for demonstrating a selected signal program packet data string structured by the transport stream decoder shown in FIG. 34 extracting from a signal transport stream.

Illustrated in FIG. 10 is a first example improvement of the conventional transport stream decoder TDAc shown in FIG. 34, the improvement being adapted for extracting a plurality of programs from a single transport stream TS according to the first embodiment. A transport stream decoder TDAA1 of the first example improvement is constructed by replacing the program packet filter PCF in the transport stream decoder TDAc of FIG. 34 with an extended program packet filter EPCF.

Prior to description of the extended program packet filter EPCF, described is the operation of the transport stream decoder TDAA1 with reference to FIGS. 1, 13, 14, and FIG. 7 described above. The transport stream decoder TDAA1 selectively extracts PC packet data Pc composing specific programs from PC packet data Pc of a plurality of programs contained in a single transport stream TS having the data structure as described with reference to FIG. 7. The transport stream decoder TDAA1 then outputs the extracted PC packet data Pc to the AV decoder 2000C as a plural programs packet data string Pms.

Figure 7:
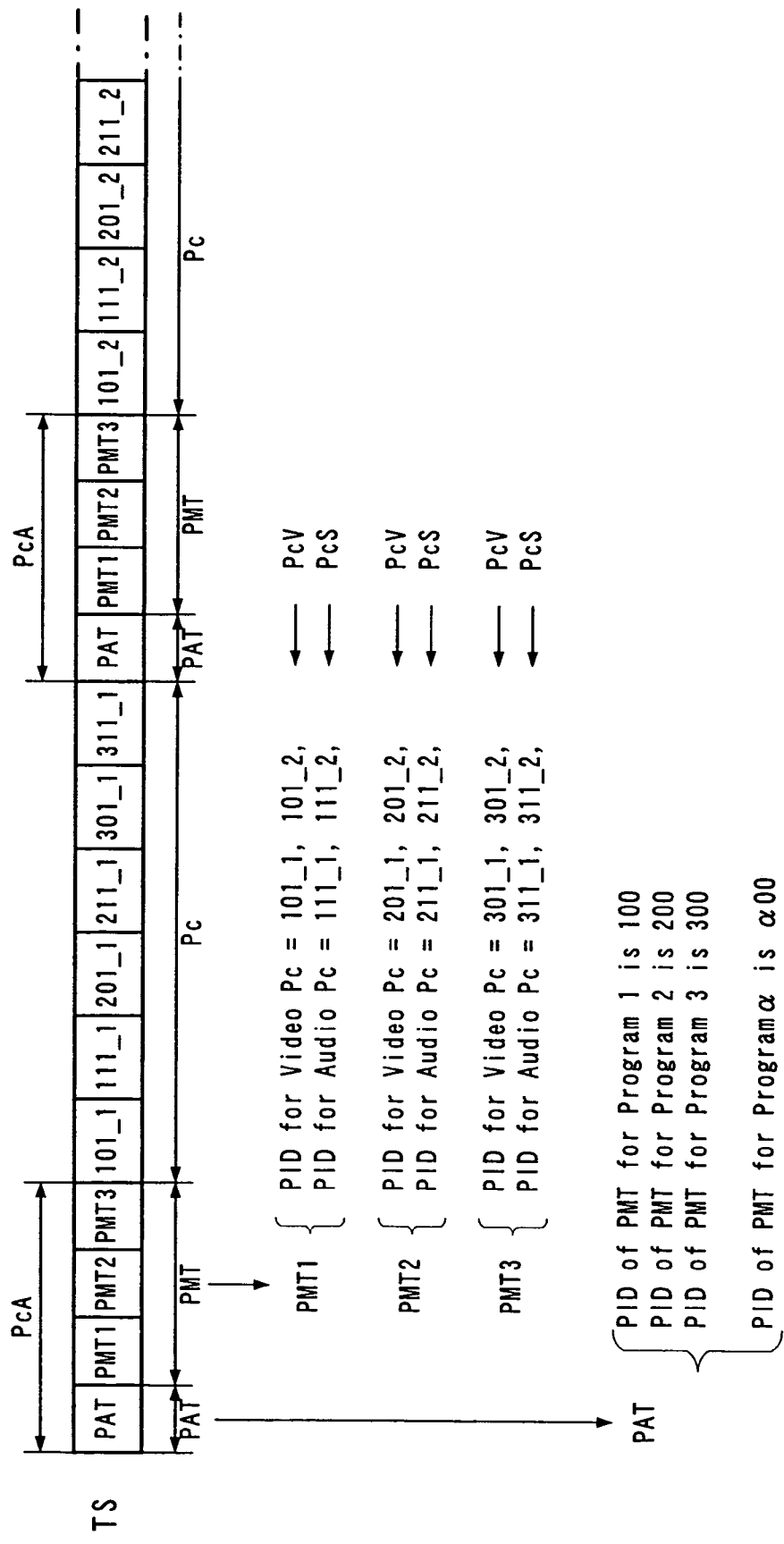
FIG. 7 is an illustration for demonstrating the structure of a transport stream supplied to the transport stream decoder shown in FIG. 1.
Figure 11:
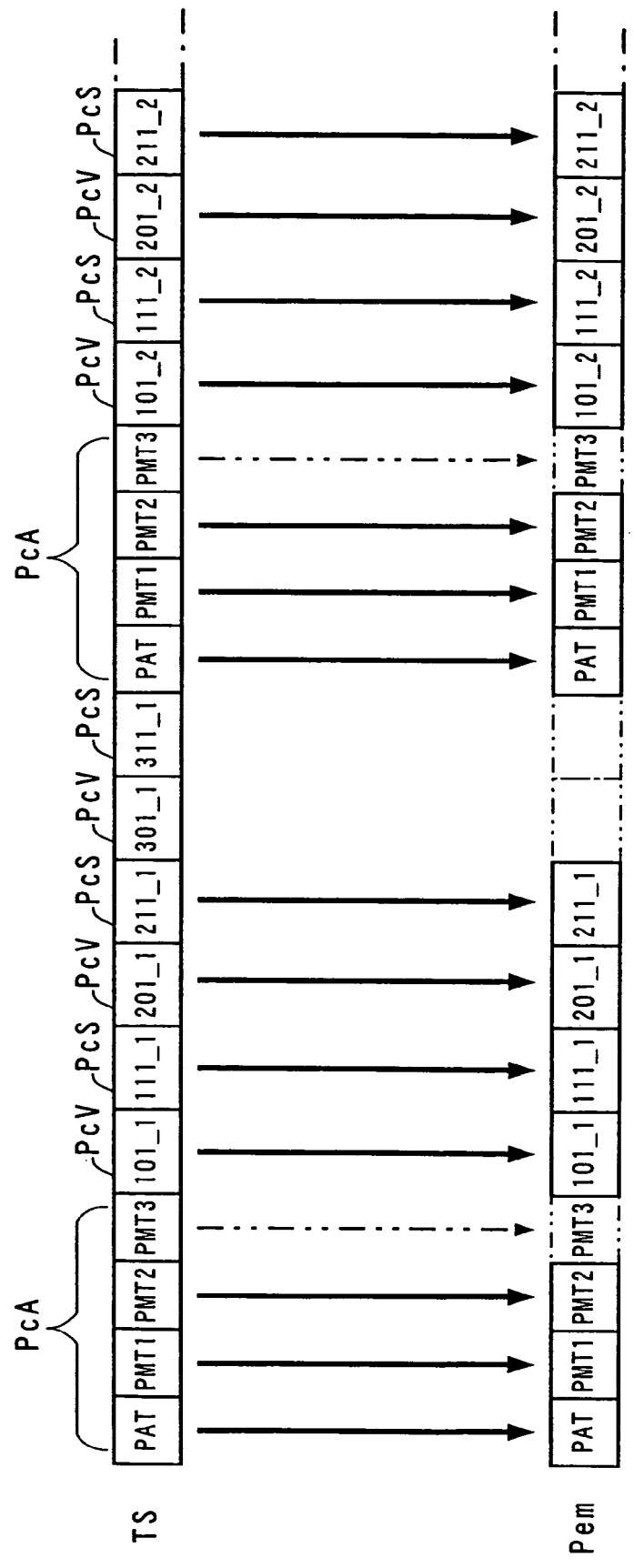
FIG. 11 is an illustration for demonstrating a selected plural program packet data string obtained by the transport stream decoder shown in FIG. 10 extracting program contents packet data and management packet data of two programs from a single transport stream having the packet structure shown in FIG. 7.

Illustrated in FIG. 11 is an example of a selected plural programs packet data string Pem, which is constructed by the transport stream decoder TDAA1 extracting only the PC packet data Pc (the video packet data PcV and the audio packet data PcS) of two programs from three programs contained in the single transport stream TS having the packet structure as shown in FIG. 7.

In this example, extracted are PC packet data Pc101_1, Pc111_1, Pc101_2, Pc111_2, . . . composing the program 1, PC packet data Pc201_1, Pc211_1, Pc201_2, Pc211_2, . . . composing the program 2, and their program association tables PAT and program map tables PMT1 and PMT2. Then, the extracted data and tables are outputted as the selected plural programs packet data string Pem from the extended program packet filter EPCF to the main memory controller 700C.

Note that a program map table PMT of the program 3, which is not specified, may be extracted. As such, only the packet data P corresponding to the specified programs are discretely extracted from the packet data P sequentially arranged on the input transport stream TS, and then outputted in the order in which they arrived at the transport stream decoder TDAA2.

Figure 13:
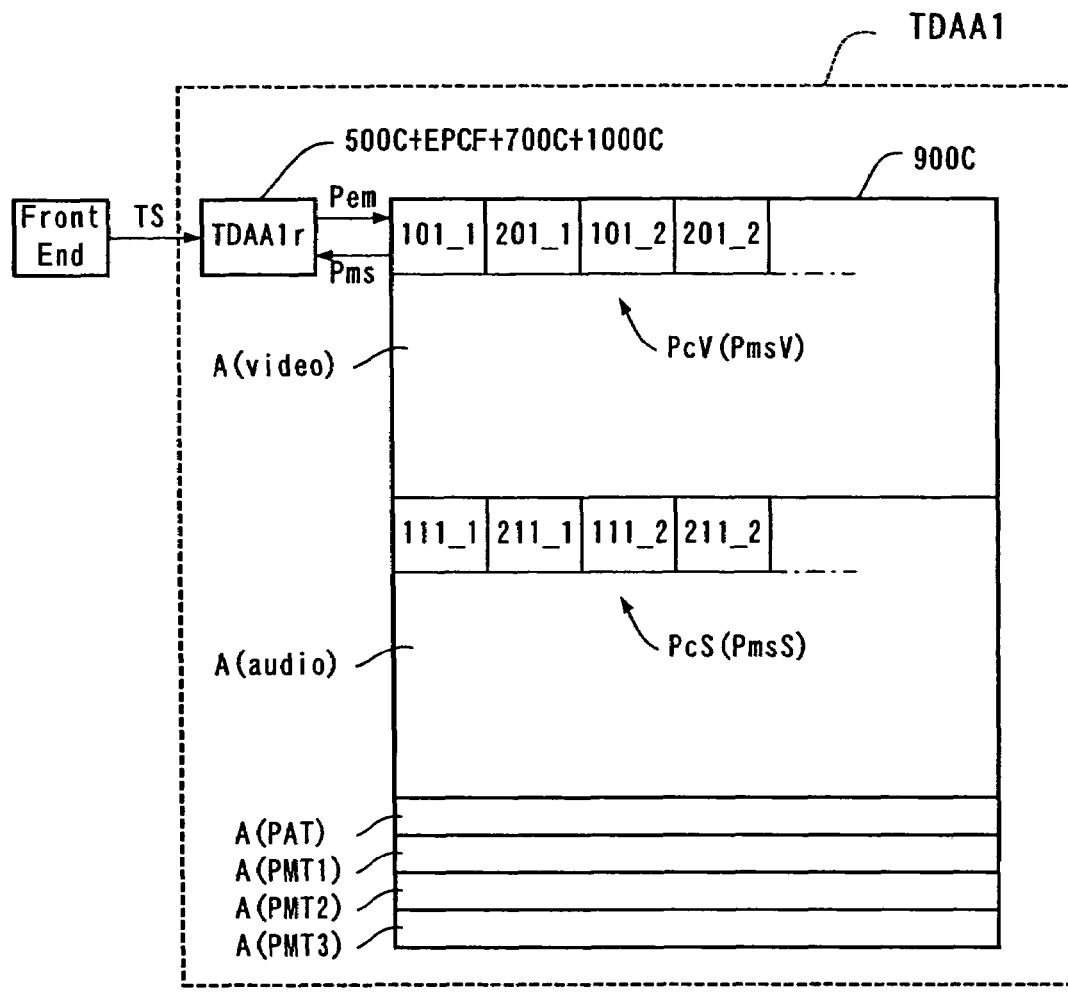
FIG. 13 is an illustration exemplarily showing how packet data is stored in the main memory, the packet data being included in a complex selected plural program packet data string extracted from a transport stream supplied to the transport stream decoder shown in FIG. 10.

Illustrated in FIG. 13 is an example of how the packet data P contained in a mixed selected plural programs packet data string Pems extracted from the transport stream TS supplied to the transport stream decoder TDAA1 through a front end section externally provided. Note that, in the drawing, the stream input section 500C, the extended program packet filter EPCF, the main memory controller 700C, and the TD controller 1000C are collectively represented as a transport stream edit section TDAA1r.

Figure 14:
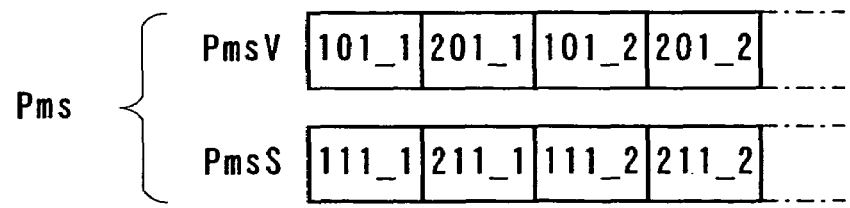
FIG. 14 is an illustration for demonstrating the structure of the complex selected plural program packet data string supplied to or outputted from the main memory shown in FIG. 10.

Illustrated in FIG. 14 is an example of how the PC packet data Pc contained in the mixed selected plural programs packet data string Pems is stored in the main memory 900C. The main memory 900C has the PC packet data (video packet data) Pc101_1, Pc201_1, Pc101_2, Pc201_2, . . . of the programs 1 and 2 stored in the video packet storage area A(video). The main memory 900C also has the PC packet data (audio packet data) Pc111_1, Pc211_1, Pc111_2, Pc211_2, . . . of the programs 1 and 2 stored in the audio packet storage area A(audio).

The main memory 900C also has a PAT storage area A(PAT) for storing information about the program association table PAT, the information composing the management packet data PcA. The main memory 900C further has a PMT storage area A(PMTα) for storing information about the program association tables PMT1 and PMT2. More specifically, the program management table PMT1 is stored in a PMT storage area A(PMT1), and the program management table PMT2 is stored in a PMT storage area A(PMT2).

The PC packet data Pc101_1, Pc201_1, Pc101_2, Pc201_2, which are the video packet data PcV of the programs 1 and 2, are sequentially stored in the video packet storage area A(video) to form a plural programs (herein after, PP) video packet data string PmsV. Similarly, the PC packet data Pc111_1, Pc211_1, Pc111_2, Pc211_2, . . . , which are the audio packet data PcV of the programs 1 and 2, are sequentially stored in the audio packet storage area A(audio) to form a plural programs (herein after, PP) audio packet data string PmsS.

The PP video packet data string PmsV and the PP audio packet data string PmsS constructed in the main memory 900C are read in the above manner by the main memory controller 700C as the plural programs packet data string Pms as exemplarily illustrated in FIG. 14, and outputted to the AV decoder 200C. Note that, as described above, the PMT storage area A(PMT) is provided as many as the number of program map tables PMT (programs) contained in the transport stream TS.

As illustrated in FIG. 10, the extended program packet filter EPCF includes a management packet filter PCF_0 for selectively extracting the management packet data PcA, a first program packet filter PCF_1 for selectively extracting the PC packet data Pc of the program 1, and a second program packet filter PCF_2 for selectively extracting the PC packet data Pc of the program 2. Extraction carried out in these filters is based on the packet identifiers PID provided to the respective packet data P transferred by the transfer unit TSd from the stream input section 500C.

The management packet filter PCF_0 is constructed by a management packet filter 1100_00 as illustrated in FIG. 34. The first program packet filter PCF_1 includes a first video packet filter 1100_11 for extracting the video packet data PcV of the program 1 from all PC packet data Pc contained in the input transport stream TS and outputting the extracted data as first video packet data PcV_1, and a first audio packet filter 1100_12 for extracting the audio packet data PcS of the program 1 from all PC packet data PC and outputting the extracted data as first audio packet data PcS_1. Note that the first video packet filter 1100_11 and the first audio packet filter 1100_12 are basically similar in structure to the video packet filter 1100_01 and the audio packet filter 1100_02 constructing the program packet filter PCF illustrated in FIG. 34, although different in filter value set in each filter.

Similarly, the second program packet filter PCF_2 includes a second video packet filter 1100_21 for extracting the video packet data PcV of the program 2 from all PC packet data Pc contained in the input transport stream TS and outputting the extracted data as second video packet data PcV_2, and a second audio packet filter 1100_22 for extracting the audio packet data PcS of the program 2 from all PC packet data PC and outputting the extracted data as second audio packet data PcS_2. Note that, the second video packet filter 1100_21 and the first audio packet filter 1100_22 are basically similar in structure to the video packet filter 1100_01 and the audio packet filter 1100_02 constructing the program packet filter PCF, although different in filter value set in each filter.

That is, the extended program packet filter EPCF in the first embodiment has the structure of the program packet filter PCF illustrated in FIG. 34 further provided with the video packet filter 1100_21 for extracting the video packet data PcV of the program 2 and the audio packet filter 1100_22 for extracting the audio packet data PcS of the program 2.

In this sense, it can be said that the extended program packet filter EPCF is constructed by, at maximum, program packet filters PCF_1 to PCF_$\alpha$ according to the number of programs $\alpha$ contained in a single transport stream TS, and one management packet filter PCF_0 for extracting the management packet data PcA indicating a relation among the plurality of PC packet data Pc contained in the single transport stream TS. Furthermore, each of the program packet filters PCF_1 to PCF_$\alpha$ includes $\gamma$ packet filters 1000_$\alpha$'1 to 1000_$\alpha$'$\gamma$' ($\alpha$' is a natural number where $1 \leq \alpha' \leq \alpha$) at maximum.

As stated above, when three types of packet filters have to be individually identified, the one for extracting the management packet data PcA is represented as the management packet filter 1100_00, the one for extracting the video packet data PcV is represented as the video packet filter 1100_$\gamma$' ($\gamma$' is a natural number where $1 \leq \gamma' \leq \gamma$), and the one for extracting the audio packet data PcS is represented as the audio packet filter 1100_2$\gamma$'. When the packet filters are required to be individually identified or generally referred to, they are simply represented as packet filters 1100_$\alpha$'$\gamma$'.

Of the PC packet data composing a types of programs contained in the transport stream TS, the management packet data PcA (PAT, PMT1, PMT2, PMT3) is extracted by the management packet filter 1100_00. The first video packet data PcV_1 (Pc101_1, Pc101_2, . . . ) and the first audio packet data PcS_1 (Pc111_1, Pc111_2, . . . ) of the program 1 are extracted by the first video packet filter 1100_11 and the first audio packet filter 1100_12, respectively. Extraction in these filters is carried out in the order in which the packet data arrived at the transport stream decoder TDAA1.

Similarly, the second video packet data PcV_2 (Pc201_1, Pc201_2, . . . ) and the second audio packet data PcS_2 (Pc211_1, Pc211_2, . . . ) of the program 2 are extracted by the second video packet filter 1100_21 and the second audio packet filter 1100_22, respectively, in the order in which the packet data arrived at the transport stream decoder TDAA1.

Then, the extracted program association table PAT, program map tables PMT1, PMT2, and PMT3, and PC packet data PC101_1, Pc111_1, Pc201_1, Pc211_1, Pc101_2, Pc111_2, Pc201_2, Pc211_2, . . . are outputted to the main memory controller 700C as the selected plural programs packet data string Pem in the order in which the packet data arrived at the transport stream decoder TDAA1.

The main memory controller 700C temporarily holds, by the transfer unit TSd, the selected plural programs packet data string Pem supplied from the program packet filter PCF. The main memory controller 700C also controls the main memory 900C so that the data string Pem is so stored as the management packet data PcA, the PP video packet data string PmsV, and the PP audio packet data string PmsS are respectively stored in predetermined different areas on the main memory 900C.

Furthermore, upon request from an external device typified by the AV decoder 2000C, the main memory controller 700C reads the PP video packet data string PmsV and the PP audio packet data string PmsS from the main memory 900C, and outputs the read strings as the plural programs packet data string Pms to the AV decoder 2000C.

In this case, when the user requests a desired process (display on a monitor, for example) on either one of the programs 1 and 2, the transport stream decoder TDAA1 has to identify at least states that will be described below, and generate and hold the identification results. The states to be identified are, first of all, how the transfer unit TSd supplied from the stream input unit 500C to the extended program packet filter EPCF corresponds to the PC packet data Pc, and which PC packet data Pc corresponds to which packet identifier PID.

The states to be identified further include the packet identifiers PID of the PC packet data Pc outputted from the respective program packet filters PCF_1 to PCF_$\alpha$ included in the extended program packet filter EPCF, and the order of the PC packet data Pc. Such states also include which process is desired by the user, various processing schemes and devices for carrying out the process, and which program and packet data are subjected to the schemes. The identified states are represented as identification/management data for use in a subsequent process, and held in the transport stream decoder TDAA1.

Then, when a request for carrying out a process on a specific program comes from the external device such as the AV decoder 2000C, the main memory 700C reads, from the selected plural programs packet data string Pem stored in the main memory 900C, the PC packet data Pc of the specific program based on the identification/management data. This reading is carried out in the order in which the PC packet data Pc are presented to the user. This reading process cannot be carried out by controlling the flow of the data before and after the extended program packet filter EPCF.

Moreover, the program packet filter PCF is required as many as the number of programs to be reproduced ($\alpha$'). Also, the packet filters 1100 are required as many as the number of types of packet data P to be identified. Still further, a processing means for carrying out a process unique to the identified packet data P has to be required. Consequently, such problems will arise as huge increase in size of the apparatus and manufacturing cost.

To get around the above problems, suggested in the first embodiment is a data buffering apparatus capable of individually buffering all packet data P composing the sequentially-inputted transport stream TS, identifying each buffered packet data P to determine whether the packet data P is subjected to a process desired by the user, and controlling an access to and a process on the packet data P on a real-time basis.

Furthermore, proposed in the first embodiment is a packet data processing determination apparatus. In this apparatus, to ensure an access or processing time within a real-time processing time, holding packet data to be processed (herein after, target packet data) within a predetermined time period is ensured by software control. Other passive processes are rendered under hardware control. Consequently, identification and management by every packet data P can be more flexible, and when to carry out a unique process on the identified packet data P can be easily adjusted.

Figure 1:
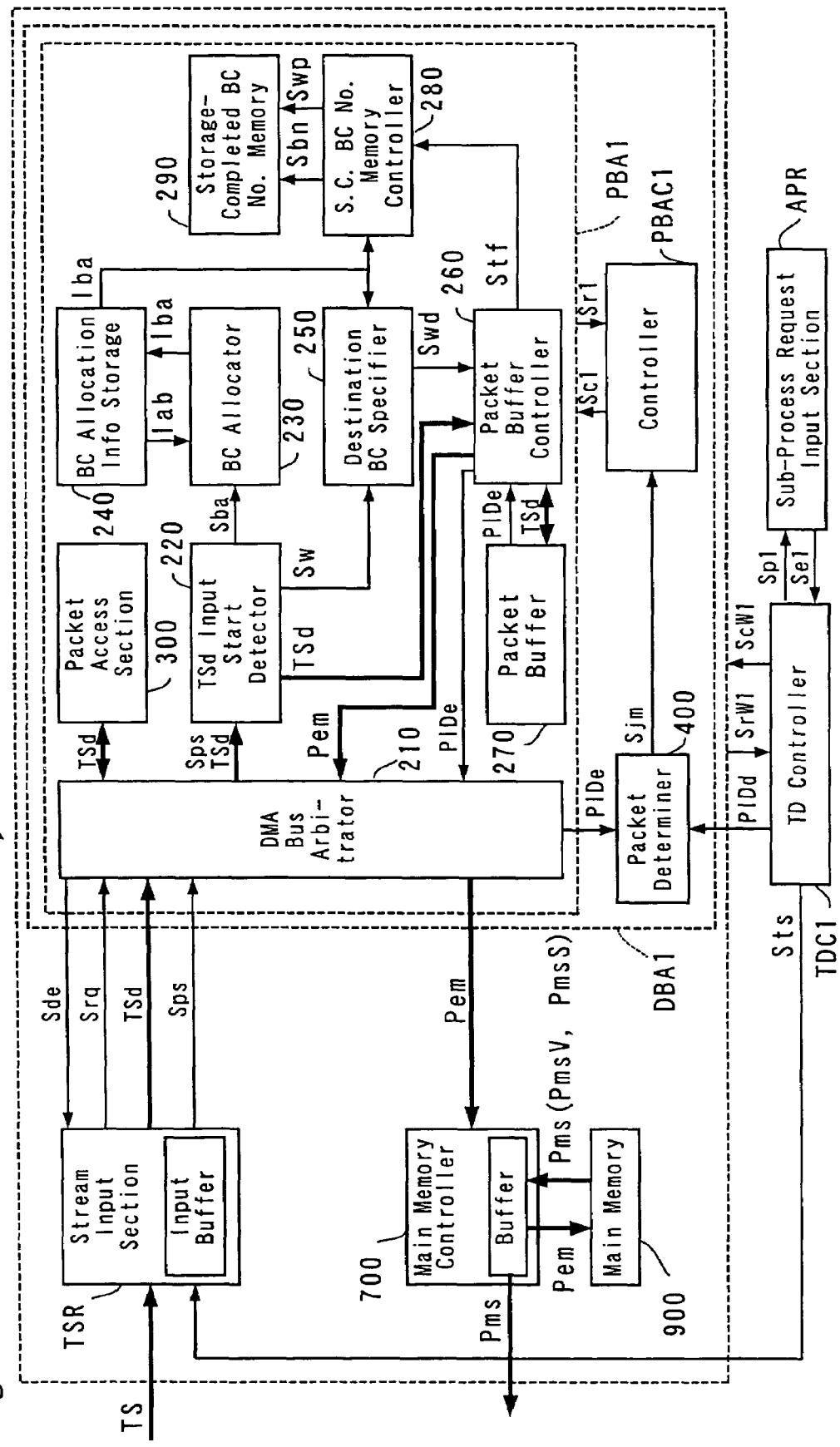
FIG. 1 is a block diagram showing the construction of a transport stream decoder having a data buffer incorporated therein, according to a first embodiment of the present invention.

Illustrated in FIG. 1 is a transport stream decoder TD1 incorporating a data buffering apparatus DBA1 according to the present example. The transport stream decoder TD1 includes a stream input section TSR for receiving the transport stream TS supplied by a unit of packet from an external transport stream source (not shown), the data buffering apparatus DBA1, a main memory controller 700, main memory 900, a TD controller TDC1, and a sub-process request input section APR.

Prior to description of these components, with reference to FIGS. 8, 12, and 14, and FIGS. 7 and 11 described above, described is a basic concept of the transport stream decoder TD1 in the first embodiment. The transport stream decoder TD1 is supplied with only a single transport stream TS having the data structure for presenting three different programs 1, 2, and 3, which has been described with reference to FIG. 7.

In the transport stream decoder TD1, as described with reference to FIG. 11, only the PC packet data Pc of the programs 1 and 2 are extracted from the input single transport stream TS to compose a selected plural programs packet data string Pem. Then, the composed selected plural programs packet data string Pem is outputted through the main memory controller 700 to the main memory 900. The concept of extracting the PC packet data Pc of the programs 1 and 2 from the transport stream TS is basically the same as that described with reference to FIG. 11. In the first embodiment, however, the extended program packet filter EPCF is not used, but the data buffering apparatus DBA1 is used. Details of this will be described later with reference to FIGS. 4, 5, and 6.

Figure 8:
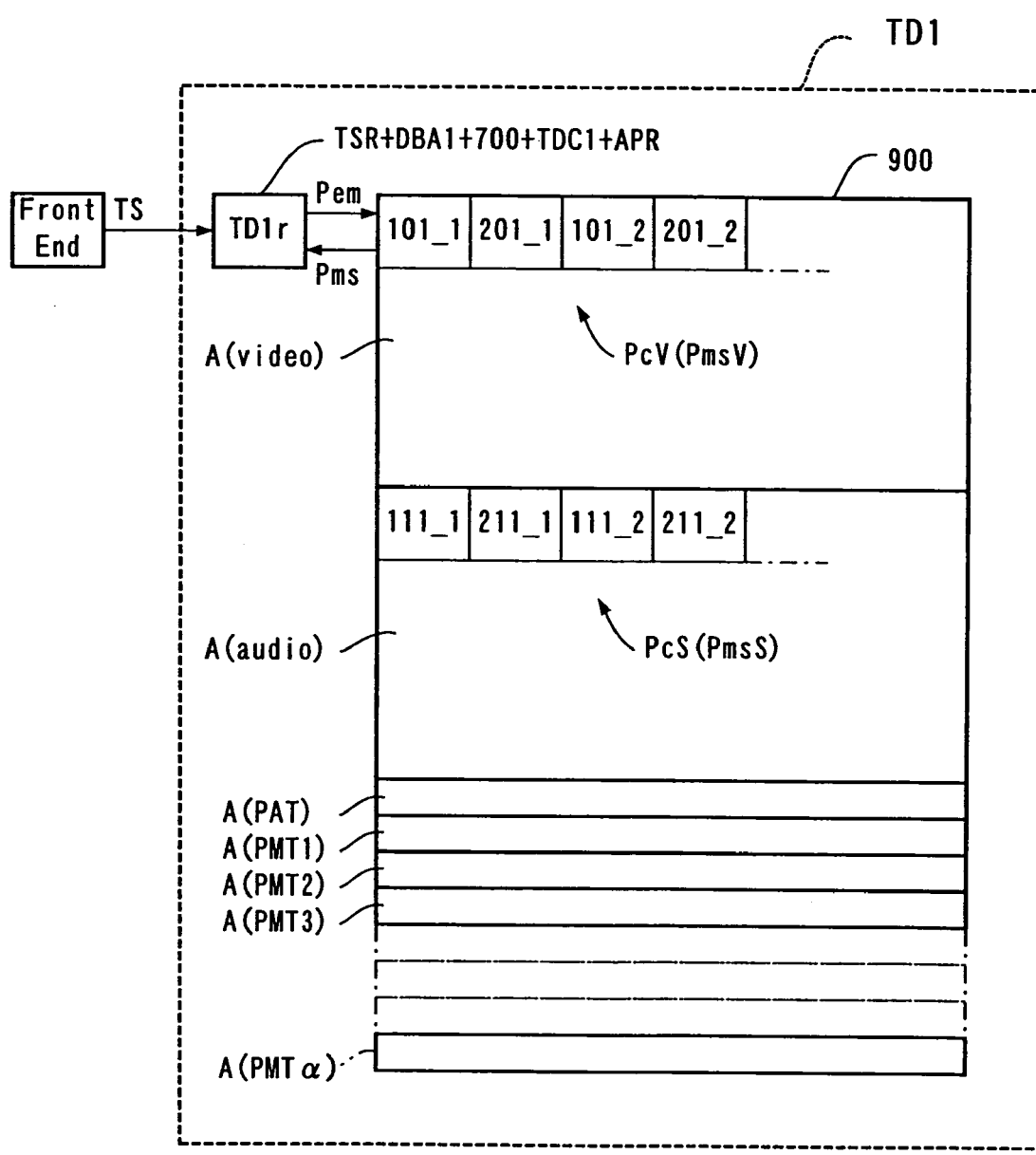
FIG. 8 is a schematic illustration showing an example packet data string supplied to or outputted from main memory shown in FIG. 1.

Illustrated in FIG. 8 is how the PC packet data Pc contained in the selected plural programs packet data string Pem extracted from the transport stream TS supplied through an externally-provided front end section to the transport stream decoder TD1 is stored in the main memory 900. Note that, in the drawing, the stream input section TSR, the data buffering apparatus DBA1, the main memory controller 700, the TD controller TDC1, and the sub-process request input section APR are collectively represented as a transport stream edit section TD1r.

The main memory 900 of the first embodiment is basically the same in structure as the main memory 900C illustrated in FIG. 13. The main memory 900 has a video packet storage area A(video), where the PC packet data Pc101_1, Pc201_1, Pc101_2, Pc201_2, . . . of the programs 1 and 2 are sequentially stored to compose a PP video packet data string PmsV.

The main memory 900 also has an audio packet storage area A(audio), where the PC packet data Pc111_1, Pc211_1, Pc111_2, Pc211_2, . . . of the programs 1 and 2 are sequentially stored to compose a PP audio packet data string PmsS.

Furthermore, the main memory 900 has a PAT storage area A(PAT), where information about the program association table PAT composing the management packet data PcA is stored. The main memory 900 has PMT storage areas A(PMTα), where information about the program map tables PMT1 and PMT2 is stored. Note that the PMT storage area A(PMT) is provided as many as the number of types of the program map tables PMT (programs), as described above. The program association table PAT describes information about all program map tables PMT1 to PMTα contained in the input transport stream TS, as also described above.

As such, the PP video packet data string PmsV and the PP audio packet data string PmsS constructed on the main memory 900 are read by the main memory controller 700 as the plural programs packet data string Pms as exemplarily illustrated in FIG. 14, and outputted to the outside of the transport stream decoder TD1.

Referring back to FIG. 1, described in detail below are respective components of the transport stream decoder TD1. The stream input section TSR has an input buffer incorporated therein for temporarily holding the transport stream TS supplied by a unit of packet from an external transport stream source (not shown), and then transferring the transport stream TS to the data buffering apparatus DBA1 by a predetermined transfer unit TSd. Note that, in the present example, the transfer rate TSd is set as 8 bytes. This is not restrictive, and can be arbitrarily set in consideration of arbitration load and transmission efficiency in the data buffering apparatus DBA1.

The data buffering apparatus DBA1 manages and stores, by a unit of the packet data P, the transport stream TS sequentially supplied by the transfer unit TSd from the stream input section TSR. The data buffering apparatus DBA1 also selectively outputs the PC packet data Pc contained in the transport stream TS on a real-time basis. Note that description is made in the first embodiment to an exemplary case where the PC packet data Pc of two programs are extracted from the transport stream TS containing three programs, and outputted as the selected plural programs packet data string Pem.

The present invention is directed to an apparatus for individually storing the packet data P contained in the transport stream TS in a buffer cell Bc, and identifying the stored packet data P to see whether to enable accessing to and processing on the identified packet data P. For easy comparison with the above-described background art, described as an example process of accessing to and processing on the packet data P is a process of selectively extracting the PC packet data Pc composing a specific program for editing the transport stream TS.

The main memory 900 stores the selected plural programs packet data string Pem coming from the data buffering apparatus DBA1 through the main memory controller 700. Also, the main memory 900 outputs a plural programs (herein after, PP) packet data string Pms (the PP video packet data string PmsV and the PP audio packet data string PmsS) to an external device (not shown) typified by an AV decoder.

The main memory controller 700 temporarily holds, by the transfer unit TSd, the selected plural programs packet data string Pem supplied from the data buffering apparatus DBA1. The main memory controller 700 further controls the operation of the main memory 900, outputting the temporarily-held selected programs packet data string Pem by the transfer unit TSd to the main memory 900, and causing the main memory 900 to compose the plural programs (PP)

video packet data string PmsV and the plural programs (PP) audio packet data string PmsS.

The TD controller TDC1 stores information about the data structure for every type of the transport stream TS to be supplied to the transport stream decoder TD1. The TD controller TDC1 generates a transport stream structure signal Sts indicating the data structure of the actually-supplied transport stream TS for output to the stream input section TSR, thereby controlling the stream input section TSR so that it operates appropriately in accordance with the incoming transport stream TS.

Instead of storing the data structure information of the transport stream TS of every type in the TD controller TDC1, the user may use the sub-process request input section APR or the like to inform the TD controller TDC1 of the structure information of the actually-supplied transport stream TS. Furthermore, the transport stream decoder TD1 is so constructed as to read the actually-supplied transport stream TS and to detect its data structure.

The TD controller TDC1 controls the entire operation of the transport stream decoder TD1. Note that the transport stream decoder TD1 generates a state signal SrW1 indicating the states of operation of the respective components for output to the TD controller TDC1. Based on the state signal SrW1, the TD controller TDC1 generates a control signal ScW1 for controlling the operations of the respective components of the transport stream decoder TD1, and outputs the control signal ScW1 to the transport stream decoder TD1. Note that generation of the state signal SrW1 and the control signal ScW1 and control of the transport stream decoder TD1 are known art, and therefore are not described herein.

The data buffering apparatus DBA1 includes a buffering arbitrator PBA1 for identifying and buffering, by a unit of packet data P, the transport stream TS supplied by the transfer unit TSd from the stream input section TSR; a packet determiner 400 for determining whether the buffered packet data P is desired packet data P; and a controller PBAC1 for controlling the operation of the packet buffering arbitrator PBA1 based on the determination of the packet determiner 400.

The packet buffering arbitrator PBA includes a DMA bus arbitrator 210, a TSd input start detector 220, a buffer cell allocator (herein after, BC allocator) 230, a buffer cell allocation information storage (herein after, BC allocation information storage) 240, a write destination buffer cell specifier (herein after, destination BC specifier) 250, a packet buffer controller 260, a packet buffer 270, storage-completed buffer cell number memory controller (herein after, storage-completed BC No. memory controller) 280, and a storage-completed buffer cell number memory (herein after, a storage-completed BC No. memory) 290, and a packet access section 300.

The DMA bus arbitrator 210 arbitrates, by the transfer unit TSd, inputs and outputs of the packet data P of the transport stream TS mainly between the stream input unit TSR and the packet buffer controller 260. That is, based on a packet head detection signal Sps, a request signal Srq, and the transfer unit TSd supplied from the stream input unit TSR, the DMA bus arbitrator 210 supplies the packet head detection signal Sps and the transfer unit TSd to the TSd input start detector 220. Furthermore, the DMA bus arbitrator 210 outputs the selected plural program packet data string Pem supplied from the packet buffer controller 260 to the main memory controller 700.

The TSd input start detector 220 detects, based on the packet head detection signal Sps and the transfer unit TSd, that input of the transfer unit TSd is started by the packet data P, and supplies the inputted transfer unit TSd to the packet buffer controller 260. The TSd input start detector 220 then generates a buffer cell (BC) request signal Sba for requesting allocation of one of buffer cells constructing the packet buffer 270 for storing the packet data P that is started to be inputted by the transfer unit TSd, and outputs the BC request signal Sba to the BC allocator 230. Once any buffer cell Bc is allocated, the TSd input start detector 220 generates a write enable signal Sw indicating that the PC packet data Pc can be started to be written in the allocated buffer cell, and outputs the write enable signal Sw to the destination BC specifier 250.

In response to the BC request signal Sba, the BC allocator 230 allocates a buffer cell for storing the incoming packet data P based on allocated buffer cell (BC) information Iab. The BC allocator 230 then generates buffer cell (BC) allocation information Iba indicating the allocated buffer cell, and outputs the BC allocation information Iba to the BC allocation information storage 240.

The BC allocation information storage 240 stores the BC allocation information Iba supplied from the BC allocator 230. The BC allocation information storage 240 also supplies the BC allocation information Iba to the destination BC specifier 250 and the storage-complete BC No. memory controller 280. Furthermore, the BC allocation information storage 240 generates, based on the BC allocation information Iba, the allocated buffer cell (BC) information Iab indicating the state of allocation of the respective buffer cells Bc constructing the packet buffer 270, and feeds back the information Iab to the BC allocator 230.

Responding to the write enable signal Sw supplied from the TSd input start detector 220, the destination BC specifier 250 generates a write request signal Swd for instructing a writing of the transfer unit TSd in the allocated buffer cell indicated by the BC allocation information Iba supplied from the BC allocation information storage 240, and outputs the write request signal Swd to the packet buffer controller 260.

In response to the write request signal Swd, the packet buffer controller 260 writes the transfer unit TSd supplied from the TSd input start detector 220 in the allocated buffer cell of the packet buffer 270. The packet buffer controller 260 also counts the number of bytes of data written in the allocated buffer cell to detect that the transfer units TSd for one packet data P have been written. Then, the packet buffer controller 260 generates a transfer complete signal Stf indicating that transfer of one packet data P from the DMA bus arbitrator 210 has been completed, and outputs the transfer complete signal Stf to the storage-completed BC No. memory controller 280. Note that the data size of one packet data P of the input transport stream TS is previously defined in the data structure information stored in the transport stream decoder TD1, as described above.

Based on the BC allocation information Iba supplied from the BC allocation information storage 240 and the transfer complete signal Stf supplied from the packet buffer controller 260, the storage-completed BC No. memory controller 280 generates a buffer cell number signal (herein after, BC No. signal) Sbn indicating the buffer cell having one packet data P written therein, and a write point update signal Swp for advancing, by one, a write pointer indicating in which storage area a buffer cell (BC) number Nbc is to be written. Then, the storage-completed BC No. memory controller 280 outputs the generated signals Sbn and Swp to the storage-completed BC No. memory 290.

The storage-completed BC No. memory 290 records the BC number Nbc indicated by the BC No. signal Sbn in the storage area indicated by the write pointer WP, then advances the write pointer WP by one so that the write pointer WP indicates the area next to the one where the BC number Nbc has been written. In the first embodiment, the storage-completed BC No. memory 290 is preferably implemented by ring memory, as will be described later with reference to FIG. 2. Therefore, by advancing the write pointer WP by one every time writing in the buffer cell is completed, the BC numbers Nbc stored in the storage-completed BC No. memory 290 can be appropriately updated.

The packet access section 300 selectively accesses, through the packet buffer controller 260 and the DMA bus arbitrator 210, the packet data P immediately after stored in the buffer cell of the packet buffer 270 for carrying out a process thereon, such as reading, referring to, editing, etc. The packet access section 300 then overwrites and updates the original packet data P through the DMA bus arbitrator 210 and the packet buffer controller 260.

For the purpose of enabling the above access by the packet access section 300, the packet buffer controller 260 reads the packet identifier PID of the packet data P stored in the buffer cell indicated by a read pointer RP (will be described later) for extracting buffer packet identification information PIDe, and then outputs the read packet identifier PID to the DMA bus arbitrator 210.

The packet buffering arbitrator PBA1 generates a state signal Sr1 indicating the state of each of the above components for output to the controller PBAC1. Based on the state signal Sr1, the controller PBAC1 generates a control signal Sc1 for controlling the operation of each component of the packet buffering arbitrator PBA1 for output to the packet buffering arbitrator PBA1. Control by the controller PBAC1 with the state signal Sr1 and the control signal Sc1 is known art, and therefore is not described herein.

Figure 2:
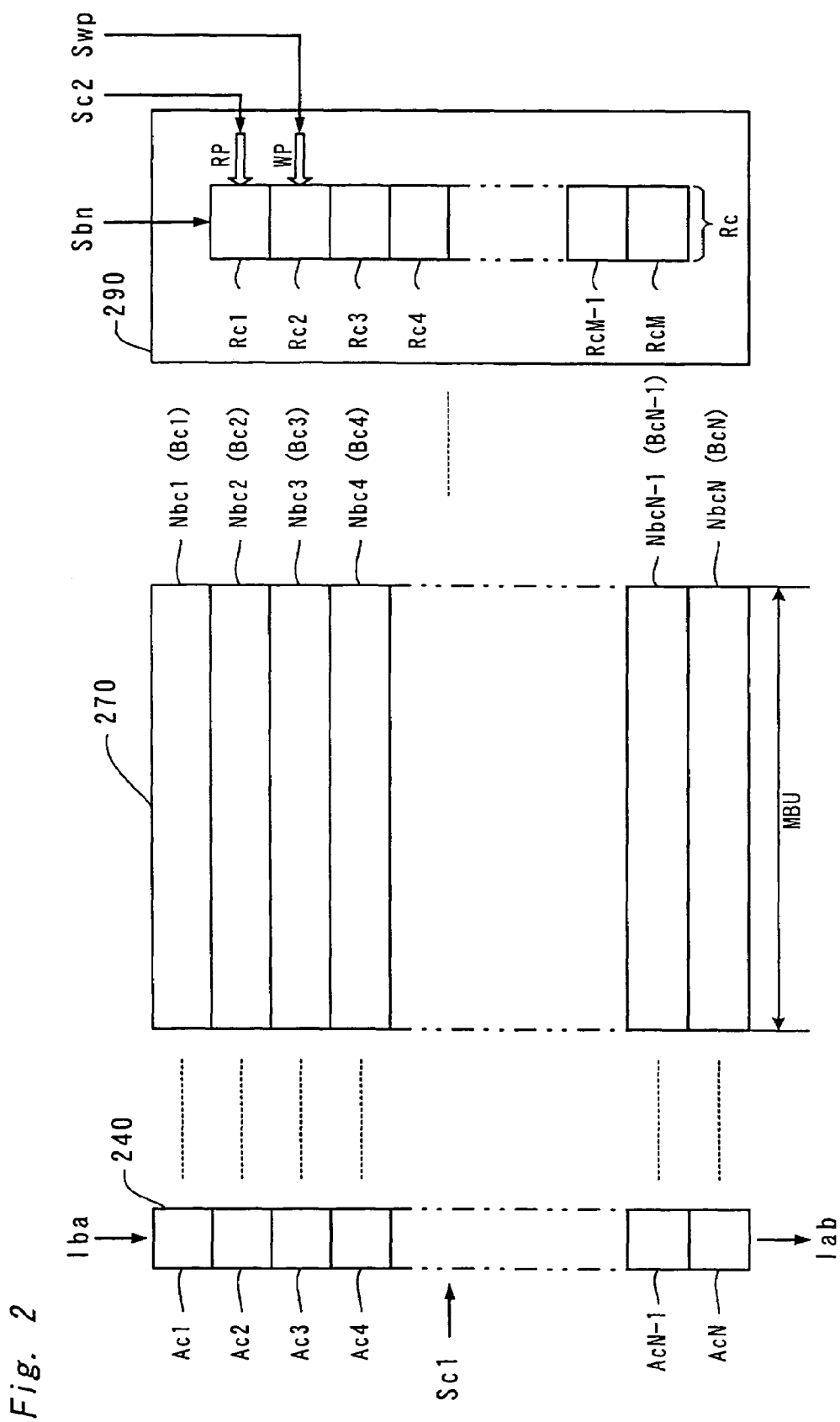
FIG. 2 is an illustration for demonstrating a correlation among a buffer cell assignment storage, a packet buffer, and a storage complete buffer cell number memory.

Next, with reference to FIG. 2, briefly described is the relation among the BC allocation information storage 240, the packet buffer 270, and the storage-completed BC No. memory 290. The packet buffer 270 includes N (N is a natural number not less than 2) buffer cells Bc1 to BcN for temporarily storing the packet data P coming by the transfer unit TSd via the TSd input start detector 220. This is because at least two different buffer cells are required, one for storing the packet data P and the other for reading the stored packet data P.

Each buffer cell can temporarily store (that is, buffer) data of a predetermined size. The capacity of the buffer cell Bc required for storing data of the predetermined size is hereinafter referred to minimum buffer capacity MBU. The minimum buffer capacity MBU is adequately set based on the size of the packet. If the minimum buffer capacity MBU is set smaller than the packet size, it is possible to control extraction of PC packet data Pc more specifically and accurately. However, the DMA bus arbitrator 210 have to carry out input/output arbitration more frequently, thereby causing increase in control and inefficiency in processing.

On the other hand, if the minimum buffer capacity MBU is set larger than the packet size (several times, for example), a single buffer cell Bc can store a plurality of packet data P. In this case, however, the plurality of packet data P stored in the single buffer cell Bc cannot be distinguished from one another, and therefore cannot be controlled or accessed individually. Therefore, the minimum buffer capacity MBU should be appropriately set based on the internal processing speed of the transport stream decoder, the input rate of the packet data P, the packet size, and the frequency of accessing the packet data P.

In the present example, the minimum buffer capacity MBU is so set as that the buffer cell can store a single packet data P, specifically, 188 bytes. Alternatively, as required, each packet data P may be provided with auxiliary data of (a) predetermined byte(s) for identifying or managing the packet data P, and both data may be stored together in the buffer cell Bc.

Still alternatively, as required, the minimum buffer capacity MBU may be set smaller than the packet size as described above. That is, the single packet may be dividedly stored in a plurality of buffer cells Bc. In this case, the minimum buffer capacity MBU is equivalent to the total of the maximum size of the divided packet data P and management bytes of management information for recording and managing division information indicating the state of division. Also, a minimum value of N is obtained by multiplying 2 by the number of divisions.

The BC allocation information storage 240 has BC allocation information areas Ac1 to AcN respectively corresponding to the buffer cells Bc1 to BcN of the packet buffer 270. In the BC allocation information area Acn (n is a natural number, where $1 \leq n \leq N$), the BC allocation information storage 240 writes allocation identification data indicating whether the corresponding buffer cell Bcn has been allocated or not. That is, the BC allocation information storage 240 has the BC allocation information areas Ac1 to AcN as many as the number of the buffer cells Bc1 to BcN of the packet buffer 270.

For example, the allocation identification data is binary data represented by 1 and 0, and its initial value is 0. In this example, when the buffer cell Bc1 is allocated, 1 is written in the BC allocation information area Ac1 corresponding to the buffer cell Bc1. On the other hand, after the data written in the buffer cell Bc1 is read, 0 is written in the BC allocation information area Ac1 based on the control signal Sc1 supplied from the controller PBAC1, thereby freeing the buffer cell Bc1. As such, the states of allocation of the respective buffer cells Bc1 to BcN of the packet buffer 270 are represented by a collection of values stored in the BC allocation information areas Ac1 to AcN. These values are supplied to the BC allocator 230 as the allocated BC information Iab.

The storage-completed BC No. memory 290 has buffer cell specifying areas Rc (Rc1 to RcM) storing a BC number NbcN specified from the buffer cells Bc1 to BcN of the packet buffer 270 (M is a natural number, where $2 \leq M \leq N$). The storage-completed BC No. memory 290 is preferably implemented by ring memory, wherein writing is sequentially and circularly carried out into the BC specifying areas Rc1 to RcM. Consequently, unlike the BC allocation information storage 240, the BC specifying area Rc does not have to be provided as many as the number of the buffer cells Bc1 to BcN, but only M BC specifying areas Rc1 to RcM are enough.

The BC specifying area Rcm (m is a natural number, where $1 \leq m \leq M$) in which the BC number Nbcn is written is indicated by the write pointer WP. The BC specifying area Rcm from which the written BC number Nbcn is read is indicated by the read pointer RP. The write pointer WP indicates the BC specifying area Rcm that is the same as or next to the location indicated by the read pointer RP. As described above, the write pointer WP is advanced based on the write point update signal Swp outputted from the storage-completed BC No. memory controller 280. The read pointer RP, on the other hand, is advanced based on the control signal Sc1 outputted from the controller PBAC1.

When the write pointer WP is advanced by one further than the location indicated by the read pointer RP, the buffer cell Bcn indicated by the read pointer RP in the BC specifying area Rcm has the complete packet data stored therein in condition for being readable therefrom. When the write pointer WP and the read pointer RP indicate the same location, that means there is no buffer cell Bcn from which data is readable.

Figure 3:
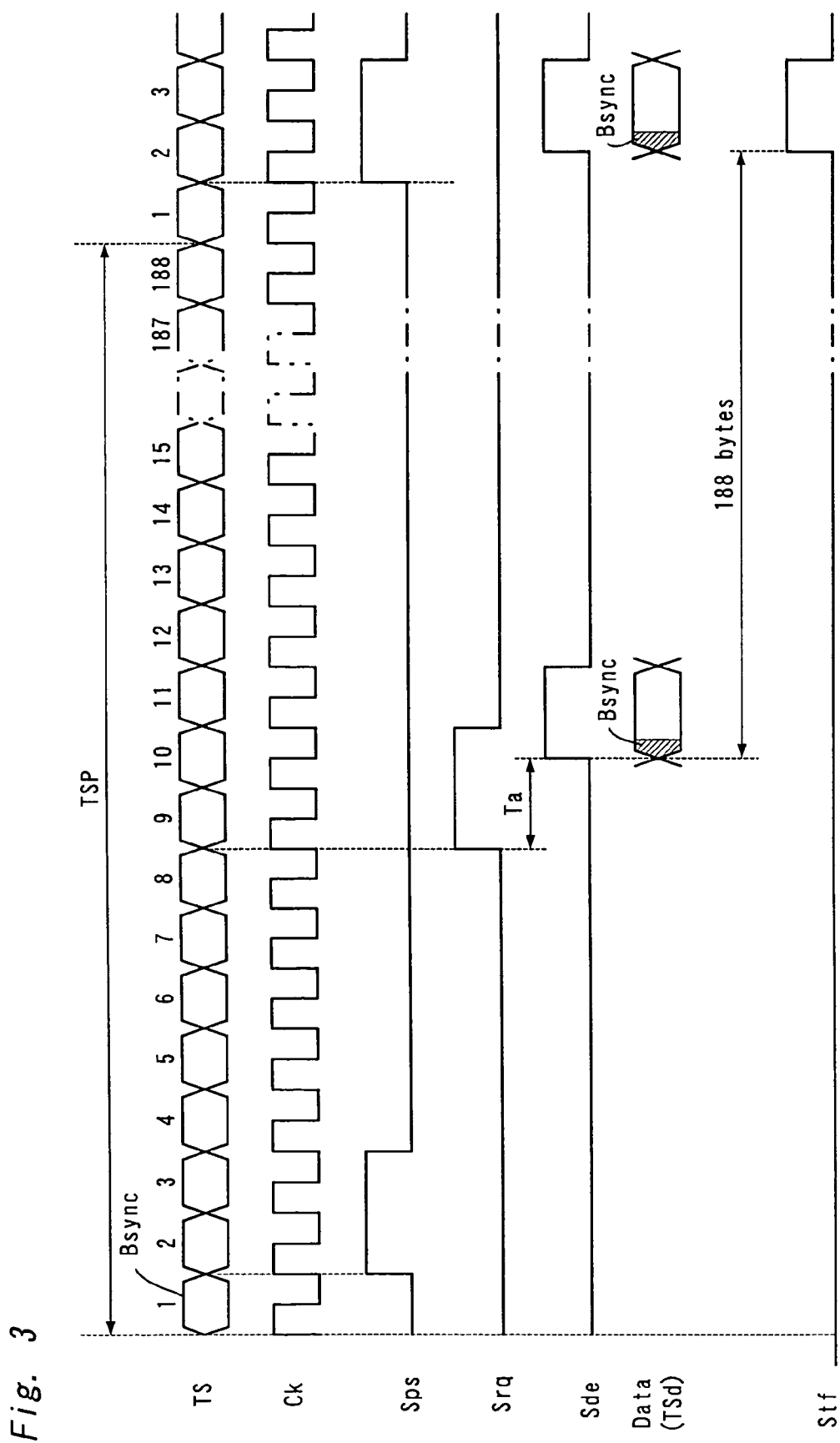
FIG. 3 is a waveform diagram showing various signals in the transport stream decoder shown in FIG. 1.

With reference to a waveform chart shown in FIG. 3, briefly described next are the operations of the stream input section TSR, the DMA bus arbitrator 210, and the packet buffer controller 260. As shown in FIG. 3, the transport stream TS composed of a plurality of 188-byte packet data P is sequentially supplied by one byte from the external transport stream source to the stream input section TSR in synchronization with an input transfer clock Ck. Although the transport stream TS may be supplied by one bit instead of one byte, the process is basically the same irrespectively of the input data unit. Therefore, described below is the case where the transport stream is supplied by one byte.

The stream input section TSR detects a packet head of every packet data P at the time of detecting the synchronous data of first one byte. Whenever detecting the packet head, the stream input section TSR generates a packet head detection signal Sps for output to the DMA bus arbitrator 210.

The stream input section TSR generates, for every eight bytes from the packet head, a request signal Srq for requesting the DMA bus arbitrator 210 to accept an input of the transfer unit TSd, and outputs the request signal Srq to the DMA bus arbitrator 210. In other words, the transfer unit TSd is eight bytes, and the request signal Srq for transfer by the transfer unit TSd is outputted for each packet (188 bytes).

In response to the request signal Srq, the DMA bus arbitrator 210 arbitrates input/output for preparing an input of the transfer unit TSd from the stream input section TSR. When prepared, that is, when a predetermined time Ta elapsed after the request signal Srq comes, the DMA bus arbitrator 210 generates a data effective signal Sde for output to the stream input section TSR. The time Ta is essentially determined based on the internal processing time taken by the DMA bus arbitrator 210 and also the data buffering apparatus DBA1, and may be variable based on the state of the data buffering apparatus DBA1.

In response to the data effective signal Sde, the stream input section TSR outputs the transfer unit TSd of the packet data P stored in the internal buffer for output to the DMA bus arbitrator 210.

Based on the write request signal Swd, the packet buffer controller 260 writes the transfer unit TSd supplied through the DMA bus arbitrator 210 and the TSd input start detector 220 in the allocated buffer cell Bc of the packet buffer 270. On writing the transfer unit TSd for one packet data P, the packet buffer controller 260 generates a transfer complete signal Stf for output to the storage-completed BC No. memory 280.

Figure 4:
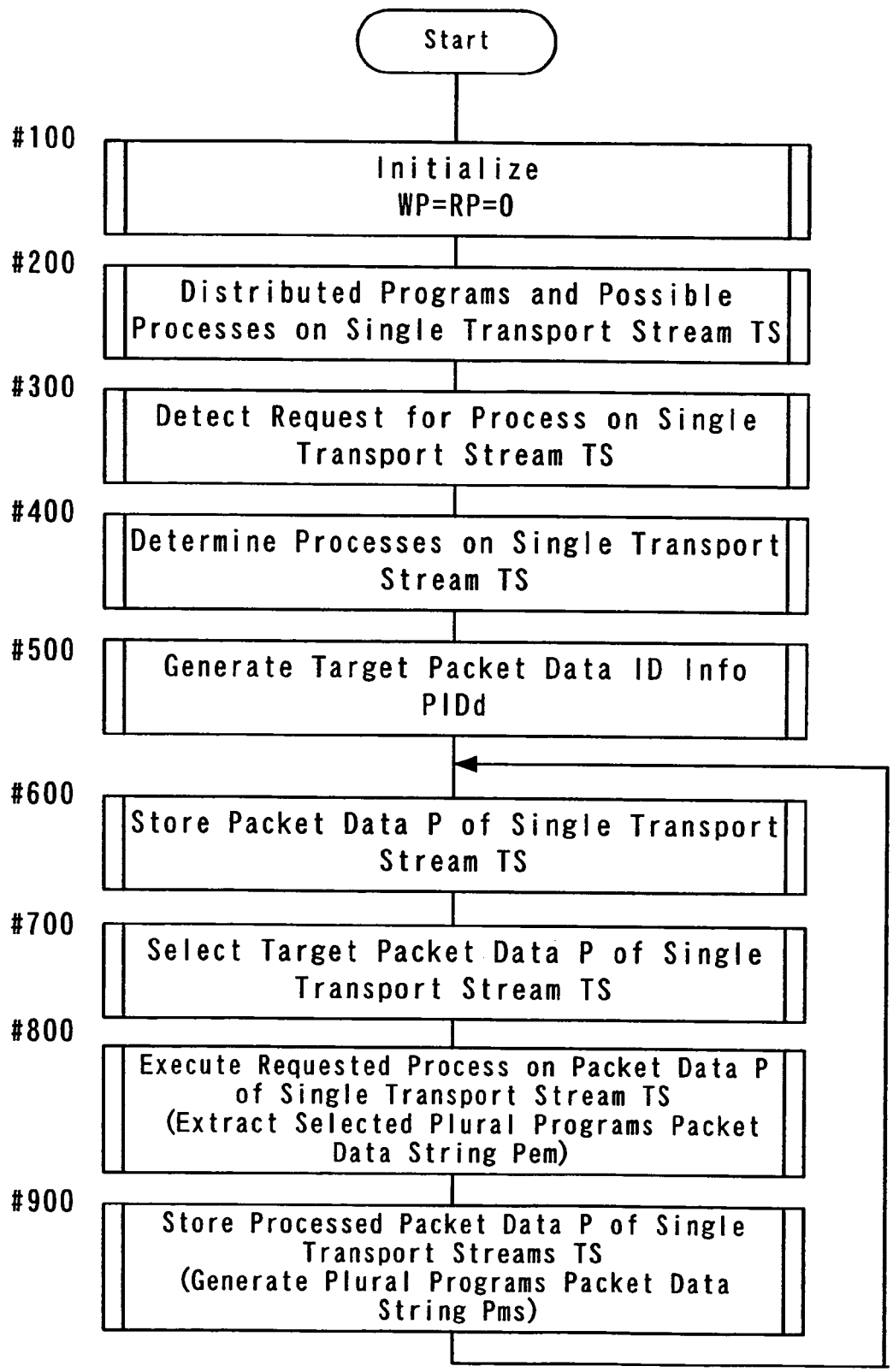
FIG. 4 is a flowchart showing the main operation of the transport stream decoder shown in FIG. 1.
Figure 5:
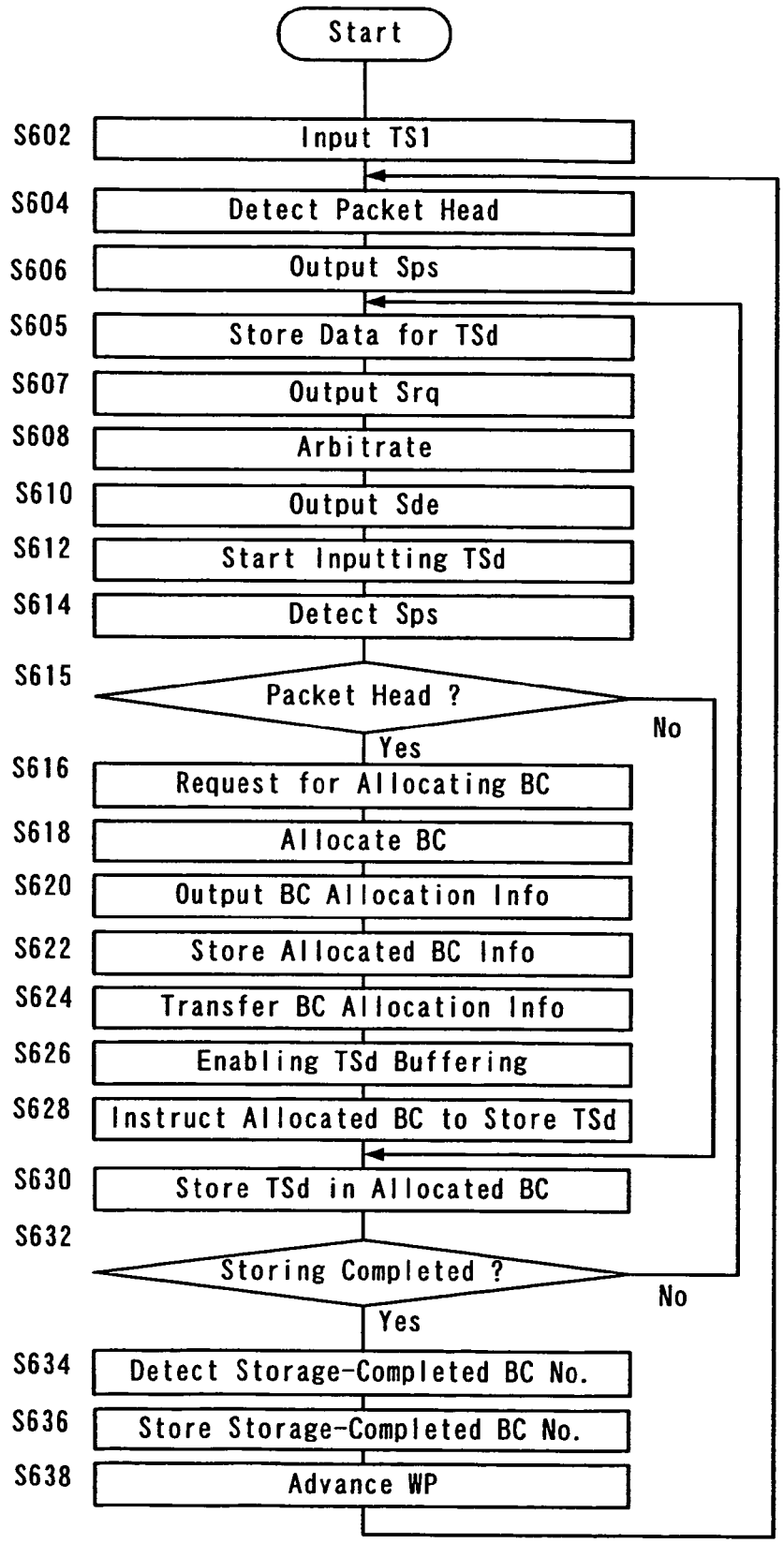
FIG. 5 is a flowchart showing the detailed operation in a subroutine for storing packet data P of a single transport stream TS shown in FIG. 4.
Figure 6:
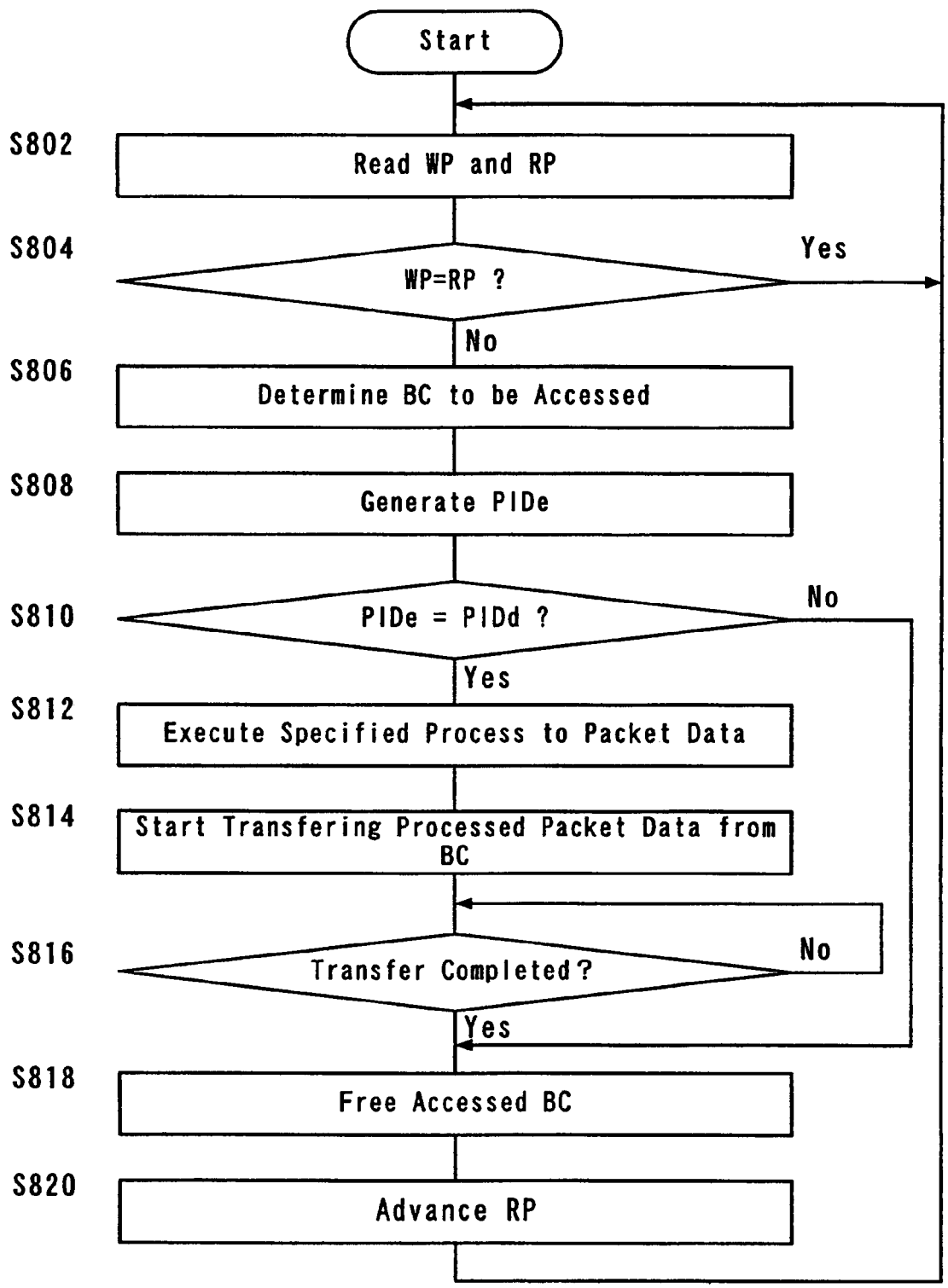
FIG. 6 is a flowchart showing the detailed operation in the subroutine for storing packet data P of the single transport stream TS shown in FIG. 4.

With reference to FIGS. 4, 5, and 6, described in detail next is the operation of the transport stream decoder TD1. As shown in a main flow of FIG. 4, the transport stream decoder TD1 is powered on for starting operation.

First, in subroutine step #100 for initialization, values indicated by the write pointer WP and the read pointer WP of the storage-completed BC No. memory 290 are set to 0.

In subroutine step #200 for presenting distributed programs and possible processes on the single transport stream TS, the distributed programs and the possible processes thereon are presented to the user. As will be described in detail later, the TD controller TDC1 reads the program association table PAT previously stored in the PAT storage area A(PAT) of the main memory 900 for generating a program presentation signal Sp1 indicating the distributed programs and processing functions providable by the transport stream decoder TD1 to the user for output to the sub-process request input section APR. Based on the program presentation signal Sp1, the sub-process request input section APR presents a list of the distributed programs and presentation functions to the user. The user operates the sub-process request input section APR for selecting a desired program and process thereon from the presented programs and process.

In subroutine step #300 for detecting a request for a process on the single transport stream TS, the sub-process request input section APR detects the process request from the user. Specifically, based on the operation by the user, the sub-process request input section APR generates a process request signal Se1 indicating the user's selection for output to the TD controller TDC1.

In subroutine step #400 for determining a process on the single transport stream TS, a specific process to be carried out by the transport stream decoder TD1 side is determined in response to the process request from the user. Specifically, based on the process request signal Se1 supplied by the sub-process request input section APR, the TD controller TDC1 generates process information typified by a program to be processed, a processing scheme, and a processing device required for the process.

In subroutine step #500 for generating target packet data identification (ID) information PIDd, target packet data ID information PIDd indicating the packet data P to be processed is generated. Specifically, based on the process information determined in step #400, the TD controller TDC1 specifies the packet identifier PID of the packet data P to be actually processed next among the packet data P composing the selected program for generating the target packet data ID information PIDd.

In subroutine step #600 for storing the packet data P of the single transport stream TS, the plurality of packet data P contained in the single transport stream TS sequentially supplied to the transport stream decoder TD1 are started to be buffered to the data buffering apparatus DBA1. Note that the plurality of packet data P are stored by a unit of the packet data P/n (n is a natural number) in the respective buffer cells Bc of the data buffering apparatus DBA1. The process in this step will be described later in detail with reference to FIG. 5. Once a predetermined number of packet data P have been stored in the buffer cells, the next step #700 starts. In other words, the process in step #700 starts with the predetermined number of buffer cells Bc, each having the packet data stored therein, of the data buffering apparatus DBA1.

In subroutine step #700 for selecting the target packet data P of the single transport stream TS, the packet data P to be processed (target packet data P) is selected from the plurality of the packet data P sequentially stored in the buffer cells Bc of the data buffering apparatus DBA1. Specifically, whether the packet data P stored in the buffer cell Bc is the one specified in step #400 is determined based on whether the packet data P has the packet identifier PID specified in step

500, thereby selecting the target packet data P. The process in this step will be described later in detail with reference to FIG. 6.

In subroutine step #800 for executing the requested process on the packet data P of the single transport stream TS, the user-requested process determined in step #400 is executed on the packet data P selected in step #700. In the first embodiment, from the plurality of packet data P of the single transport stream TS sequentially stored in the buffer cells Bc, only the PC packet data Pc selected in step #700 for specific programs is extracted, thereby extracting the selected plural programs packet data string Pem, which will be described later in detail with reference to FIG. 7. Note that the requested process is not restricted to selection and extraction of the PC packet data Pc composing the specific programs, but may be other digital processes.

In subroutine step #900 for storing the processed packet data P of the single transport stream TS, the selected plural programs packet data string Pem selected in step #800 is outputted to the main memory controller 700, where the plural programs packet data string Pms is generated.

Note that step #600 is a passive process carried out mainly by hardware, while steps #700 to #900 are positive processes carried out mainly by software. Therefore, step #600 and steps #700 to #900 are preferably constructed as a concurrent processing. For the concurrent processing, it is preferable that an appropriate number of buffer cells Bc store the packet data P in step #600 before the target packet data P selection subroutine step #770 starts. This will be described later with reference to FIG. 6.

In the drawing, however, the steps #600, #700, #800, #900 are constructed as a series of repeated processing. The operation of thus constructed processing is briefly described below. When executing the subroutine step #600 for storing the packet data P of the single transport stream TS for the first time, the transport stream decoder TD1 waits until a predetermined number of buffer cells Bc have stored the packet data P, and then sequentially carries out steps #700, #800, and #900. Then, when executing step #600 next and thereafter, the transport stream decoder TD1 waits until one buffer cell Bc (not the predetermined number of them) has stored the packet data P, and then carries out steps #700 to #900.

In this case, the predetermined number is so determined based on the processing speed of the entire data buffering apparatus DBA1 as that unallowable underflow or overflow is prevented when steps #700 to #900 are carried out by software. Therefore, a minimum value of the predetermined number is 1. In practice, ensuring that the predetermined number of buffer cells Bc have stored the packet data P is made based on the time from the time when step #600 starts to the time when step #700 starts.

Figure 12:
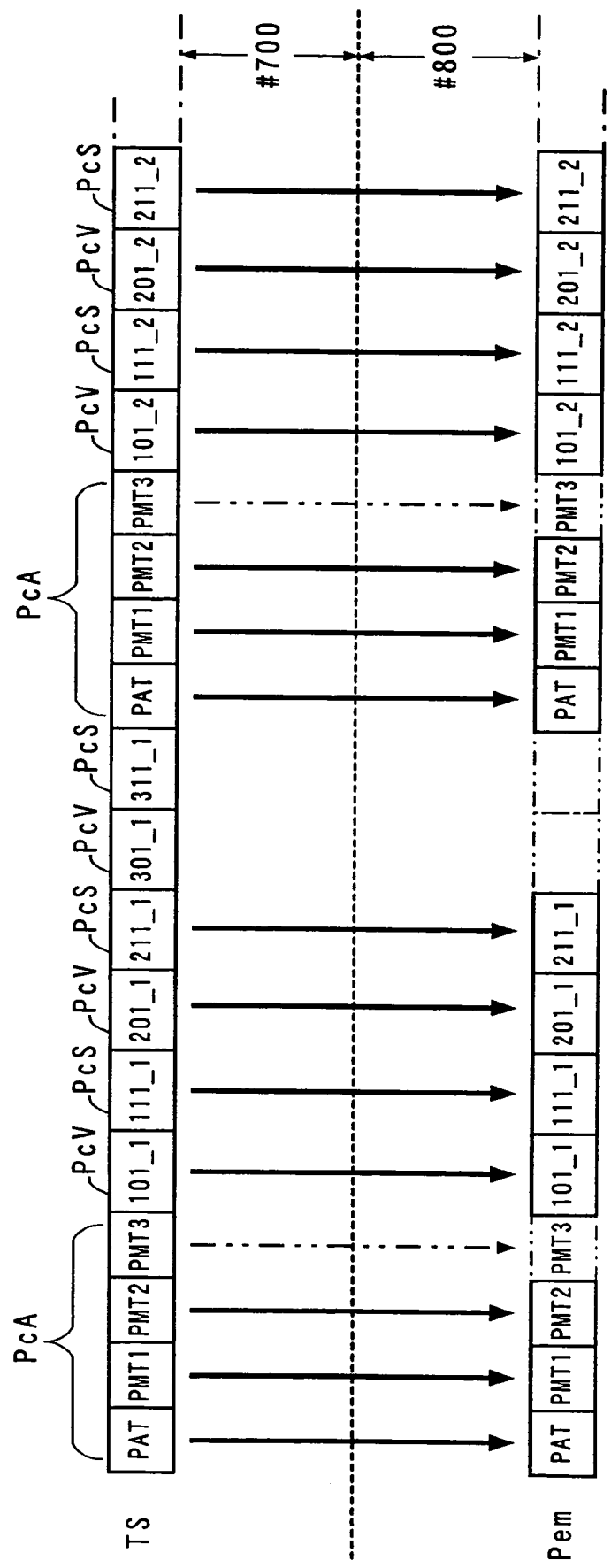
FIG. 12 is an illustration for demonstrating a relation between a subroutine for selecting a target packet data P of the single transport stream TS shown in FIG. 4 and a subroutine for executing a process of requesting to the packet data P of the single transport stream TS.

Schematically illustrated in FIG. 12 is a relation between subroutine step #700 for selecting the target packet data P of the single transport stream TS and subroutine step #800 for executing the requested process on the packet data P of the single transport stream TS. FIG. 12 is similar to FIG. 11, which has been described already, provided with an illustration indicating how steps #700 and #800 related thereto. That is, it is determined in step #700 for all respective packet data P of the transport stream TS supplied to the transport stream decoder TD1 whether the packet data P is to be processed. Then, only the packet data P as determined to be processed (illustrated with bold arrows in FIG. 12) are subjected to the user-requested process in step #800.

As described above, in the first embodiment, the user-requested process is extraction of the programs 1 and 2. Therefore, of all packet data P stored in the buffer cells Bc, only the PC packet data Pc having the packet identifiers PID of the hundreds and the two-hundreds and the management packet data PcA are selected in step #700. Then, in step #800, the selected PC packet data Pc and the management packet data PcA are outputted as they are from the buffer cells Bc to the outside of the data buffering apparatus DBA1 as the selected plural programs packet data string Pem.

If the user-requested process is process of the PC packet data Pc of a specific program, the management packet data PcA and the PC packet data Pc are selected in the above manner, and then only the PC packet data Pc composing the specific program is processed. This will be briefly described later with reference to FIG. 6.

With reference to FIG. 5, described in detail below is the operation by the packet buffer 270 in step #600 for storing the packet data P of the single transport stream TS. First, in step S602, the transport stream TS is supplied from the external transport stream supply source to the stream input section TSR. The procedure then goes to step S604.

In step S604, the stream input section TSR detects the packet head of the received transport stream TS. Specifically, the stream input section TSR detects the head of the received packet data P in consideration of the structure of the received transport stream TS based on a transport stream structure signal Sts supplied from the TD controller TDC1. The procedure then goes to step S606.

In step S606, the stream input section TSR outputs the packet head detection signal Sps to the DMA bus arbitrator 210. The packet head detection signal Sps goes through the DMA bus arbitrator 210 to the TSd input start detector 220. The procedure then goes to the next step S605.

In step S605, the stream input section TSR stores in its incorporated input buffer the packet data subsequent to the packet head. After storage of the transfer unit TSd has been completed, the procedure goes to the next step S607. Note that the capacity of the input buffer incorporated in the stream input section should be appropriately determined based on the transfer rate of the input stream, etc. so as not to fail to store the input packet data, at least larger than the transfer unit TSd.

In step S607, the steam input section TSR outputs the request signal Srq to the DMA bus arbitrator 210. The procedure then goes to the next step S608.

In step S608, the DMA bus arbitrator 210 carries out arbitration based on the request signal Srq for preparing an input of the packet data P by the transfer unit TSd. The procedure then goes to the next step S610.

In step S612, in response to the data effective signal Sde, transfer of the packet data P by the transfer unit TSd from the stream input section TSR to the DMA bus arbitrator 210 is started. The transfer unit TSd goes through the DMA bus arbitrator 210 to the TSd input start detector 220. The procedure then goes to the next step S614.

In step S614, the TSd input start detector 220 detects, based on the packet head detection signal Sps supplied in step S606, that the transfer unit TSd has been started to be inputted. That is, data for one packet is repetitively transferred by the transfer unit TSd from the stream input section TSR. Therefore, by detecting the transfer unit TSd first coming after the input of the packet head detection signal Sps, the start of input of packet data P can be detected. The procedure then goes to the next step S615.

In step S615, the TSd input start detector 220 determines whether the packet head has been inputted. That is, as described above, the TSd input start detector 220 determines that the packet head has been inputted when the transfer unit TSd first comes after the packet head detection signal Sps comes. The procedure then goes to the next step S616. If No in this step, that is, if it is determined that the transfer unit TSd subsequent to the packet head has been inputted, the procedure goes to step S630, which will be described later.

In step S616, the TSd input start detector 220 generates a BC request signal Sba for output to the BC allocator 230, and also generates a write enable signal Sw for output to the destination BC specifier 250. The procedure then goes to the next step S618.

In step S618, based on the allocated BC information Iab supplied from the BC allocation information storage 240, the BC allocator 230 allocates a buffer cell Bc to be written with the transfer unit TSd being transferred in step S612. The procedure then goes to the next step S620.

In step S620, the BC allocator 230 generates the BC allocation information Iba indicating the buffer cell Bc allocated in step S612 for output to the BC allocation information storage 240. The procedure then goes to the next step S622.

In step S622, the BC allocation information storage 240 generates and stores the allocated BC information Iab based on the BC allocation information Iba. The procedure then goes to the next step S624.

In step S624, the BC allocation information storage 240 outputs the BC allocation information Iba supplied from the BC allocator 230 to the destination BC specifier 250 and the storage-completed BC No. memory controller 280. The procedure then goes to the next step S626.

In step S626, the TSd input start detector 220 generates a write enable signal Sw for enabling writing of the transfer unit TSd in the buffer cell Bc of the packet buffer 270, and then outputs the generated write enable signal Sw to the destination BC specifier 250. The procedure then goes to the next step S628.

In step S630, the packet buffer controller 260 writes (stores) the transfer unit TSd of the packet data P coming through the TSd input start detector 220 in the buffer cell Bc specified by the write request signal Swd (BC allocation information Iba). The procedure then goes to the next step S632.

Note that the process in step S630 slightly differs in meaning depending on whether the immediately preceding process is step S628 or step S615. That is, first consider a case where the transfer rate TSd of arbitrary packet data P is first stored in an arbitrary buffer cell Bc. In this case, the procedure goes through the above described steps S615, S616, S618, S620, S622, S624, S626, and S628, wherein a target buffer cell is allocated and prepared for use. Then, in step S630, the first transfer unit TSd of the packet data P is stored in the prepared buffer cell Bc. Specifically, in step S628, the destination buffer cell specifier 250 responds to the write enable signal Sw to generate the write request signal Swd for requesting for writing in the allocated buffer cell Bc specified by the BC allocation information Iba, and outputs the write request signal Swd to the packet buffer controller 260. In response to the write request signal Swd, the packet buffer controller 260 outputs the transfer unit TSd supplied through the TSd input start detector 220 to the packet buffer 270. Consequently, the first transfer unit TSd of the packet data P is stored in the allocated buffer cell Bc. The procedure then goes to the next step S632.

Next, consider the other case where the transfer unit TSd subsequent to the first transfer unit TSd of the packet data is also stored in the same buffer cell Bc. In this case, the procedure skips the above described steps S616, S618, S620, S622, S624, S626, and S628, wherein a target buffer cell is allocated and prepared for use. That is, the procedure jumps from step S615 directly to step S630. In step S630, the subsequent transfer unit TSd is stored in the buffer cell Bc currently being used. Then, the procedure goes to the next step S632.

In step S632, it is determined whether the allocated buffer cell Bc has one packet data P stored therein. If not stored, No is determined, and the procedure returns to the above described step S605, repeating steps S605 to S630 to continue storing the transfer unit TSd of the packet data P. That is, the request Srq is outputted for each transfer TSd from the stream input section TSr to the DMA bus arbitrator 210 (step S607). In response to the request signal Srq, the DMA bus arbitrator 210 carries out arbitration (step S608) and outputs the data effective signal Sde to the stream input section TSR (step S610). In response to the data effective signal Sde, the stream input section TSR starts transferring the subsequent transfer unit TSd of the packet data (step S612), thereby continuously storing the subsequent transfer rate TSd in the allocated buffer cell Bc (steps S615, S630). As such, the procedure is repetitively carried out.

During the above procedure, the packet buffer controller 260 counts the number of bytes of the data written in the buffer cell Bc for detecting whether the transfer units TSd of one packet data P have been stored. The packet buffer controller 260 generates a transfer complete signal Stf for output to the storage-completed BC No. memory controller 280. The count number is obtained from the data size of the packet data P of the input transport stream TS, the data size indicated by the transport stream structure information previously stored in the TD controller TDC1. Then, at the time of completing storage of one packet data P, Yes is determined in this step S632, and the procedure goes to the next step S634.

In step S634, based on the transfer complete signal Stf and the BC allocation information Iba, the storage-completed BC No. memory controller 280 generates a BC number signal Sbn indicating the buffer cell Bc that has completed storage of one packet data P therein. That is, the BC number signal Sbn indicates the BC number Nbc of the buffer cell Bc indicated by the BC allocation information Iba when the transfer complete signal Stf is supplied. The procedure then goes to the next step S636.

In step S636, the storage-completed BC No. memory 290 records the BC number Nbc indicated by the BC No. signal Sbn in an area indicated by the write pointer WP. The procedure then goes to the next step S638.

In step S638, the storage-completed BC number memory controller 280 outputs the write point update signal Swp to the storage-completed BC No. memory controller 280 for advancing the write pointer P of the storage-completed BC No. memory controller 280 by one. The procedure then returns to the above step S604 for preparing storage of the subsequent packet data P.

With reference to a flowchart shown in FIG. 6, described next is the process in the above step #800 carried out by the data buffering apparatus DBA1 for executing the requested process. Note that, the procedure shown in the drawing can be applied to both of the concurrent processing of step #600 and steps #700 to #900 and the sequential processing of these steps.

First, in step S802, the TD controller TDC1 reads values of the write pointer WP and the read pointer RP from the storage-completed BC No. memory 290. The write pointer WP is a parameter alternatively indicating the buffer cell Bc in which the sequentially-supplied packet data P of the transport stream TS is written. The read pointer RP is a parameter indicating a buffer cell from which the data is read.

In step S804, the TD controller TDC1 determines whether the values of the write pointer WP and the read pointer RP read in step S802 are equal. If equal, it is determined Yes, that is, it is determined that a specific buffer cell Bc is being used. The procedure then returns to the above step S804. The procedure in step S804 is to prevent access to the packet data P not completely stored yet in the buffer cell.

On the other hand, in step S804, if not equal, it is determined No, that is, it is determined that no buffer cell is being used. This means that there is a buffer cell that stores the complete packet data P. In other words, at least one packet data P to be processed upon request from the user is stored in the packet buffer 270. The procedure then goes to the next step S806.

With steps S804 and S806 structured as described above, the procedure can be applied to both of the concurrent processing of step #600 and steps #700 to #900 and the sequential processing of these steps. That is, in the concurrent processing, it is possible to prevent the user-requested process from being executed if the appropriate number of packet data P have not been stored in the packet buffer 270 (at worst, no buffer cells store the complete packet data P). In the sequential processing, completion of storage in the predetermined number of buffer cells Bc can be ensured by differing the starting time of step #600 from that of step #700. Even with this, however, abnormality in storage of the packet data may occur for some reason on the transmission path of the transport stream TS or other. Even in such cases, the procedure shown in FIG. 6 can prevent abnormality in processing due to underflow.

In step S806, the buffer cell Bc to be accessed is determined for checking whether the stored packet data P to be processed is actually to be processed. Specifically, the TD controller TDC1 reads the BC number Nbcn from the BC specifying area Rc indicated by the read pointer RP. When it is determined in step S810 (will described later) that the packet data P is to be processed, the buffer cell Bc determined in step S806 is accessed again in step S814 (will described later) for carrying out the user-requested process on the packet data P. After step S806, the procedure goes to the next step S808.

In step S808, from the packet data P stored in the buffer cell Bcn (the packet buffer 270) corresponding to the BC number Nbcn read in step S806, the packet identifier PID of the packet data P is read, and then buffer packet ID information PIDe is generated. The procedure then goes to step S810.

In step S810, it is determined whether the buffer packet ID information PIDe generated in step S808 matches the target packet data ID information PIDd generated in the above step #500. Specifically, it is determined whether the packet identifier PID indicated by the buffer packet ID information PIDe is included in the target packet data ID information PIDd. If Yes, that is, if the packet data P currently being accessed is to be the subject of the user-requested process, the procedure goes to the next step S812. At this time, the packet data P stored in the buffer cell Bc is determined as the target packet data.

In step S812, the process determined in the above step #400 is executed onto the packet data currently being accessed. In the first embodiment, the user-requested process is extraction of only the programs 1 and 2 from the transport stream TS. Therefore, the process to be executed in step S812 is, specifically, determination of whether the packet data P has the packet identifier PID defined by the program map table PMT1 or PMT2. This process, however, has been executed in step S810. Therefore, in the first embodiment, the packet data P is substantially not subjected to any process in step S812. The procedure then goes to the next step S814.

In step S814, the packet data P appropriately processed in steps S810 and S812 in response to the user's request is read from the buffer cell BcN by the transfer unit TSd. Then, transfer of the packet data P is started through the packet buffer controller 260 to the DMA bus arbitrator 210. The procedure then goes to the next step S816.

In step S816, the TD controller TDC1 counts the number of bits of every transfer unit TSd started to be transferred in step S814 for repeatedly determining whether data transfer to the DMA bus arbitrator 210 has been completed. When it is determined that data transfer has been completed, the procedure goes to the next step S818. As such, carrying out the user-requested process on one packet data P is completed through steps S802 to S816. The procedure then goes to the next step S818.

On the other hand, if No in step S810, that is, if it is determined that the packet data P currently being accessed is not the subject of the user-requested process, the procedure skips the above steps S812, S814, and S816, and goes directly to step S818. As such, in step S810, based on whether the buffer packet ID information PIDe matches the target packet data ID information PIDd, it is determined for every packet data P contained in the sequentially input transport stream TS whether the packet data P is the subject of the process. Then, only the packet data P to be processed (target packet data) is selected for being subject to the user-requested process in step S812. Then, in steps S814 and S816, the processed packet data P is outputted outside of the data buffering apparatus DBA1.

In step S818, the buffer cell corresponding to the BC number Nbcn indicated by the read pointer RP is freed. Specifically, allocation identification data written in the BC allocation information Acn corresponding to the BC number Nbcn read in step S806 is rewritten as "not allocated". The procedure then goes to the next step S820.

In step S820, the TD controller TDC1 advances the read pointer RP in the storage-completed BC number memory 290 by one. Thus, the subsequent packet data P is set as the target packet data for the user-requested process.

As described above, for selectively carrying out the user-desired process on a plurality of programs included in a sequentially supplied single transport stream TS, only the packet data P corresponding to the programs are subjected to the process. For this purpose, it should be ensured the sequentially supplied plurality of packet data P be processed for a predetermined time period.

Therefore, in the first embodiment, each packet data P is confined in a predetermined buffer cell Bc for the predetermined time period, and this process is managed by the write pointer WP. Then, it is determined whether the confined packet data P is the target packet data and, if it is the target packet data, the packet data P is processed and then outputted. This process is managed by the read pointer RP. This series of operation is controlled and ensured by a hybrid of hardware and software.

In the first embodiment of the present invention, as described above with reference to FIG. 7, the transport stream TS is constructed by plurality of packet data P each provided with the unique packet identifier PID. Such transport stream TS can be so processed by the transport stream decoder TD1 according to the first invention such that every packet data P constructing transport stream TS is processed differently.

However, the transport stream TS typically as stipulated in ISO/IEC 13818-1 (MPEG2 system) does not have every packet data P provided with the unique packet identifier PID. The unique packet identifier PID is provided for every packet data group of a different content of the packet data P.

Figure 9:
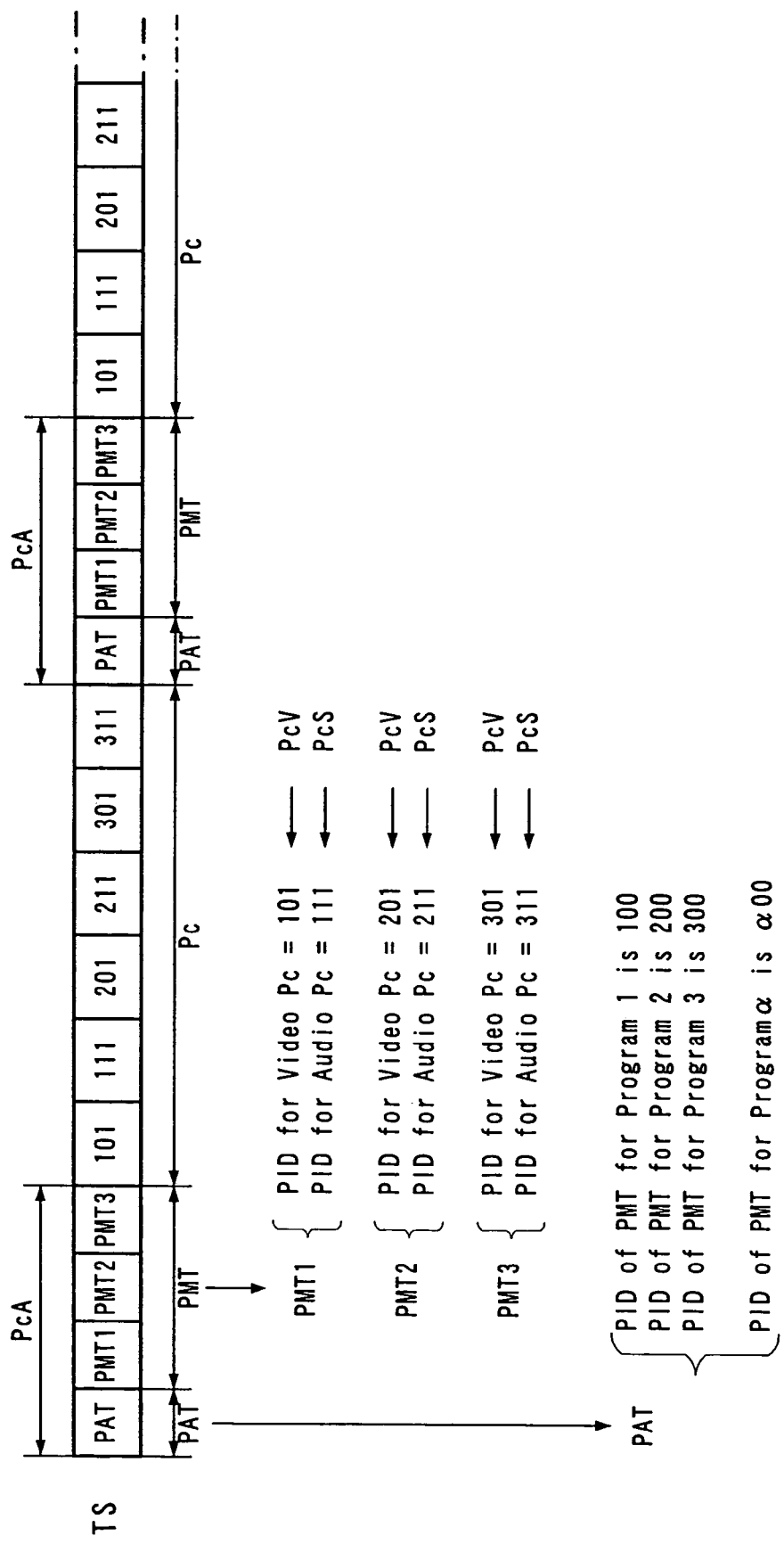
FIG. 9 is an illustration for demonstrating the structure of a transport stream stipulated in ISO/IEC 13818-1 (MPEG2 system) supplied to the transport stream decoder shown in FIG. 1.

Illustrated in FIG. 9 is an example packet structure of the transport stream TS provided for every packet data group with the packet identifier PID. As with the example illustrated in FIG. 7, each packet data P constructing the transport stream TS is illustrated as one rectangle. These packet data P can be classified into a plurality of program content (PC) packet data Pc forming a program content for each of a programs, a program management table PMT describing the packet identifiers of the PC packet data Pc for each program, and a program association table PAT for describing the program management tables PMT corresponding to the programs.

Illustrated in FIG. 9 is the example structure of the transport stream TS when at least three different programs 1, 2, and 3 are distributed ($\alpha \geq 3$). All packet data P whose packet identifier PID is 101 are defined as program content (PC) packet data Pc101 being video data for the program 1. All packet data P whose packet identifier PID is 111 are defined as PC packet data Pc111 being audio data for the program 1.

Similarly, all packet data P whose packet identifier PID is 201 are defined as PC packet data Pc201 being video data for the program 2. All packet data P whose packet identifier PID is 211 are defined as PC packet data Pc211 being audio data for the program 2.

Furthermore, all packet data P whose packet identifier PID is 301 are defined as PC packet data Pc301 being video data for the program 3. All packet data P whose packet identifier PID is 311 are defined as PC packet data Pc311 being audio data for the program 3.

As such, the transport stream TS illustrated in FIG. 9 is similar in structure to that in FIG. 7, except that the unique packet identifier PID is provided not for every packet data P constructing the transport stream TS but for every type of the packet data P. In principle, the plurality of packet data P having the same packet identifier PID are arranged in the order in which they are presented, to form a stream. Consequently, the receiving side carries out a predetermined process on the respective packet data P of the sequentially supplied transport stream TS in the order in which they come, thereby extracting the information.

Described next is the operation when the transport stream TS having the above packet structure is supplied to the transport stream decoder TD1 according to the first embodiment of the present invention. Providing the unique packet identifier PID to each packet data group by each content of the packet data P is substantially the same as providing only the upper three digits of the packet identifier PID of the packet data P to the transport stream TS illustrated in FIG. 7. That is, also in the present example, by extracting the PC packet data Pc101 and Pc201, it is possible to generate plural program (PP) video packet data string substantially the same in packet structure as the video packet data PcV illustrated in FIG. 8. Similarly, by extracting the PC packet data Pc111 and Pc211, it is possible to generate plural program (PP) audio packet data string substantially the same in packet structure as the audio packet data PcS illustrated in FIG. 8.

However, the target packet data ID information PIDd generated in the TD controller TDC1 and the buffer packet ID information PIDe read from the packet data P stored in the buffer cell Bc both indicate a packet data group. Therefore, when the packet determiner 400 determines that the buffer packet ID information PIDe matches the target packet data ID information PIDd, all packet data P that belong to the packet data group having the packet identifier PID determined as matched are subjected to the same process. This process is substantially the same as the process where, by specifying the upper some digits of the packet identifiers PID of all packet data P of the transport stream TS illustrated in FIG. 7, the packet data P having the packet identifier PID of the same upper digits are collectively subjected to the unique process as a group.

Second Embodiment

With reference to FIGS. 15, 16, 17, 18, 19, 20, 21, 22, 23, 24, 25, and 26, described below is a data buffering apparatus according to a second embodiment of the present invention. In the second embodiment, a packet data processing determination apparatus according to the present invention is described as a data buffering apparatus used in a transport stream decoder for selectively extracting content data of a plurality of programs contained in a plurality of transport streams TS.

Figure 24:
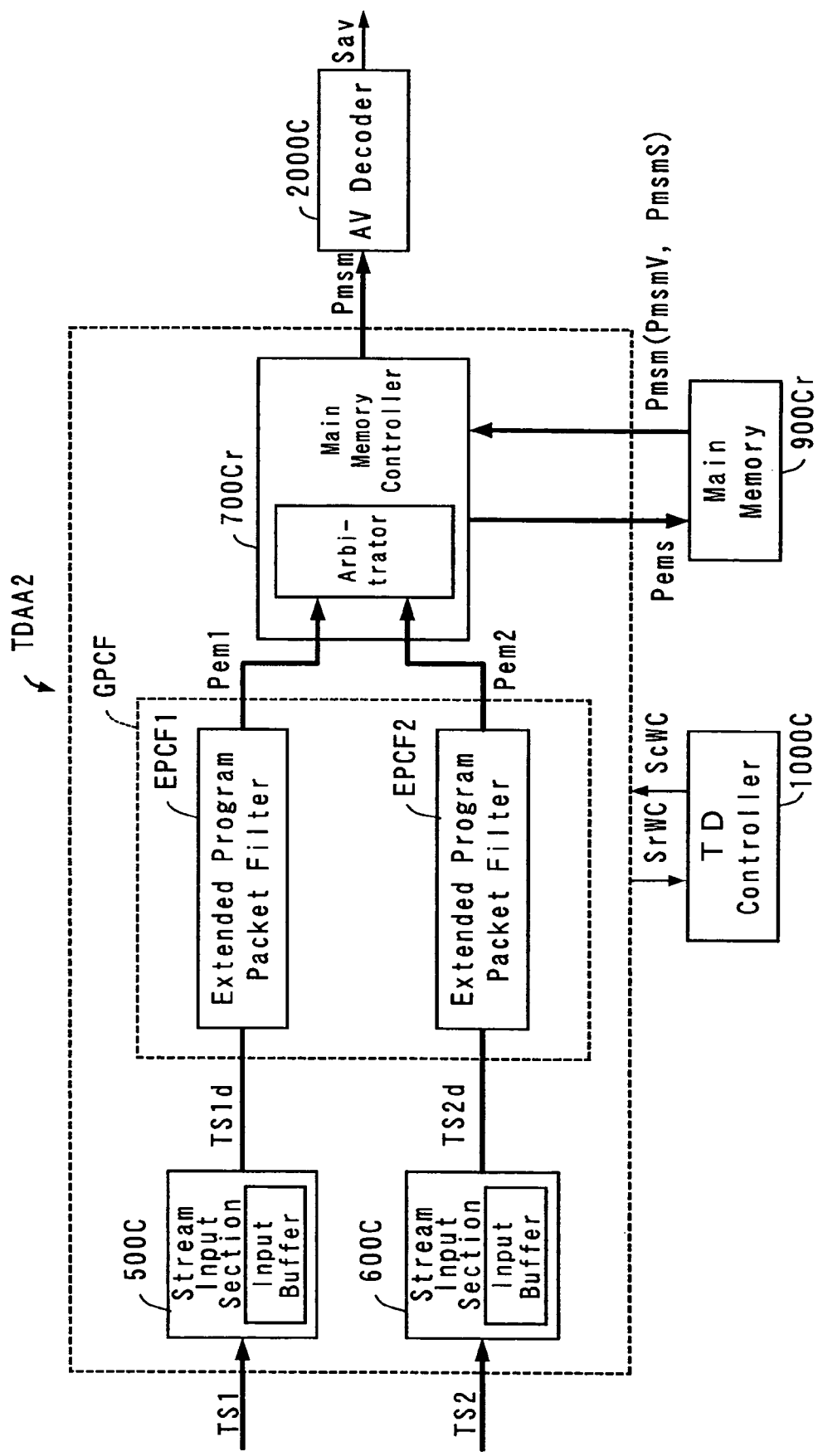
FIG. 24 is a block diagram showing the structure achieved mainly by hardware and similar in function to the transport stream decoder shown in FIG. 15.

Described first is a basic concept of the transport stream decoder having the packet data processing determination apparatus incorporated according to the second embodiment therein. Illustrated in FIG. 24 is a second example improvement of the conventional transport stream decoder TDAc (for extracting a single program from a single transport stream TS) shown in FIG. 33, the improvement being adapted for extracting a plurality of programs from a plurality of transport streams TS1 to TSε (ε is an arbitrary integer not less than 2) according to the second embodiment.

A transport stream decoder TDAA2 of the second example improvement is basically similar in construction to the transport stream decoder TDAA1 of the first example improvement illustrated in FIG. 10, except that the extended program packet filter EPCF is replaced with a program packet filter group GPCF, the main memory controller 700C is replaced with an arbitrator-added main memory controller 700Cr, the main memory 900C is replaced with main memory 900Cr, and a stream input section 600 is newly provided.

Figure 20:
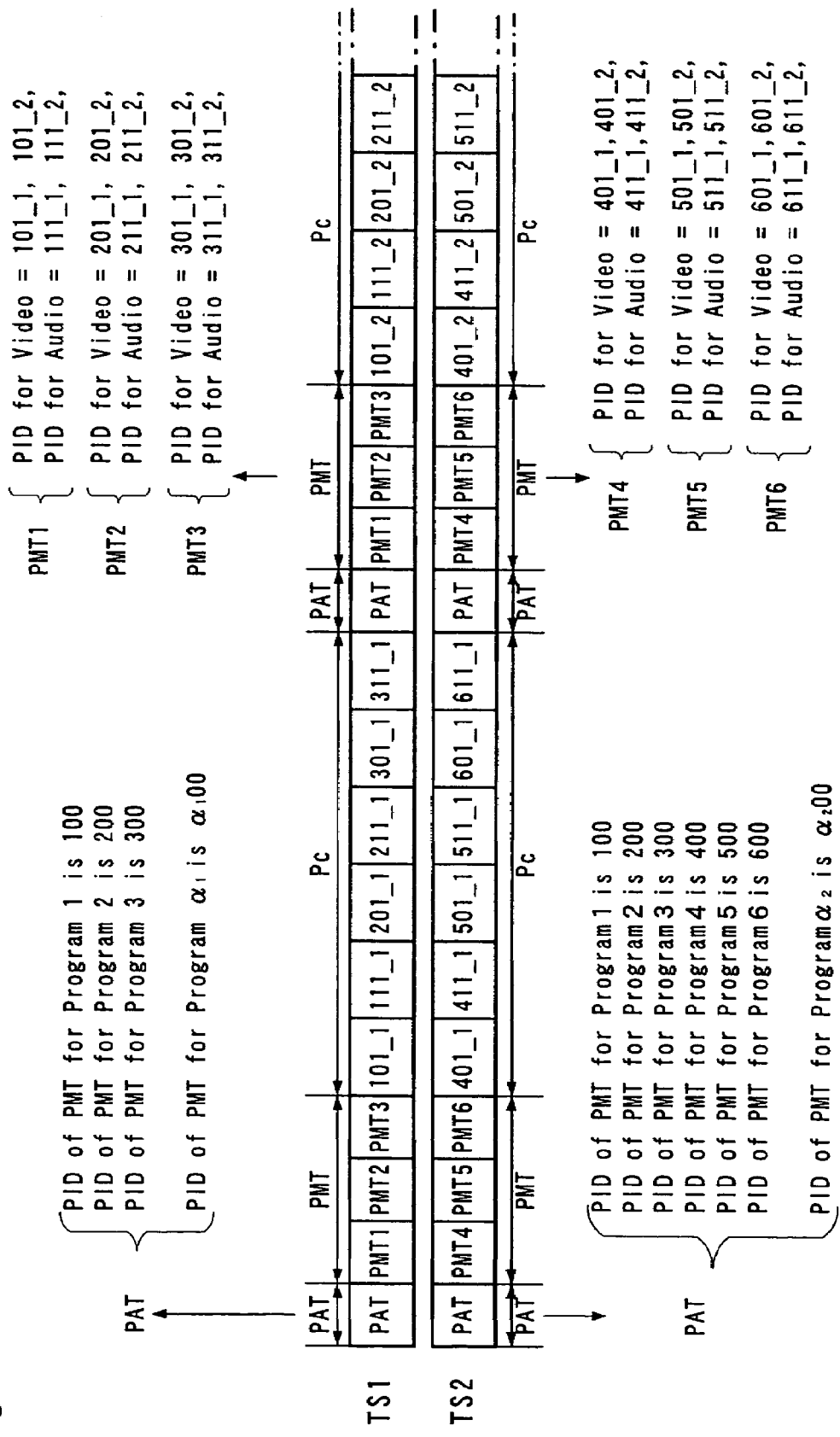
FIG. 20 is an illustration for demonstrating the structure of two transport streams supplied to the transport stream decoder shown in FIG. 15.
Figure 25:
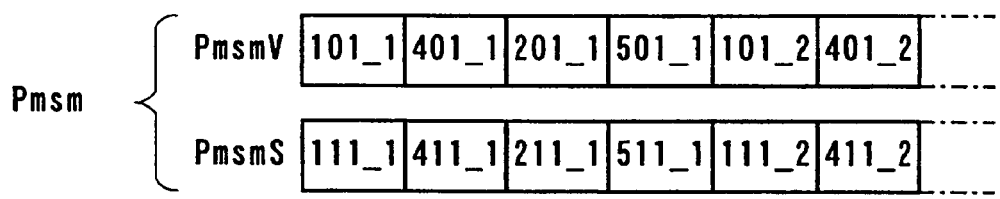
FIG. 25 is an illustration for demonstrating a complex plural program packet data string obtained by the transport stream decoder shown in FIG. 24 extracting the program contents packet data and the management packet data of four programs from two single transport streams having the packet structure shown in FIG. 23.
Figure 26:
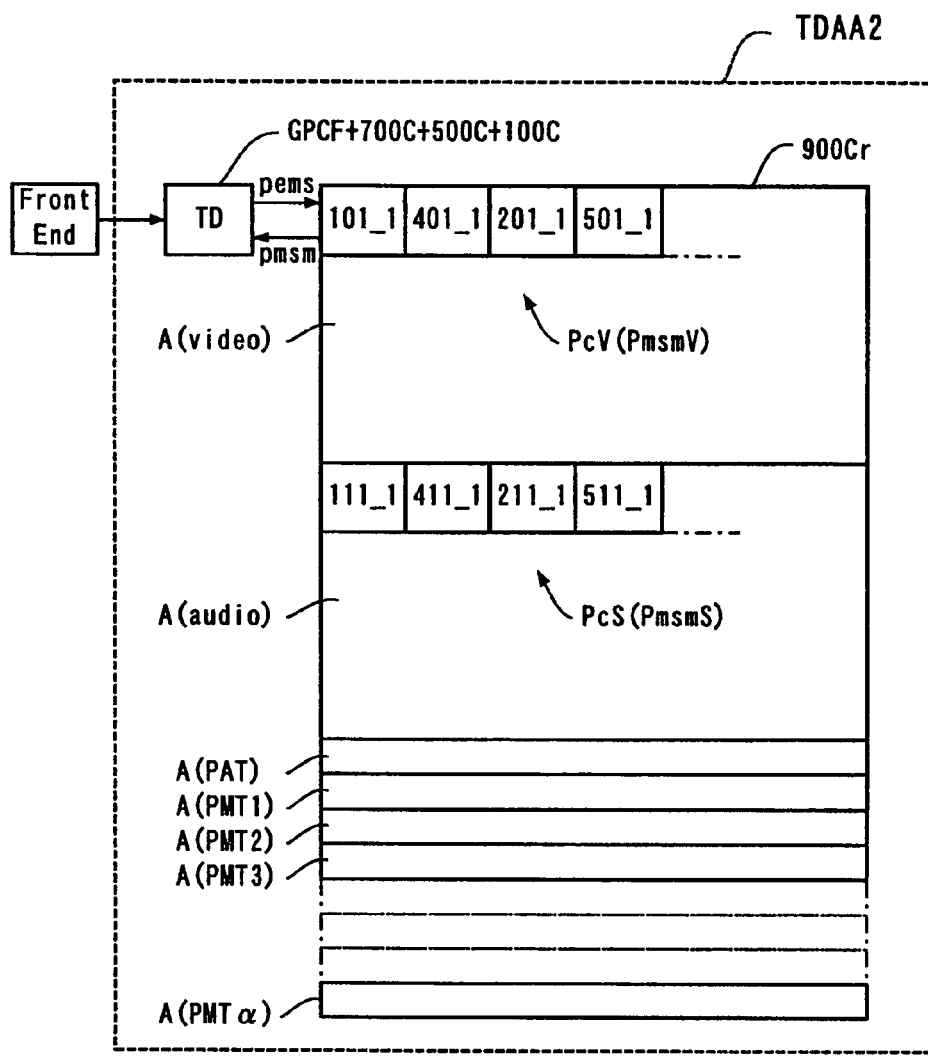
FIG. 26 is a schematic illustration showing how the complex selected plural program packet data string is stored in main memory shown in FIG. 24.

Prior to description of the program packet filter group GPCF, the arbitrator-added main memory controller 700Cr, and the stream input section 600, described is the operation of the transport stream decoder TDAA2 with reference to FIGS. 20, 25, and 26.

With reference to FIG. 20, described is the structure of two transport streams inputted to the transport stream decoder TDAA2, these transport streams each providing a plurality of program contents. Illustrated in FIG. 20 are an example structure of a first transport stream TS1 providing at least three different programs 1, 2, 3, . . . , α1, and an example structure of a second transport stream TS2 providing at least six different programs 1, 2, 3, 4, 5, 6, . . . , α2.

Note that, in the second embodiment, the programs 1, 2, and 3 in the second transport stream TS2 are different from those in the first transport stream TS1, but may be the same. Also note that the programs 1, 2, and 3 in the second transport stream TS2 are not illustrated in the drawing as space does not permit.

As such, the plurality of transport streams TS inputted to the transport stream decoder TDAA2 have the same program having the same program number. Furthermore, the packet data P is provided with a packet identifier PID for each transport stream TS. Therefore, the plurality of transport streams TS have the same packet data P having the same packet identifier PID.

In the first transport stream TS1, program content (PC) packet data Pc101_1, Pc101_2, . . . are video data composing the program 1, and PC packet data Pc111_1, Pc111_2, . . . are audio data composing the program 1. Similarly, PC packet data Pc201_1, Pc201_2, . . . are video data composing the program 2, and PC packet data Pc211_1, Pc211_2, . . . are audio data composing the program 2. Furthermore, PC packet data Pc301_1, Pc301_2, . . . are video data composing the program 3, and PC packet data Pc311_1, Pc311_2, . . . are audio data composing the program 3.

In the second transport stream TS2, PC packet data P401_1, Pc401_2, . . . are video data composing the program 4, and PC packet data Pc411_1, Pc411_2, . . . are audio data composing the program 4. Similarly, PC packet data Pc501_1, Pc501_2, . . . are video data composing the program 5, and PC packet data Pc511_1, Pc511_2, . . . are audio data composing the program 5. Furthermore, PC packet data Pc601_1, Pc601_2, . . . are video data composing the program 6, and PC packet data Pc611_1, Pc611_2, . . . are audio data composing the program 6.

Note that, needless to say, the number of transport streams TS inputted to the transport stream decoder TDAA2 may be three or more, and the number of programs provided by each transport stream may be three or more. The transport stream TS contains PC packet data Pc corresponding to the programs provided. Depending on the program, the transport stream TS may contain PC packet data Pc corresponding to data other than video and audio (teletext information, for example).

Note that the first and second transport streams TS1 and TS2 each contain the program association tables PAT and the program map table PMT arranged among the PC packet data Pc at frequencies determined by the transmission path and processing factors.

In the first transport stream TS1, arranged preceding to the PC packet data Pc101_1, Pc111_1, Pc201_1, Pc211_1, Pc301_1, and Pc311_1 of the programs 1, 2, and 3 are the program map tables PMT1, PMT2, and PMT 3 describing the packet identifiers PID of all programs, and the program association table PAT indicating the relation between the respective packet identifiers PID in the program map tables PMT and the corresponding programs.

The program association table PAT describes that the packet identifier PID of the packet map table PMT for the program 1 is 100, the one for the program 2 is 200, and the one for the program 3 is 300, . . . , the one for the program α1 is α100.

In the second transport stream TS2, arranged preceding to the PC packet data Pc401_1, Pc411_1, Pc501_1, Pc511_1, Pc601_1, and Pc611_1 of the programs 4, 5, and 6 are program map tables PMT4, PMT5, and PMT 6 describing the packet identifiers PID of all programs, and a program association table PAT indicating the relation between the respective packet identifiers PID in the program map tables PMT and the corresponding programs.

The program association table PAT describes that the packet identifier PID of the packet map table PMT for the program 4 is 400, the one for the program 5 is 500, and the one for the program 6 is 600, . . . , the one for the program α2 is α200.

How frequently the packet data P contained in the transport stream TS arrives greatly varies depending upon its type. Therefore, the program association table PAT, the program map table PMT, the PC packet data Pc, and other packets may be variously arranged in the transport stream TS, as with the case where a single transport stream TS is supplied.

In FIG. 20, for convenience in illustration, the first and second transport streams TS1 and TS2 seem to synchronize with each other by a unit of packet. In practice, however, they do not synchronize with each other. Therefore, the PC packet data Pc in the first transport stream TS1 may be inputted to the transport stream decoder TDAA2 at the same time when the PC packet data Pc in the second transport stream TS2 is inputted thereto, or may be not.

Figure 21:
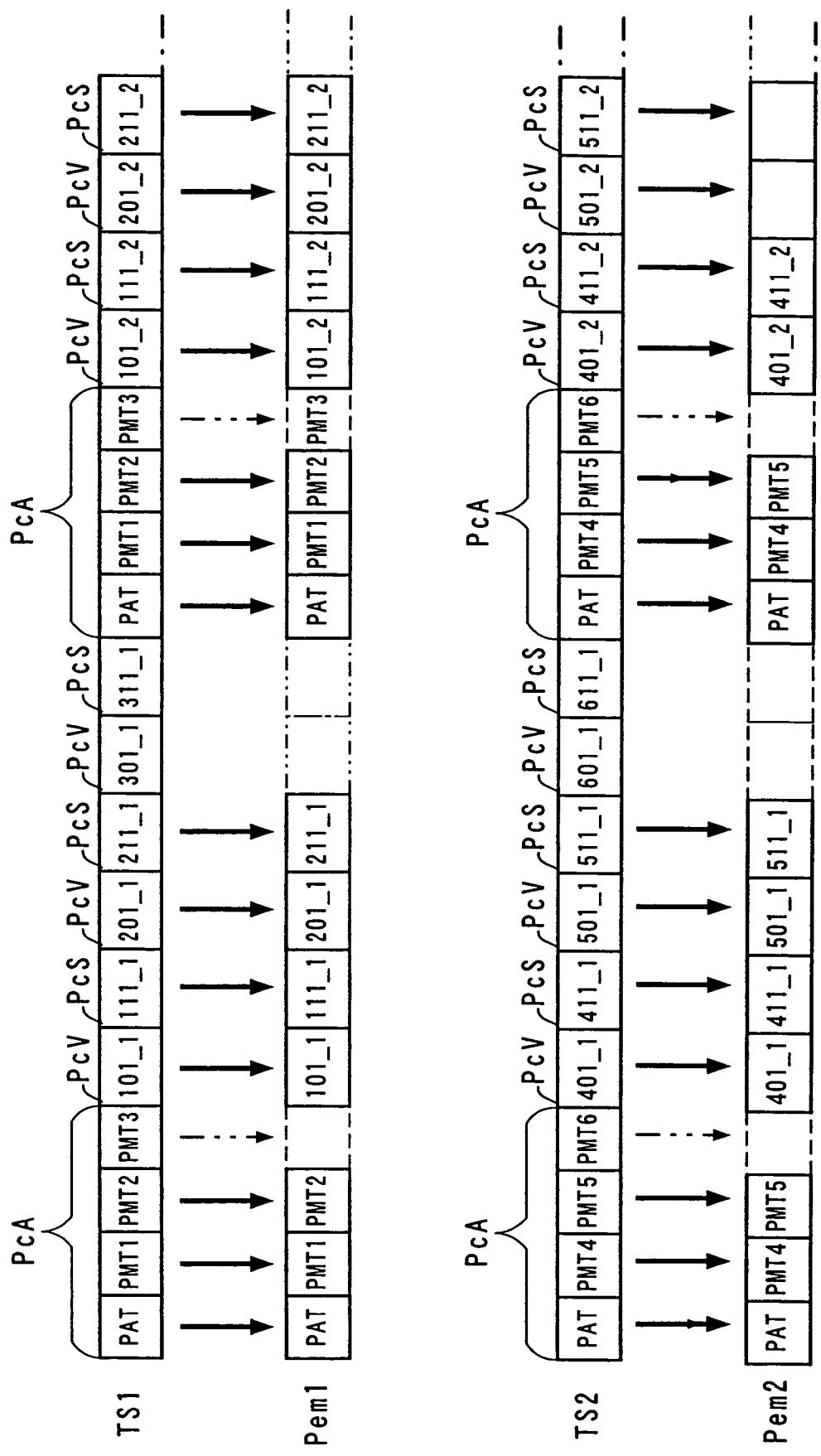
FIG. 21 is an illustration for demonstrating a selected plural program packet data string obtained by the transport stream decoder shown in FIG. 15 extracting the program contents packet data and the management packet data of four programs from two single transport streams having the packet structure shown in FIG. 20.

Illustrated in FIG. 21 is how the transport stream decoder TDAA2 extracts a first selected plural programs (hereinafter, PP) packet data string Pem1 from the first transport stream TS1 having the packet structure shown in FIG. 20 and a second selected PP packet data string Pem2 from the second transport stream TS2. In this example, the first selected PP packet data string Pem1 contains the packet data P of the programs 1 and 2, and the second selected PP packet data string Pem2 contains the packet data P of the programs 4 and 5. The first and second selected PP packet data strings Pem1 and Pem2 are mixed and outputted as a mixed selected PP packet data string Pems to the arbitrator-added main memory controller 700Cr.

The arbitrator-added main memory controller 700Cr arbitrates the PC packet data Pc contained in the plurality of transport streams TS included in the inputted mixed selected PP packet data string Pems, and outputs the resultant data to the main memory 900Cr, where a plural TS PP packet data string Pmsm is formed. This operation is carried out to cope with a possible situation where a plurality of packet data P contained in different transport streams TS happen to simultaneously arrive at the transport stream decoder TDAA2. This situation may arise because the plurality of packet data P contained in different transport streams TS vary in packet data size, transfer rates, arrival timings, etc.

The example illustrated in FIGS. 20 and 21, programs having different program numbers are extracted for each transport stream TS. Therefore, in the mixed selected PP packet data string Pems, no plurality of packet data P having the same program number and the packet identifier PID seems to exist. However, when the program having the same program number is extracted from both of the first and second transport streams TS1 and TS2, a plurality of different packet data P having the same program number may exist in the mixed selected PP packet data string Pems. Furthermore, as to the packet identifier PID, it can be provided to the packet data P for each transport stream TS irrespectively of the program number. Therefore, a plurality of different packet data having the same packet identifier PID may exist in the mixed selected PP packet data string Pems.

In some cases, other than the specified programs, the program map table PMT3 for the program 3 contained in the transport stream TS1 and the program map table PMT6 for the program 6 contained in the transport stream TS2 may be extracted. As such, from the packet data P sequentially arranged in the inputted transport stream TS, only the packet data P corresponding to a predetermined plurality of programs are discretely extracted, and outputted in the order in which they arrived at the transport stream decoder TDAA2.

Illustrated in FIG. 25 is an example structure of the plural TS PP packet data string Pmsm generated from the mixed selected PP packet data string Pems. In this example, extracted from the first transport stream TS1 are the PC packet data Pc101_1, Pc101_2, . . . of video packet data PcV for the program 1 and the PC packet data Pc201_1, Pc201_2, . . . of video packet data PcV for the program 2. Furthermore, extracted from the second transport stream TS2 are the PC packet data Pc401_1, Pc401_2, . . . of video packet data PcV for the program 4 and the PC packet data Pc501_1,
Pc501_2, . . . of video packet data PcV for the program 5. Then, the extracted plurality of packet data are outputted as a plural TS PP video packet data string PmsmV in such an order as the PC packet data Pc101_1, Pc401_1, Pc201_1, Pc501_1, Pc101_2, Pc401_2, Pc201_2, Pc501_2, . . . .

Similarly, extracted from the first transport stream TS1 are the PC packet data Pc111_1, Pc111_2, . . . of audio packet data PcS for the program 1 and the PC packet data Pc211_1, Pc211_2, . . . of audio packet data PcS for the program 2. Furthermore, extracted from the second transport stream TS2 are the PC packet data Pc411_1, Pc411_2, . . . of audio packet data PcS for the program 4 and the PC packet data Pc511_1, Pc511_2, . . . of audio packet data PcS for the program 5. Then, the extracted plurality of packet data are outputted to the main memory 900Cr as a plural TS PP audio packet data string PmsmS in such an order as the PC packet data Pc111_1, Pc411_1, Pc211_1, Pc511_1, Pc111_2, Pc411_2, Pc211_2, Pc511_2, . . . .

Illustrated in FIG. 26 is an example of how the packet data P of the mixed selected PP packet data string Pems are stored in the main memory 900Cr. The main memory 900Cr is constructed similarly to the main memory 900C as described with reference to FIG. 13. In this example, however, stored in the video packet storage area A(video) are the PC packet data Pc101_1, Pc401_1, Pc201_1, Pc501_1, . . . composing the plural TS PP video packet data string PmsmV, and stored in the audio packet storage area A(audio) are the PC packet data Pc111_1, Pc411_1, Pc211_1, Pc511_1, . . . composing the plural TS PP audio packet data string PmsmS. Furthermore, provided are α of PMT storage area A(PMT1) to A(PMTα) for storing the program map table PMT contained in the transport streams TS1 to TSε.

Referring back to FIG. 24, described below are the program packet filter group GPCF, the arbitrator-added main memory controller 700Cr, and the stream input section 600C. The program packet filter group GPCF includes a plurality of extended program packet filters EPCF shown in FIG. 10, that is, one for each inputted transport stream TS. In the present example, the program packet filter group GPCF includes a first extended program packet filter EPCF1 connected to the stream input section 500C for receiving the first transport stream TS1 by a first transfer unit TSd1, and a second extended program packet filter EPCF2 connected to the stream input section 600C for receiving the second transport stream TS2 by a second transfer unit TSd2.

The extended program packet filter EPCF1 generates the first selected PP packet data string Pem1 from the first transport stream TS1 for output to the arbitrator-added main memory controller 700Cr. Similarly, the extended program packet filter EPCF2 generates the second selected PP packet data string Pem2 from the second transport stream TS2 for output to the arbitrator-added main memory controller 700Cr.

The arbitrator-added main memory controller 700Cr is constructed by adding an arbitrator to the main memory controller 700C illustrated in FIG. 10. When the first and second selected PP packet data strings Pem1 and Pem2 are simultaneously supplied from the program packet filter group GPCF, this arbitrator determines the order of outputting these strings to the main memory 900Cr as the mixed selected PP packet data string Pems, arbitrating input to the main memory controller 700Cr and output to the main memory 900r.

The main memory 900Cr, similar to the one in the transport stream decoder TDAA1, stores the mixed selected PP packet data string Pems coming from the program packet filter group GPCF through the main memory controller 700Cr, thereby forming the plural TS PP packet data string Pmsm. Upon request from an external device typified by an AV decoder 2000C, the arbitrator-added main memory controller 700Cr reads the plural TS PP packet data string Pmsm from the main memory 900Cr for output.

In this case, for the purpose of meeting a user's request for selecting one or more programs from the plurality of programs contained in the different transport streams TS and carrying out different processes thereon (displaying the program 1 on a monitor and recording the program 4, for example), the transport stream decoder TDAA2 has to generate and hold information about the situations to be identified in the transport stream decoder TDAA1 and also the following situation: a plurality of different packet data P having the same packet identifier PID may be selected because the programs are selected from the plurality of transport streams TS. In this situation, information, irrespective of the packet identifier PID, about the relation between each packet data P and the selected programs has to be required.

Furthermore, when a plurality of programs are selected from a single transport stream TS, all corresponding plural packet data P differ in arrival time. Therefore, the packet data P can be outputted in the order in which they arrived as the selected PP packet data string Pem and the PP packet data string Pms. From different transport streams TS, however, a plurality of packet data P that arrives at the same time may be selected. Such packet data P should be outputted in a proper processing order to the main memory 900Cr as the mixed selected PP packet data string Pems irrespectively of each arrival time. Consequently, it is not possible to ensure the proper time order by the arrival order for forming the plural PP packet data string Pmsm in the main memory 900C.

Furthermore, different transport streams TS are different in size of the packet data P and transfer speed. For example, consider a case where the first transport stream TS1 is smaller than the second transport stream TS2 in size of the packet data P and faster than that in transfer speed. Assume herein that the packet data P(TS1-1) of the first transport stream TS1 arrives immediately after the packet data P(TS2-1) of the second transport stream TS2 arrives. Under this assumption, the packet data P(TS2-1) is first transferred from the second extended program packet filter EPCF2 to the arbitrator-added main memory controller 700Cr at the second transfer unit TSd2. Immediately thereafter, the packet data P(TS1-1) is transferred from the first extended program packet filter EPCF1 to the arbitrator-added main memory controller 700Cr at the first transfer unit TSd1.

However, the packet data P(TS1-1) is smaller in size than the packet data P(TS2-1), and the transfer speed of the first transport stream TS1 is faster than that of the second transport stream TS2. Therefore, while the packet data P(TS2-1) of the second transport stream TS2 is being transferred, transfer of the packet data P(TS1-1) of the first transport stream TS1 is completed. For the worse, transfer of the subsequent packet data P(TS1-2) is started.

That is, of the plurality of packet data P of different transport streams TS, the packet data P that arrived later may be outputted to the main memory 900Cr before the packet data P that arrived earlier. In this case, it is impossible to properly form the plural TS PP packet data string Pmsm in the main memory 900Cr by outputting the packet data in the arrival order as the mixed selected PP packet data string Pems. For properly forming the plural TS PP packet data string Pmsm even in the above time-series information of the packet data P in the transport stream TS is indispensable to properly reproduce the packet data P extracted from different transport streams TS.

Therefore, suggested in the second embodiment is a data buffering apparatus capable of individually buffering all packet data P composing the sequentially-inputted transport stream TS, and then determining whether the packet data P is the subject of the user-desired process, thereby controlling access to and process on the packet data P on a real-time basis. Furthermore, provided in the second embodiment is a packet data processing determination apparatus. In this apparatus, to ensure an access or processing time within a real-time processing time, buffering the packet data to be processed (herein after, target packet data) in a buffer cell within a predetermined time period is ensured by software control. Other passive processes are rendered under hardware control. Consequently, identification and management by every packet data P can be more flexible, and when to carry out a unique process on the identified packet data P can be easily adjusted.

For the above purposes, provided in the second embodiment the buffering apparatus in the first embodiment with the packet data processing determination apparatus capable of identifying the transport stream TS by the unit of packet data P, and further identifying the packet data P on the time series.

Figure 15:
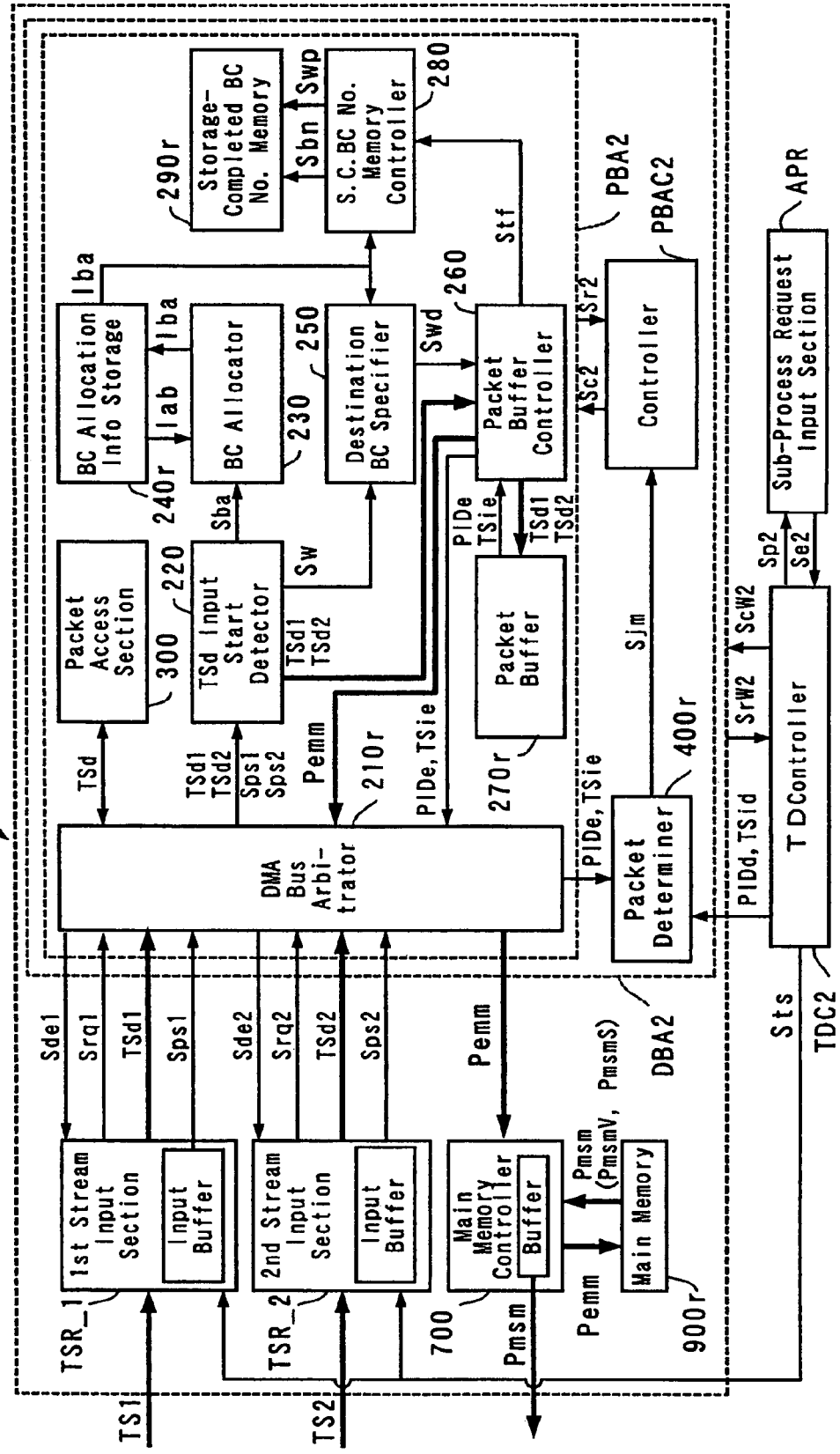
FIG. 15 is a block diagram showing the construction of a transport stream decoder having a data buffer incorporated therein, according to a second embodiment of the present invention.

Illustrated in FIG. 15 is a transport stream decoder TD2 having a data buffering apparatus DBA2 according to the second embodiment incorporated therein. The transport stream decoder TD2 is similar in construction to the transport stream decoder TD1 shown in FIG. 1, except that the data buffering apparatus DBA1 is replaced with the data buffering apparatus DBA2, the stream input section TSR is replaced with a first stream input section TSR_1 and a second stream input section TSR_2, the main memory 900 is replaced with the main memory 900r, and the TD controller TDC1 is replaced with a TD controller TDC2. The stream input sections TSR_1 to TSR_N are provided as many as the number of transport streams TS N simultaneously supplied to the transport stream decoder TD2. Note that, in the second embodiment, specifically described is a case where two transport streams TS are supplied.

Furthermore, the data buffering apparatus DBA2 is similar in construction to the data buffering apparatus DBA1 shown in FIG. 1, except that the packet buffering arbitrator PBA1 is replaced with a packet buffering arbitrator PBA2, the controller PBAC1 is replaced with a controller PBAC2, and the packet determiner 400 is replaced with a packet determiner 400r.

Also, the packet buffering arbitrator PBA2 is similar in construction to the packet buffering arbitrator PBA1 shown in FIG. 1, except that the DMA bus arbitrator 210 is replaced with a DMA bus arbitrator 210r, the BC allocation information storage 240 is replaced with a BC allocation information storage 240r, the packet buffer 279 is replaced with a packet buffer 279r, and the storage-completed BC No. memory 290 is replaced with a storage-completed BC No. memory 290r.

Figure 22:
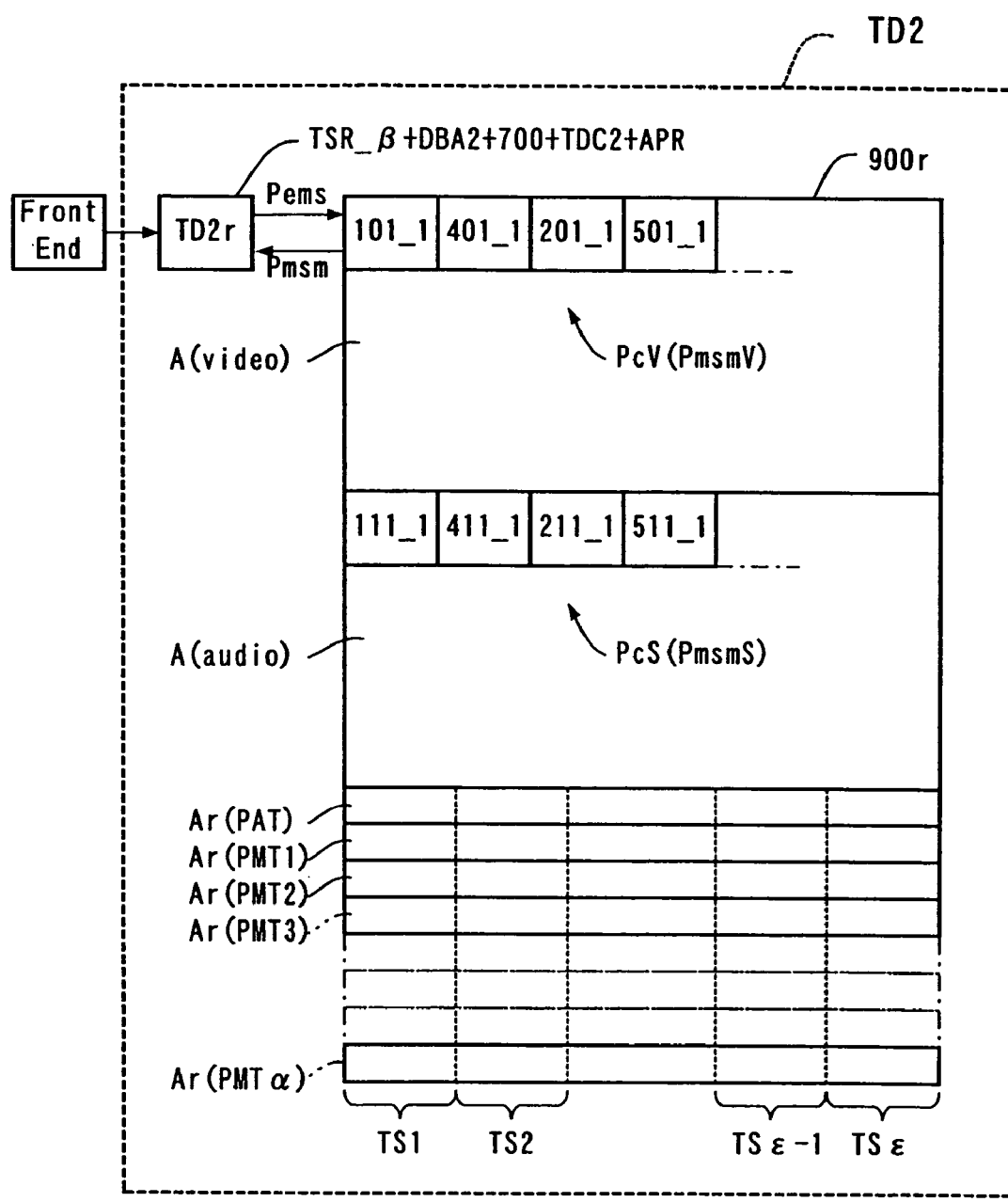
FIG. 22 is schematic illustration exemplarily showing how packet data is stored in main memory shown in FIG. 15.

Prior to description of these newly provided components, described is a basic concept of the transport stream decoder TD2 in the second embodiment with reference to FIG. 22 and FIGS. 20 and 21 described above. The transport stream decoder TD is supplied with at least two transport streams having the data structure already described with reference to FIG. 20, that is, the first and second transport streams TS1 and TS2.

Extracted as the selected plural TS PP packet data string Pemm are the packet data P for the programs 1 and 2 corresponding to the first selected PP packet data string Pem1 (FIG. 21) contained in the first transport stream TS1, and the packet data P for the programs 4 and 5 corresponding to the second selected PP packet data string Pem2 (FIG. 21) contained in the second transport stream TS2. The selected plural TS PP packet data string Pemm is then stored in the main memory 900r, wherein the plural TS PP packet data string Pmsm is formed, which has been described with reference to FIG. 25.

Illustrated in FIG. 22 is an example of how the packet data P contained in the selected plural TS PP packet data string Pemm is stored in the main memory 900r, the data string Pemm being extracted from the transport streams TS1 and TS2 supplied to the transport stream decoder TD2 through a front end section externally provided. Note that, in the drawing, the stream input sections TSR_1 to TSR_N, the data buffering apparatus DBA2, the main memory controller 700, the TD controller TDC2, and the sub-process request input section APR are collectively represented as a transport stream edit section TD2r.

As with the main memory 900Cr illustrated in FIG. 26, the main memory 900r, as best shown in FIG. 22, has the video packet storage area A(video) for storing the PC packet data Pc101_1, Pc401_1, Pc201_1, Pc501_1, . . . composing the plural TS PP video packet data string PmsmV, and the audio packet storage area A(audio) for storing the PC packet data Pc111_1, Pc411_1, Pc211_1, Pc511_1, . . . composing the plural TS PP audio packet data string PmsmS.

Furthermore, the main memory 900r has a PAT storage area Ar(PAT) for storing information about the program association table PAT, and PMT storage areas Ar(PMT1) to Ar(PMTα) for storing information about the program management tables PMT. However, the PAT storage area Ar(PAT) and the PMT storage areas Ar(PMT1) to Ar(PMTα) of the main memory 900r are different from those of the main memory 900Cr in that the PAT storage area Ar(PAT) and the PMT storage areas Ar(PMT1) to Ar(PMTα) are divided into areas respectively dedicated to the inputted transport streams TS1 to TSε for storage. In such structure, the main memory 900r has the PAT storage area Ar(PAT) for selectively storing the program association table PAT for each transport stream TS, and the PMT storage areas Ar(PMT1) to Ar(PMTα) for selectively storing the information about the program map tables PMT for each transport stream TS.

Needless to say, the PMT storage area Ar(PMT) is provided as many as the number of types (α) of program map table PMT (programs) contained in the transport streams TS. With such structure, it is possible to identify and manage the read management packet data PcA for each inputted transport stream TS. Therefore, the information about the distributed programs can be easily known for each transport stream TS.

As described above, all packet data P contained in the transport stream TS can be individually identified with their packet identifier PID. However, when two or more transport streams TS are supplied, different transport streams TS may have different packet data P having the same packet identifier PID. To identify every packet data P inputted to the transport stream decoder TD2, in the second embodiment, each packet data P is provided with a transport stream identifier TSi for identifying the transport stream TS for management. This will be described in detail later.

Referring back to FIG. 15, described in detail below are the components unique to the transport stream decoder TD2. The first stream input section TSR_1 and the second stream input section TSR_2 provide a transport stream identifier (herein after, TS identifier) TSi, which is an ID for identifying the inputted transport stream as the first and second transport streams TS1 and TS2, respectively, and output the transport stream by the transport unit TSd1 and the transport unit TSd2, respectively. These transport units TSd1 and TSd2 will be described later with reference to FIG. 16. In the second embodiment, both are set as eight bytes. This is not restrictive, and may be arbitrarily set in consideration of arbitration load and transmission efficiency in the data buffering apparatus DBA2.

The data buffering apparatus DBA2 manages and stores, by the unit of packet data P, the first and second transport streams TS1 and TS2 supplied by the transfer units TSd1 and TSd2 from the first and second stream input sections TSR_1 and TSR_2, respectively, and outputs the selected plural TS PP packet data string Pemm.

The main memory 900r stores the selected plural TS PP packet data string Pemm extracted from the first and second transport streams TS1 and TS2 outputted from the data buffering apparatus DBA2, and outputs the plural TS PP packet data string Pmsm to an external device (not shown) typified by an AV decoder.

The main memory controller 700 temporarily holds the selected plural TS PP packet data string Pemm and the plural TS PP packet data string Pmsm by the transfer unit TSd, and controls the operation of the main memory 900r.

The TD controller TDC2 controls the entire operation of the transport stream decoder TD2. The transport stream decoder TD2 generates a state signal SrW2 indicating the state of operation of each of the above components for output to the TD controller TDC2. Based on the state signal SrW2, the TD controller TDC2 generates a control signal ScW2 for controlling the operation of each of the above components for control over the entire transport stream decoder TD2. Note that generation of the state signal SrW2 and the control signal ScW2 and control over the transport stream decoder TD2 are known art, and therefore not described herein.

For buffering, the packet buffering arbitrator PBA2 identifies and manages, by the unit of packet data P, the transport stream TS1 supplied by the transfer unit TSd1 from the first stream input section TSR_1 and the transport stream TS2 supplied by the transfer unit TSd2 from the second stream input section TSR_2. The controller PBAC2 controls the operation of the packet buffering arbitrator PBA2.

The packet buffering arbitrator PBA2 includes a DMA bus arbitrator 210r, a TSd input start detector 220, a buffer cell (BC) allocator 230, a BC allocation information storage 240, a destination BC specifier 250, a packet buffer controller 260, a packet buffer 270, a storage-completed BC No. memory controller 280, a storage-completed BC No. memory 290, and a packet access section 300.

The DMA bus arbitrator 210r has a first input port group for receiving inputs of a first packet head detection signal Sps1, a first request signal Srq1, and the first transfer unit TSd1 outputted from the first stream input section TSR_1, and a second input port group for receiving inputs of a second packet head detection signal Sps2, a second request signal Srq2, and the second transfer unit TSd2 outputted from the second stream input section TSR_2.

Needless to say, the DMA bus arbitrator 210r is provided with the input port group as many as the number of stream input sections TSR provided according to the number of simultaneously-inputted transport streams TS. As such, with the input port group provided for each inputted transport stream TS, the transport stream TS inputted to the transport stream decoder TD2 can be identified by each of the input port groups.

Furthermore, the DMA bus arbitrator 210r has a first output port for outputting a first data effective signal Sde1 to the first stream input section TSR_1, and a second output port for outputting a second data effective signal Sde2 to the second stream input section TSR_2. Needless to say, the DMA bus arbitrator 210r is provided with the output port group as many as the number of stream input sections TSR provided according to the number of simultaneously-inputted transport streams TS.

The DMA bus arbitrator 210r mainly arbitrates inputs and outputs of the transfer units TSd1 and TSd2 of the first and second transport streams TS1 and TS2, respectively, between the first and second stream input sections TSR_1 and TSR_2 and the packet buffer controller 260. That is, the DMA bus arbitrator 210r outputs the first packet head detection signal Sps1 and the first transfer unit TSd1 to the TSd input start detector 220 based on the first packet head detection signal Sps1, the first request signal Srq1, and the first transfer unit TSd1. In response to the first data effective signal Sde1 supplied from the DMA bus arbitrator 210r, the first stream input section TSR_1 supplies the first transfer unit TSd1.

Similarly, the DMA bus arbitrator 210r outputs the second packet head detection signal Sps2 and the second transfer unit TSd2 to the TSd input start detector 220 based on the second packet head detection signal Sps2, the second request signal Srq2, and the second transfer unit TSd2.

The TSd input start detector 220 generates, whenever detecting the start of input of the first transfer unit TSd1 or TSd2 for each packet data P, a buffer cell request signal Sba for requesting allocation of one buffer cell Bc in the packet buffer 270r for storing the packet data P being supplied. Furthermore, the TSd input start detector 220 generates a write enable signal Sw indicating that writing in the allocated buffer cell can be started, and outputs the generated write enable signal Sw to the destination buffer cell specifier 250.

The BC allocator 230, the BC allocation information storage 240r, and the destination BC specifier 250 operate similarly to those in the first embodiment.

In response to the write request signal Swd, the packet buffer controller 260 writes the transfer unit TSd1 or TSd2 supplied from the TSd input start detector 220 in the allocated buffer cell of the packet buffer 270r. At this time, the DMA bus arbitrator 210r reports to the packet buffer controller 260 that the data is from the first stream input section TSR_1 (that is, the transfer unit TSd1) or TSR_2 (that is, the transfer unit TSd2). As will be described later, each of the transfer units TSd1 and TSd2 is previously provided with a mark indicating the corresponding transport stream TS1 or TS2. The packet buffer controller 260 compares the information provided to the data stored in the buffer cell with the information reported from the DMA bus arbitrator 210r, thereby storing the data as distinguishing the correct stream information. Furthermore, the packet buffer controller 260 counts the number of bytes of the data written in the allocated buffer cell for detecting that the transfer unit TSd1 or TSd2 for one packet data P has been written. The packet buffer controller 260 then generates a transfer complete signal Stf indicating data transfer of one packet data P from the DMA bus arbitrator 210*r* has been completed, and outputs the generated transfer complete signal Stf to the storage-completed BC No. memory controller 280.

Based on the BC allocation information Iba supplied from the BC allocation information storage 240*r* and the transfer complete signal Stf supplied from the packet buffer controller 260, the storage-complete BC No. memory controller 280 generates a BC No. signal Sbn indicating the buffer cell Bc having one packet data P written therein and a write point update signal Swp for advancing, by one, the write pointer WP indicating a storage area in which the BC number Nbc is to be written, and outputs the generated signals to the storage-completed BC No. memory 290*r*.

The storage-completed BC No. memory 290*r* records the BC number Nbc indicating the BC No. signal Sbn in the storage area currently indicated by the write pointer WP. Also, in response to the BC number signal Sbn, the storage-completed BC No. memory 290*r* advances the write pointer WP by one so as to cause the write pointer WP to indicate an area next to the area in which the BC number Nbc has been written. Note that, in the second embodiment, the storage-completed BC No. memory 290*r* is preferably implemented by ring memory, as described with reference to FIG. 2. Therefore, by advancing the write pointer WP by one every time writing in the buffer cell is completed, the BC number Nbc stored in the storage area of the storage-completed BC No. memory 290*r* can be appropriately updated.

Note that the packet access section 300 selectively reads, through the DMA bus arbitrator 210*r* and then the packet buffer controller 260, the transfer unit TSd of the packet data P stored in the buffer cell BC of the packet buffer 270. After the read packet data P is referring to, edited, or subjected to other processing, the packet access section 300 outputs the process packet data P through the DMA bus arbitrator 210*r* and then the packet buffer controller 260 to the packet buffer 270 for overwriting the original packet data P stored in the buffer cell Bc.

The packet buffering arbitrator PBA2 generates a state signal Sr2 indicating the state of operation of each of the above components for output to the controller PBAC2. Based on the state signal Sr2, the controller PBAC2 generates a control signal Sc2 for controlling the operation of each of the components of the packet buffering arbitrator PBA2 for output to the packet buffering arbitrator PBA2. Note that the operation of the controller PBAC2 for generating the state signal Sr2 and the control signal Sc2 is known art, and therefore not described herein.

The BC allocation information storage 240*r*, the packet buffer 270*r*, and the storage-completed BC No. memory 290*r* are basically the same in construction as the BC allocation information storage 240, the packet buffer 270, and the storage-completed BC No. memory 290, respectively, described with reference to FIG. 2. However, in the packet buffer 270*r*, the number of buffer cells Bc is an integer not less than $2\epsilon$.

This is because at least two different buffer cells Bc are required for every inputted transport stream TS, the one for storing the packet data P and the other for reading the stored packet data P. Note that, in the second embodiment, two transport streams TS are supplied ($\epsilon=2$), that is, the first and second transport streams TS1 and TS2. Therefore, the number of buffer cells Bc N is an integer not less than four ($2\times2$).

The minimum buffer capacity MBU is equal to the size of the data to be stored and management bytes corresponding to management information, irrespectively of division. The management information includes at least transport stream identification information indicating in which transport stream TS the divided/undivided data to be stored is contained.

When the packet data P is divided for storage, the minimum buffer capacity MBU is a sum of the maximum size of the data after division and the size of the management data including the transport stream packet identification information. In this case, a minimum number of buffer cells Nmin, which is the minimum value of the number of buffer cells Bc N, is obtained by multiplying $2\epsilon\times$ the number of divisions D (the minimum number of buffer cells Nmin is $2\epsilon D$). That is, in the second embodiment, the minimum number of buffer cells Nmin is represented as 4D.

Furthermore, described next is the difference in input rate among a plurality of different packet data P. That is, the input rate of the packet data P contained in a plurality of transport streams TS supplied to the transport stream decoder TD2 may vary for each transport stream TS. Now, consider a case where, when the PC packet data Pc101 and Pc111 of the program 1 contained in the first transport stream TS1 and the PC packet data Pc401 and Pc411 of the program 4 contained in the second transport stream TS2 are buffered, the input rate of the PC packet data Pc401 is far higher than that of the PC packet data Pc101.

In this case, even if the PC packet data Pc101 and Pc401 simultaneously arrive at the transport stream decoder TD2, the DMA bus arbitrator 210*r* carries out arbitration so as to start one buffering (the PC packet data Pc101, for example) earlier than the other (the PC packet data Pc401). Subsequent to the start of buffering of the PC packet data Pc101, buffering of the PC packet data Pc401 is started. However, since the input rate of the PC packet data Pc401 is far higher than that of the PC packet data Pc101, input of the PC packet data Pc101 is completed while the PC packet data Pc401 is being buffered.

To address this situation, it is required to provide the buffer cell Bc for buffering the PC packet data Pc401 of higher rate supplied while the PC packet data Pc101 is being buffered. In this case, the minimum number of buffer cells Nmin is determined based on the input rates of the PC packet data Pc of the supplied transport streams TS. If the minimum buffer capacity MBU is constant, the minimum number of buffer cells Nmin is generally proportional to the number of inputted transport streams TS, increasing according to the number of PC packet data Pc whose inputted transport streams are far different in input rate.

In the second embodiment, the minimum buffer capacity MBU is capable of storing one packet data P with predetermined management data added thereto. Specifically, the minimum buffer capacity MBU is set as 192 bytes for storing one packet data P of 188 bytes and the management data of 4 bytes. The management data of 4 bytes includes the above described transport stream identification information and also time stamp information indicating the arrival time of the packet data P, which will be described later with reference to FIG. 16.

The BC allocation information storage 240*r* has BC allocation information areas Ac1 to AcN corresponding to the buffer cells Bc1 to BcN, respectively, of the packet buffer 270*r*, as described above. Also, the storage-completed BC No. memory 290*r* is not required to have areas as many as the number of buffer cells Bc1 to BcN in the packet buffer 270*r*. Only M BC specifying areas Rc1 to Rcm are enough.

With reference to a waveform chart illustrated in FIG. 16, briefly described below are the operations of the first stream input section TSR_1, the second stream input section TSR_2, the DMA bus arbitrator 210r, and the packet buffer controller 260. In the drawing, only one typical waveform is illustrated for convenience, either one of the first and second transport streams TS1 and TS2, either one of the first and second packet head detection signals Sps1 and Sps2, either one of the first and second request signals Srq1 and Srq2, either one of the first and second data effective signals Sde1 and Sde2, and either one of the first and second transfer units TSd1 and TSd2. However, these signals can inherently somewhat vary in timing and waveform. Specifically described below is only the first transport stream TS1, and the second transport stream TS2 is not described herein for avoiding redundancy.

Figure 16:
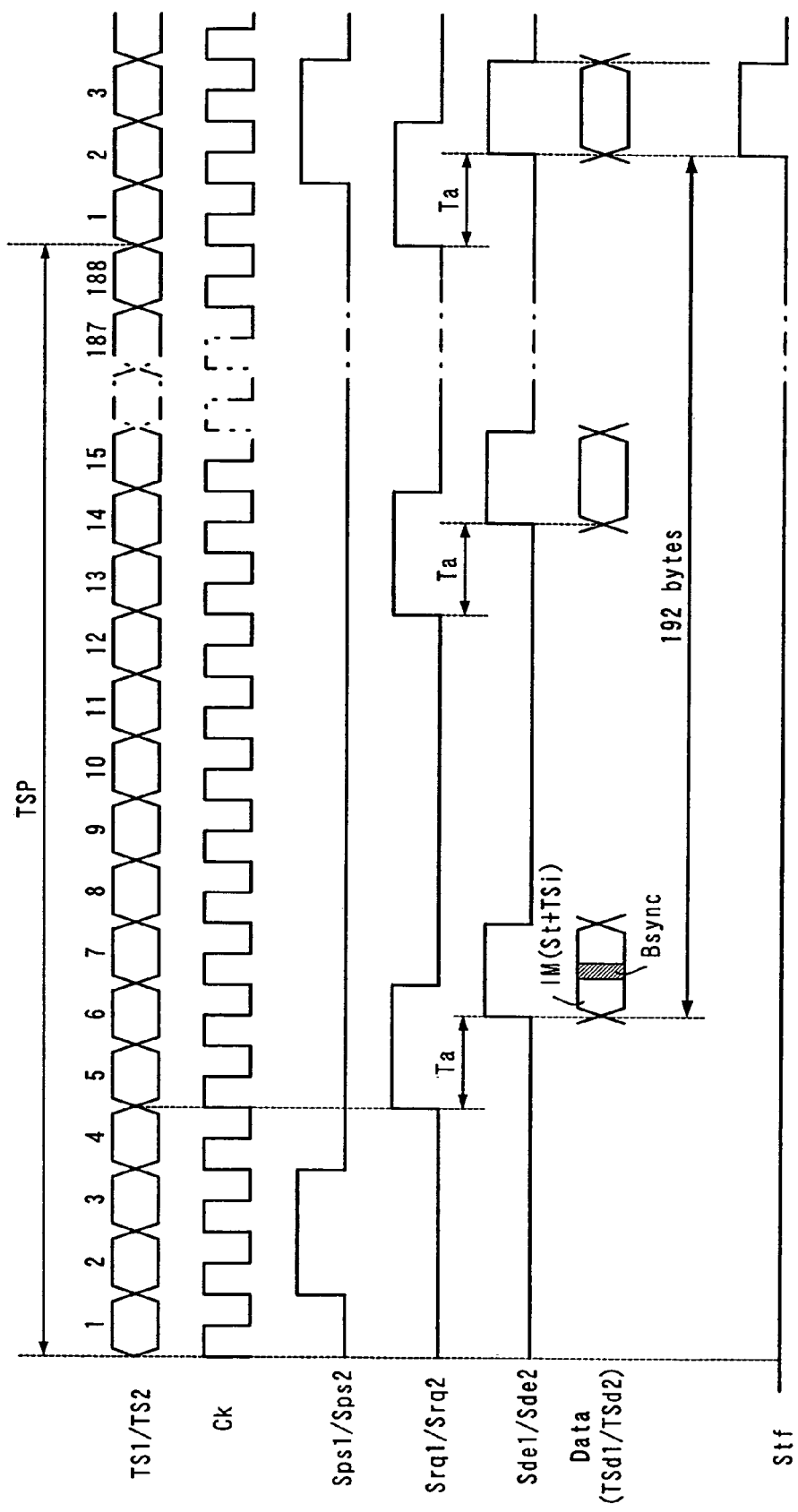
FIG. 16 is a waveform diagram showing various signals in the transport stream decoder shown in FIG. 15.

As illustrated in FIG. 16, the first transport stream TS1 composed of a plurality of packet data P each composed of data of 188 bytes is sequentially supplied from the external transport stream source to the first stream input section TSR_1 by one byte in synchronization with an input transfer clock Ck. The first transport stream TS1 may be supplied not by one byte, but by one bit.

The first stream input section TSR_1 detects the packet head of the packet data P by detecting the first one byte of each synchronizing packet data P. Then, whenever detecting the packet head, the first stream input section TSR_1 generates a first packet head detection signal Sps1 for output to the DMA bus arbitrator 210r.

Moreover, when detecting the packet head, the first stream input section TSR_1 generates a time stamp St indicating the time when the packet data arrived and a transport stream identifier TSi indicating that the packet data P belongs to the first transport stream TS1. In other words, the transport stream identifier TSi indicates that the first transport stream TS1 is being supplied from the first stream input section TSR_1 to the first input port group of the DMA bus arbitrator 210r.

The number of bytes of the time stamp St may be arbitrarily determined based on the processing accuracy in the transport stream decoder TD. In the second embodiment, the time stamp St is preferably represented by three bytes. Also, the transport stream identifier TSi requires enough bytes to identify all transport streams inputted to the transport stream decoder TD. Therefore, the transport stream identifier TSi is represented by one byte in the second embodiment. The first stream input section TSR_1 generates the time stamp St and the transport stream identifier TSi to generate management information IM, and adds the management information IM to the head of the inputted packet data P to generate the first transfer unit TSd1.

As such, by providing the packet data P with the time stamp St and the transport stream identifier TSi as the management information IM, it is possible to correctly identify the respective packet data P contained in the different transport streams. Moreover, as stated above, even if the problem of so-called overtaking packet arises (input of the packet data P that arrived later is completed before input of the packet data P that arrived earlier), it is possible to properly process these packets in the correct order based on the management information IM.

As with the first embodiment, the first transfer unit TSd1 is set to eight bytes in the second embodiment. The first stream input section TSR_1 generates, for every eight bytes of transferred data, a first request signal Srq1 for requesting the DMA bus arbitrator 210r to receive an input of the first transfer unit TSd1, and outputs the first request signal Srq1 to the DMA bus arbitrator 210r.

That is, when a synchronizing byte Bsync, which is the head of the packet data P of the first transport stream TS1 is detected, the management information IM of four bytes composed of the time stamp St of three bytes and the transport stream identifier TSi of one byte is generated. Therefore, when the fourth byte from the synchronizing byte Bsyn on the head is inputted, the first stream input section TSR_1 generates the first request signal Srq1. As to the fifth byte and thereafter, the first request signal Srq1 is generated for every eight bytes. That is, the first four bytes of the transfer unit TSd outputted first represent the management information IM generated by the transport stream decoder TD2, and not the packet data P itself.

When the plurality of transport streams TS have to be respectively identified, the time stamp is denoted as St$\epsilon$, the transport stream identifier as TSi$\epsilon$, and the management information as IM$\epsilon$, where $\epsilon$ is a natural number identifying each of the plurality of transport streams TS inputted to the respective stream input sections TSR. Specifically, components related to the first transport stream TS1 are herein denoted as the first packet head detection signal Sps1, the first request signal Srq1, the first data effective signal Sde1, the first transfer unit TSd1, the time stamp St1, the transport stream identifier TSi1, and the first transport stream input section TSR_1. Similarly, components related to the second transport stream TS2 are herein denoted as the second packet head detection signal Sps2, a second request signal Srq2, the second data effective signal Sde2, the second transfer unit TSd2, a time stamp St2, a transport stream identifier TSi2, and the second transport stream input section TSR_2.

In response to the first request signal Srq1, the DMA bus arbitrator 210r arbitrates input and output for preparing an input of the first transfer unit TSd1 from the first stream input section TSR_1. Then, when prepared (when the predetermined time Ta elapsed after the request signal Srq1 comes), the DMA bus arbitrator 210 generates the first data effective signal Sde1 for output to the stream input section TSR_1.

In response to the first data effective signal Sde1, the first stream input section TSR_1 outputs the packet data P stored in the internal buffer to the DMA bus arbitrator 210r by every eight bytes as the first transfer unit TSd1.

In a manner similar to that described for the first stream input section TSR_1 and the DMA bus arbitrator 210r, the second stream input section TSR_2 generates the second packet head detection signal Sps2 and the second request signal Srq2 for output to the DMA bus arbitrator 210r. In response to the second request signal Srq2, the DMA bus arbitrator 210r outputs the second data effective signal Sde2 to the second stream input section TSR_2.

The second stream input section TSR_2 generates the second transfer unit TSd2 and, in response to the second data effective signal Sde2, outputs the generated second transfer unit TSd2 to the DMA bus arbitrator 210r.

The DMA bus arbitrator 210r outputs the first packet head detection signal Sps1, the second packet head detection signal Sps2, the first transfer unit TSd1, and the second transfer unit TSd2 to the TSd input start detector 220.

Based on the first packet head detection signal Sps1 and the first transfer unit TSd1, the TSd input start detector 220 detects the start of input of the first transfer unit TSd1 by a unit of packet data P, and supplies the first transfer unit TSd1 to the packet buffer controller 260.

Similarly, based on the second packet head detection signal Sps2 and the second transfer unit TSd2, the TSd input start detector 220 detects the start of input of the second transfer unit TSd2 by a unit of packet data P, and supplies the second transfer unit TSd2 to the packet buffer controller 260.

Whenever detecting the start of input of the first or second transfer unit TSd1 or TSd2 in the above described manner, the TSd input start detector 220 generates a buffer cell (BC) request signal Sba for requesting allocation of one buffer cell Bc in the packet buffer 270 for storing the packet data P currently being inputted, and outputs the generated BC request signal Sba to the BC allocator 230. Furthermore, the TSd input start detector 220 generates a write enable signal Sw indicating that writing in the allocated buffer cell can be started, and outputs the generated write enable signal Sw to the destination BC specifier 250.

Based on a write request signal Swd supplied by the destination BC specifier 250, the packet buffer controller 260 writes the first and second transfer unit TSd1 and TSd2 coming through the DMA bus arbitrator 210*r* and the TSd input start detector 220 in the allocated buffer cell Bc of the packet buffer 270*r*. Then, when the first or second transfer units TSd1 or TSd2 of one packet data P have been written, the packet buffer controller 260 generates a transfer complete signal Stf for output to the storage-completed BC No. memory controller 280.

Figure 17:
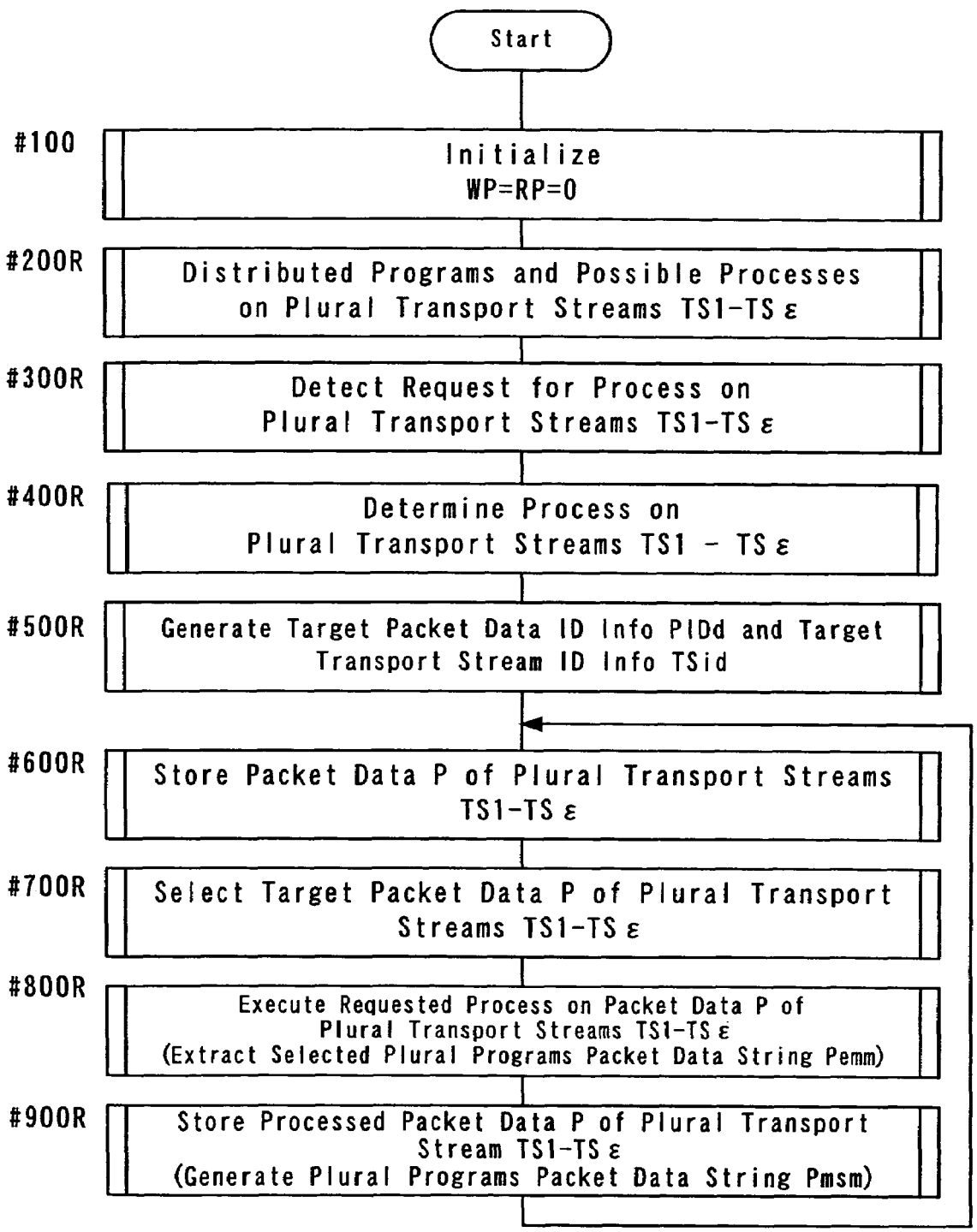
FIG. 17 is a flowchart showing the main operation of the transport stream decoder shown in FIG. 15.
Figure 18:
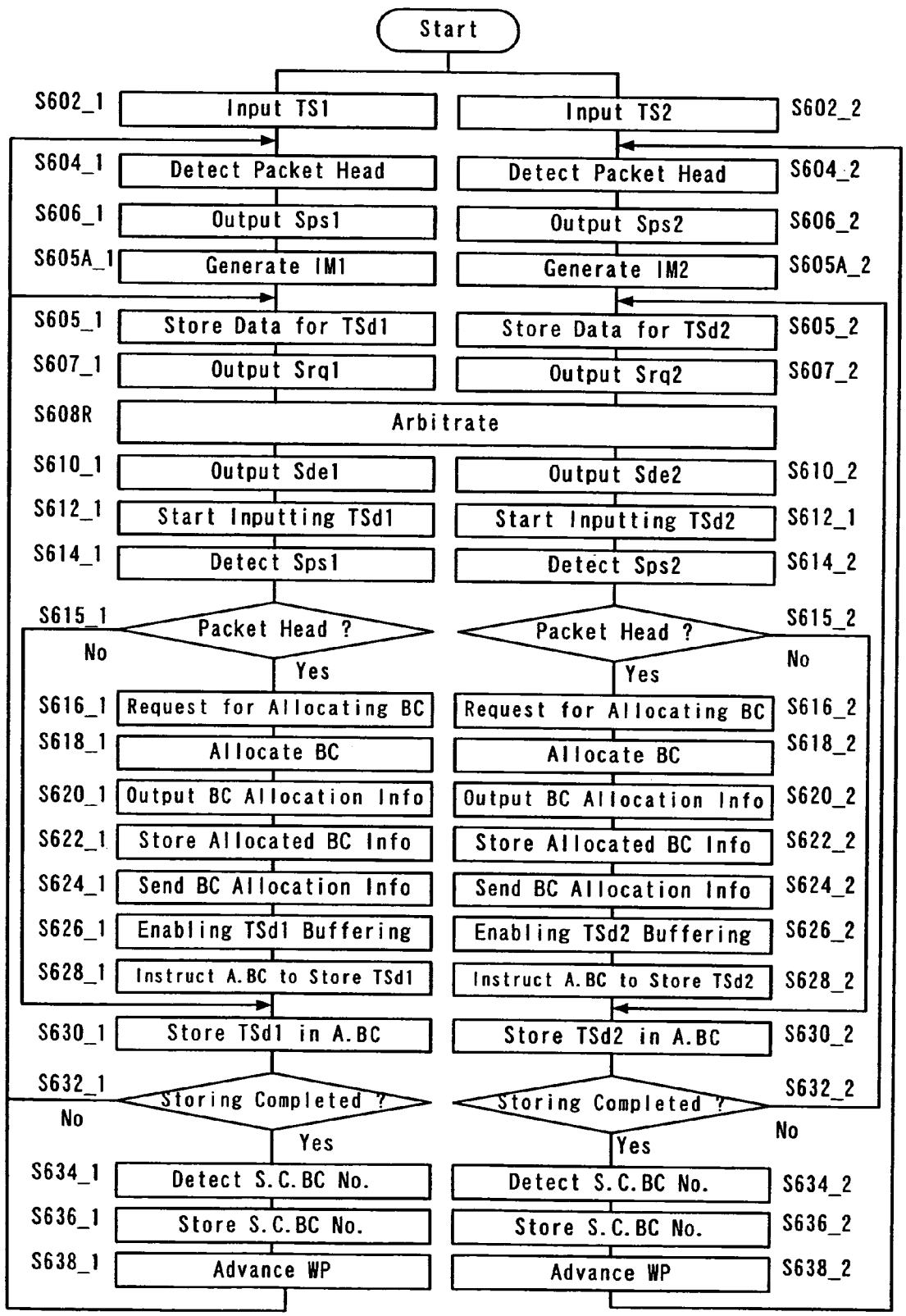
FIG. 18 is a flowchart showing the detailed operation in a subroutine detailed operation in a subroutine for storing packet data P of a single transport stream TS shown in FIG. 4.
Figure 19:
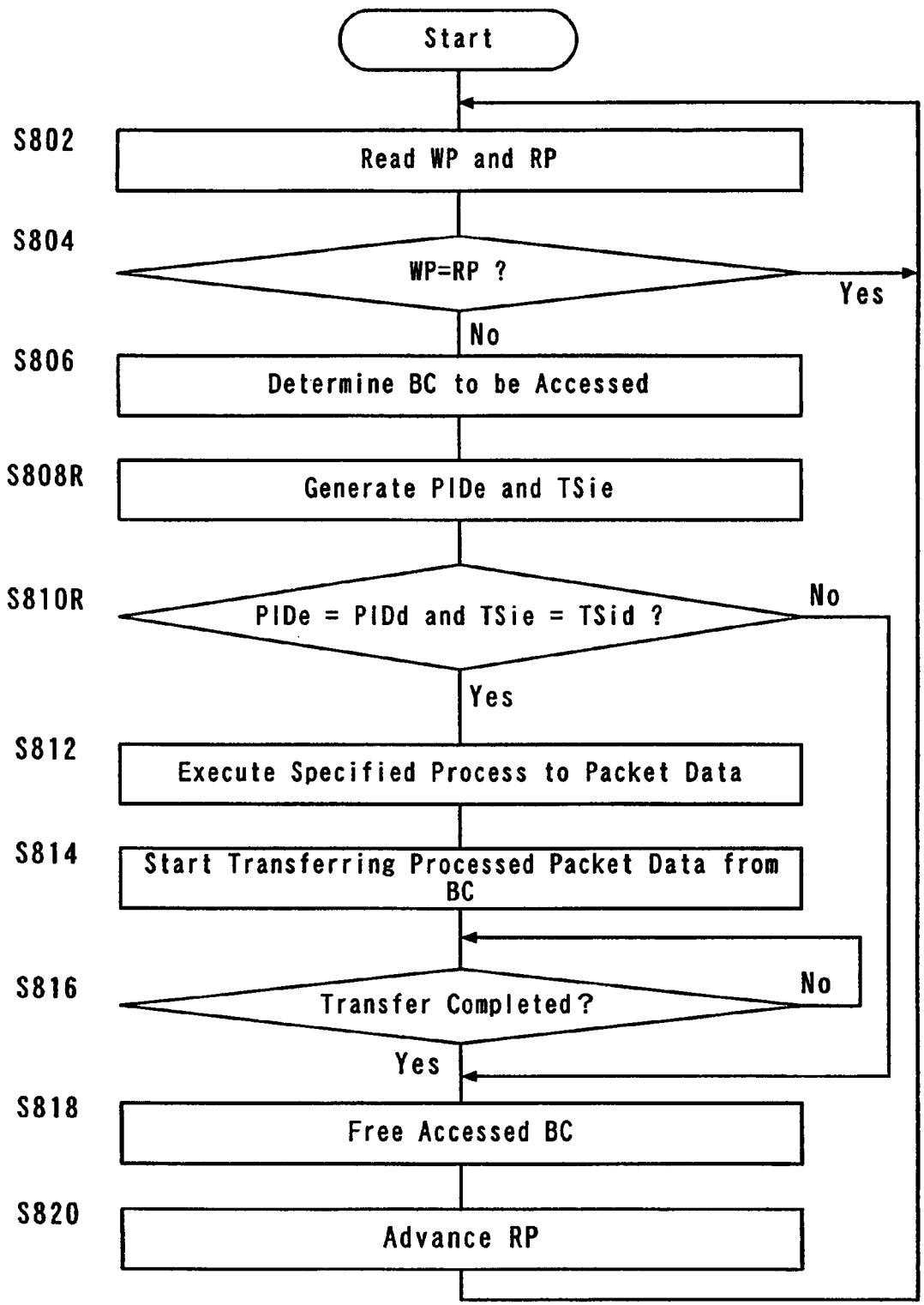
FIG. 19 is a flowchart showing the detailed operation in the subroutine for storing packet data P of plural transport streams TS1 to TSϵ shown in FIG. 17.

With reference to FIGS. 17, 18, and 19, described next is the operation of the transport stream decoder TD2. As illustrated in FIG. 17, the operation of the transport stream decoder TD2 is similar to that of the transport stream decoder TD1. However, the processes of the following eight subroutines are changed as follows for the purpose of processing the packet data P of the plurality of transport streams TS1 to TSε.

That is, subroutine step #200 for presenting distributed programs and possible processes on the single transport stream TS is replaced with subroutine step #200R for presenting distributed programs and possible processes on the plurality of transport streams TS to TSε.

Subroutine step #300 for detecting a request for a process on the single transport stream TS is replaced with subroutine step #300R for detecting a request for a process on the plurality of transport streams TS to TSε.

Subroutine step #400 for determining a process on the single transport stream TS is replaced with subroutine step #400R for determining a process on the plurality of transport streams TS to TSε.

Subroutine step #500 for generating target packet data ID information PIDd is replaced with subroutine step #500R for generating target packet data ID information PIDd and target transport stream ID information TSid.

Subroutine step #600 for storing the packet data P of the single transport stream TS is replaced with subroutine step #600R for storing the packet data P of the plurality of transport streams TS to TSε.

Subroutine step #700 for selecting the target packet data P of the single transport stream TS is replaced with subroutine step #700R for selecting the target packet data P of the plurality of transport streams TS to TSε.

Subroutine step #800 for executing the requested process on the packet data P of the single transport stream TS is replaced with subroutine step #800R for executing the requested process on the packet data P of the plurality of transport streams TS to TSε.

Subroutine step #900 for storing the processed packet data P of the single transport stream TS is replaced with subroutine step #900R for storing the processed packet data P of the plurality of transport streams TS to TSε.

Described below are steps #200R to #900R, mainly the operation unique to the above constructed transport stream decoder TD2. The same operations as those in the transport stream decoder TD1 are not described herein for avoiding redundancy.

In subroutine step #200R for presenting distributed programs and possible processes on the plurality of transport streams TS to TSε, the TD controller TDC2 generates a program content presentation signal Sp2 for output to the sub-process request input section APR. The program content presentation signal Sp2 indicates distributed programs read from the program map tables PAT1 to PATε and the program map tables PMT1 to PMTε stored in the PAT storage areas Ar(PAT) and the PMT storage area Ar(PMT) of the main memory 900*r* for each of transport streams TS1 to TSε.

In subroutine step #300R for detecting a request for a process on the plurality of transport streams TS to TSε, the sub-process request input section APR detects, based on the program content presentation signal Sp2, a user's request for carrying out the process on the plurality of the transport streams TS1 to TSε, and generates a process request signal Se2 for output to the TD controller TDC2.

In subroutine step #400R for determining a process on the plurality of transport streams TS to TSε, the TD controller TDC2 determines, based on the process request signal Se2, a specific process to be carried out at the transport stream decoder TD2 side, and generates process information.

In subroutine step #500R for generating target packet data ID information PIDd and target transport stream ID information TSid, the TD controller TDC2 generates target packet data ID information PIDd representing the packet data P to be processed, and target transport stream ID information TSid representing the transport stream TS to which the target packet data P belongs. This generation is made based on the process information determined in step #400R. Then, the TD controller TDC2 outputs the generated pieces of information to the packet determiner 400*r*.

With reference to FIG. 18, described in detail below is the operation in subroutine step #600R for storing the packet data P of the plurality of transport streams TS to TSε. In the second embodiment, for storing packets of not a single but a plurality of transport streams, steps S602 to S638 except step S608 that are illustrated in FIG. 5 are provided as many as the number of inputted transport streams (ε). Note that exemplarily described in the second embodiment is a case where two transport streams TS1 and TS2 (ε=2) are inputted. However, it is evident that the description can also be applied to a case where two or more (ε>3) transport streams TS are inputted. Moreover, step S605A is newly added between steps S606 and S605. Furthermore, in the second embodiment, step S608 (FIG. 5) for arbitrating input of the packet data P contained in the single transport stream TS by the transfer unit TSd is replaced with step S608R for arbitrating input/output of the packet data P contained in the plurality of transport streams TS to TSε by the transfer unit TSd.

To indicate the relation between the steps and the respective transport streams TS1 to TSε, steps for a specific transport stream TS to be processed are provided with a suffix corresponding to the suffix of the specific transport stream TS. Steps common to all transport streams TS1 to TSε are not provided with any suffix. As stated above, described in the second embodiment is the case where two transport streams TS1 and TS2 (ε=2) are inputted. Therefore, steps for the first transport stream TS1 are provided with a suffix_1, and those for the second transport stream TS2 are provided with a suffix_2, for indicating the target transport stream TS.

Described in detail below is the operation unique to the transport stream decoder TD2, and the operation in step #400R. The transport stream decoder TD2 is supplied with the first transport stream TS1 and the second transport stream TS2 simultaneously. Then, the simultaneously supplied transport streams TS1 to TSε (ε=2) are concurrently subjected to the above steps S602 to S638. In the second embodiment, however, unless otherwise noted, the processes for the first transport stream TS1 are described first, and then those for the second transport stream TS2 are described for convenience in description.

First, in step S602_1, the first transport stream TS1 is supplied from the external transport stream supply source to the first stream input section TSR_1 for starting the process on the first transport stream TS1. The procedure then goes to the next step S604_1.

In step S604_1, the first stream input section TSR_1 detects the head of the packet of the transport stream TS1 being supplied for generating a first packet head detection signal Sps1. The procedure then goes to the next step S606_1.

In step S606_1, the first stream input section TSR_1 outputs the first packet head detection signal Sps1 to the DMA bus arbitrator 210. The first packet head detection signal Sps1 goes through the DMA bus arbitrator 210 to the TSd input start detector 220. The procedure then goes to the next step S605A_1.

In step S605A_1, the first stream input section TSR_1 generates a time stamp St1 based on the time when detecting the head byte of the first transport stream TS1, and a transport stream identifier TSi1 related to the input port group of the DMA bus arbitrator 210r for generating management information IM1. The procedure then goes to the next step S605_1.

In step S605_1, the stream input section TSR_1 stores, in the internal input buffer, the packet data after the packet head. When storing of the transfer unit TSd is completed, the procedure goes to the next step S607_1.

In step S607_1, the stream input section TSR_1 outputs a request signal Srq1 to the DMA bus arbitrator 210. The procedure then goes to the next step S608R.

Concurrently with the processes in the above steps S602_1 to S607_1 for the first transport stream TS1, processes in steps S602_2 to S607_2 are carried out for the second transport stream TS2. Based on the request signals Srq1 and Srq2 outputted in steps S607_1 and S607_2, respectively, the DMA bus arbitrator 210 arbitrates, in step S608R, inputs of the first and second transfer units TSd1 and TSd2 of the first and second transport streams TS1 and TS2, respectively.

In other words, in step S608R, based on the request signals Srq1 and Srq2, the DMA bus arbitrator 210r arbitrates an input of the first transfer unit TSd1 from the first stream input section TSR_1 and an input of the second transfer unit TSd2 from the second stream input section TSR_2 for allowing the input of either one of the first and second transfer units TSd1 and TSd2. The procedure then goes to either one of the next steps S610_1 and S610_2, the one corresponding to the input-allowed transfer unit TSd. Described below is a case where the first transfer unit TSd1 is allowed.

In step S610_1, based on the arbitration result in step S608R, the DMA bus arbitrator 210r outputs a first data effective signal Sde1 to the first stream input section TSR_1 for allowing the input of the input-allowed transfer unit TSd1. The procedure then goes to the next step S612_1.

In step S612_1, in response to the first data effective signal Sde1 outputted in step S610, transfer of the first transfer unit TSd1 from the first stream input section TSR_1 to the DMA bus arbitrator 210r is started. The first transfer unit TSd1 goes through the DMA bus arbitrator 210r to TSd input start detector 220. The procedure then goes to the next step S614_1.

In step S614_1, based on a first packet head detection signal Sps1 outputted in step S606_1, the TSd input start detector 220 detects that input of the first transfer unit TSd1 has been started.

That is, based on the first data effective signal Sde1 outputted in step S610_1, the TSd input start detector 220 detects the start of input of the first transfer unit TSd1 when detecting the first transfer unit TSd1 that comes first of the one packet data P. With the first data effective signal Sde1 outputted, the start of input of the first transfer unit TSd1 is detected.

When the first transfer unit TSd1 first comes after the first packet head detection signal Sps1 is supplied as a result of arbitration in step S608R, the TSd input start detector 220 detects the start of input of the head of the packet coming from the first stream input section TSR_1. Similarly, when the second transfer unit TSd2 first comes after the second packet head detection signal Sps2 is supplied as a result of arbitration in step S608R, the TSd input start detector 220 detects the start of input of the head of the packet coming from the second stream input section TSR_2. The procedure then goes to the next step S615_1.

In step S615_1, the TSd input start detector 220 determines whether the first transfer unit TSd1 is the head of the packet data P based on whether the first transfer unit TSd1 is the first one after the first packet head detection signal Sps1 comes. If it is determined that the transfer unit TSd1 is the head of the packet data P, the procedure goes to the next step S616_1. If it is determined that the transfer unit TSd1 is not the head of the packet data P, the procedure skips steps S616_1, S618_1, S620_1, S622_1, S624_1, S626_1, and S628_1 to step S630_1. As such, the buffer cell to be written with the first transfer unit TSd1 of the first transport stream TS1 is allocated and prepared for use.

As with the first transport stream TS1, based on arbitration in step S608R, the processes in step S610_2 to S638_2 are carried out on the second transport stream TS2. The packet data P of the second transport stream TS2 is stored in a predetermined buffer cell Bc by the second transfer unit TSd2.

With the above steps, buffering can be sequentially carried out on a real-time basis in step #600R with the information (IM) about the relation between the packet data P and the transport streams TS1 to TSε that contain the packet data P and are supplied to the transport stream decoder TD2, and about the relation in time among the different transport streams TS.

With reference to FIG. 19, next described in detail is the operation in subroutine step #800R for executing the requested process on the packet data P of the plurality of transport streams TS to TSε. In the second embodiment, for storing the packets of not a single transport stream but a plurality of transport streams, steps S808 and S810 shown in FIG. 6 are replaced with steps S808R and S810R, respectively. Described in detail below is the operation unique to the transport stream decoder TD2 and the operation in step #800R.

As with the first embodiment (FIG. 6), illustrated in FIG. 19 is the operation applicable both concurrent processing and sequential processing of step #600R and steps #700R to #900R.

First, through a series of processes in steps S802, S804, and S806, a buffer cell Bcn storing the packet data to be processed upon user's request is determined. The procedure then goes to the next step S808R.

In step S808R, the management information IM is read from the packet data P stored in the buffer cell Bcn (packet buffer 270r) determined in step S806. Based on the read management information IM, the buffer packet ID information PIDe and the transport stream ID information TSie are generated for output to the packet determiner 400r. The procedure then goes to the next step S810R In step S810R, the packet determiner 400r determines whether the buffer packet ID information PIDe matches the target packet data ID information PIDd, and also whether the transport stream ID information TSie matches the target transport stream ID information TSid. As such, by checking whether matching simultaneously occurs as to both the packet identifier PID and the transport stream identifier TSi, it is possible to identify the plurality of packet data P having the same packet identifier PID but contained in different transport streams TS. If Yes in step S810R, that is, if the packet data currently being accessed is the subject of the user-requested process, the procedure goes to the next step S812.

The subsequent processes in steps S812 to S820 have been described with reference to FIG. 6, and therefore are not described herein.

As stated above, for carrying out the user-desired process on a plurality of programs contained in sequentially inputted transport streams TS, only the corresponding packet data P selected from all packet data P contained in the different transport streams TS is subjected to the process. However, the different transport streams TS simultaneously supplied may have a plurality of packet data P varying in input rate or having the same packet identifier PID. Therefore, it is not possible to ensure the sequentially supplied plurality of packet data P be processed for a predetermined time period.

To get around the above problem, in the second embodiment, each packet data P contained the inputted plurality of transport streams TS1 to TSε is provided with the transport stream identifier TSi and the time stamp St, thereby enabling each packet data P to be surely identified with a combination of the packet identifier PID. Then, as with the first embodiment, the plurality of identifiable packet data P of the transport streams TS1 to TSε are, in the order in which they comes, each confined in a predetermined buffer cell Bc for a predetermined time period, and this process is managed by the write pointer WP. Then, it is determined whether the confined packet data P is the target packet data and, if it is the target packet data, the packet data P is processed and then outputted. This process is managed by the read pointer RP. This series of operation is controlled and ensured by a hybrid of hardware and software.

As described above with reference to FIG. 20, in the second embodiment of the present invention, the inputted plurality of transport streams TS1 to TSε are each composed of a plurality of packet data Peach provided with a unique packet identifier PID. Also, as described above with reference to FIG. 9, the inputted plurality of transport streams TS1 to TSε may be each composed of a plurality of packet data P provided with a packet identifier PID unique to each packet data group to which the packet data P belongs, such as the transport streams TS having the packet structure as stipulated in ISO/IEC 13818-1 (MPEG2 system).

Figure 23:
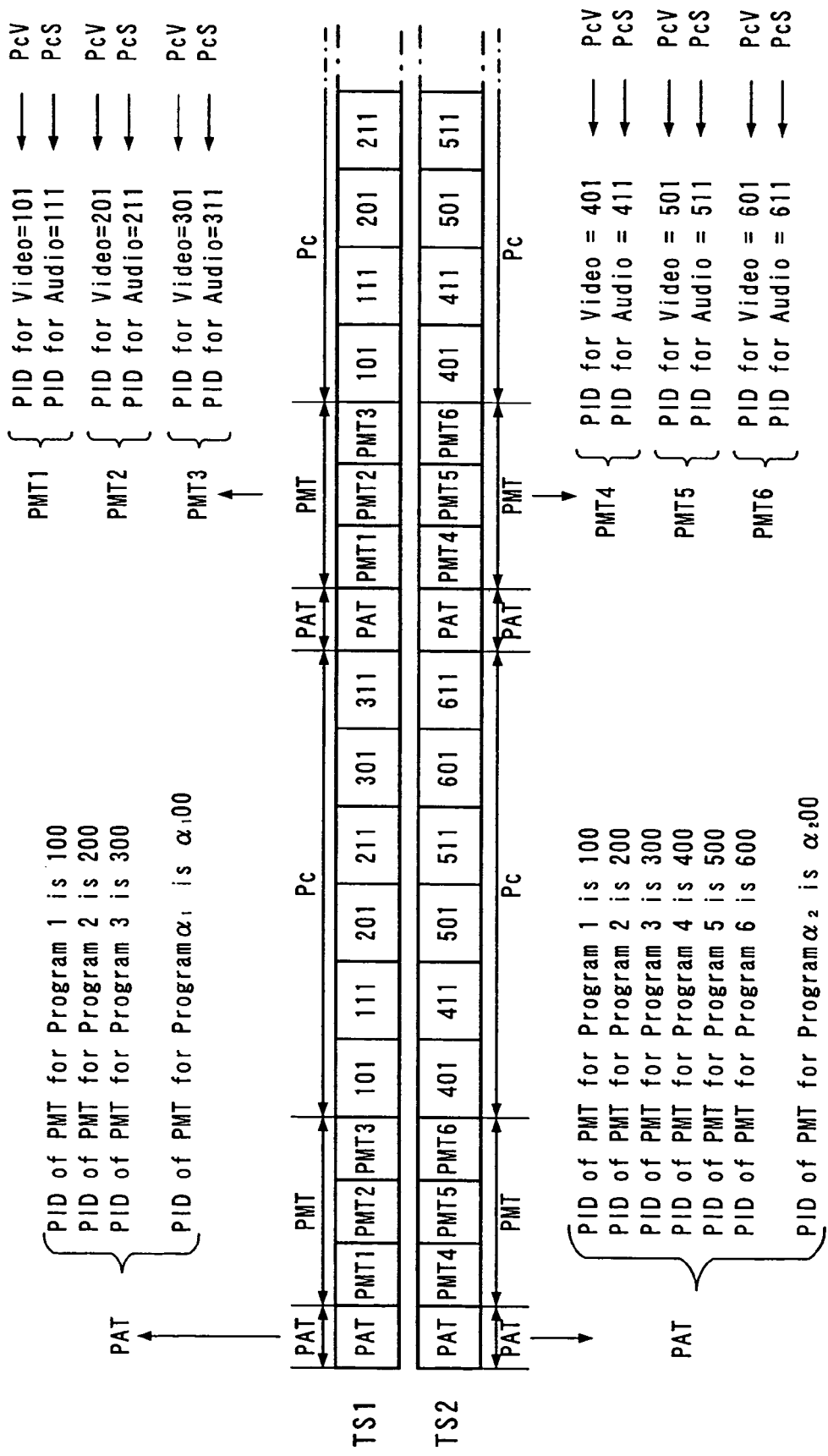
FIG. 23 is an illustration for demonstrating the structure of two transport streams as stipulated in ISO/IEC 13818-1 (MPEG2 system) supplied to the transport stream decoder shown in FIG. 15.

Illustrated in FIG. 23 are example packet structures of the two transport streams TS1 and TS2 provided with the packet identifier PID for every packet data group. As with the example illustrated in FIG. 20, illustrated in FIG. 23 are an example structure of the first transport stream TS1 providing at least three different programs 1, 2, 3, . . . , α1, and an example structure of the second transport stream TS2 providing at least six different programs 1, 2, 3, 4, 5, 6, . . . , α2.

The first transport stream TS1 has been described with reference to FIG. 9, and therefore is not described herein. Also, the second transport stream TS2, as with the first transport stream TS1, video data for the program 4 is defined as program content (PC) packet data Pc401, and audio data therefor is defined as PC packet data Pc411. Video data for the program 5 is defined as PC packet data Pc501, and audio data therefor is defined as PC packet data Pc511. Video data for the program 6 is defined as PC packet data Pc601, and audio data therefor is defined as PC packet data Pc611.

As such, the transport streams TS illustrated in FIG. 23 are similar in structure to those described with reference to FIG. 9, except that the packet data P is provided with a unique identifier for each of types of the packet data P, unlike that every packet data P composing the transport stream TS has a unique packet identifier PID.

Described next is the operation when the plurality of transport streams TS1 to TSε having the above packet structure are supplied to the transport stream decoder TD2 according to the second embodiment of the present invention. Providing the unique packet identifier PID to each packet data group by each content of the packet data P is substantially the same as providing only the upper three digits of the packet identifier PID of the packet data P to the transport stream TS illustrated in FIG. 20. That is, also in the second embodiment, by extracting the PC packet data Pc101 and Pc201 from the first transport stream TS1 and extracting the PC packet data Pc401 and PC501 from the second transport stream TS2, it is possible to generate a plural programs (PP) video packet data string substantially the same in packet structure as the video packet data PcV illustrated in FIG. 22.

Similarly, by extracting the PC packet data Pc111 and Pc211 from the first transport stream TS1 and extracting the PC packet data Pc411 and Pc511 from the second transport stream TS2, it is possible to generate a plural programs (PP) audio packet data string substantially the same in packet structure as the audio packet data PcS illustrated in FIG. 22.

However, the target packet data ID information PIDd generated in the TD controller TDC2 and the buffer packet ID information PIDe read from the packet data P stored in the buffer cell Bc both indicate a packet data group. Therefore, when the packet determiner 400r determines that the buffer packet ID information PIDe matches the target packet data ID information PIDd, of all packet data P that belong to the packet data group having the packet identifier PID determined as matched, only the packet data P that belong to the same transport stream TS are subjected to the same process. This process is substantially the same as the process where, by specifying the upper some digits of the packet identifiers PID of all packet data P of the transport stream TS illustrated in FIG. 20 and the transport stream TS, the packet data P having the packet identifier PID of the same upper digits are collectively subjected to the unique process as a group.

Third Embodiment

Figure 27:
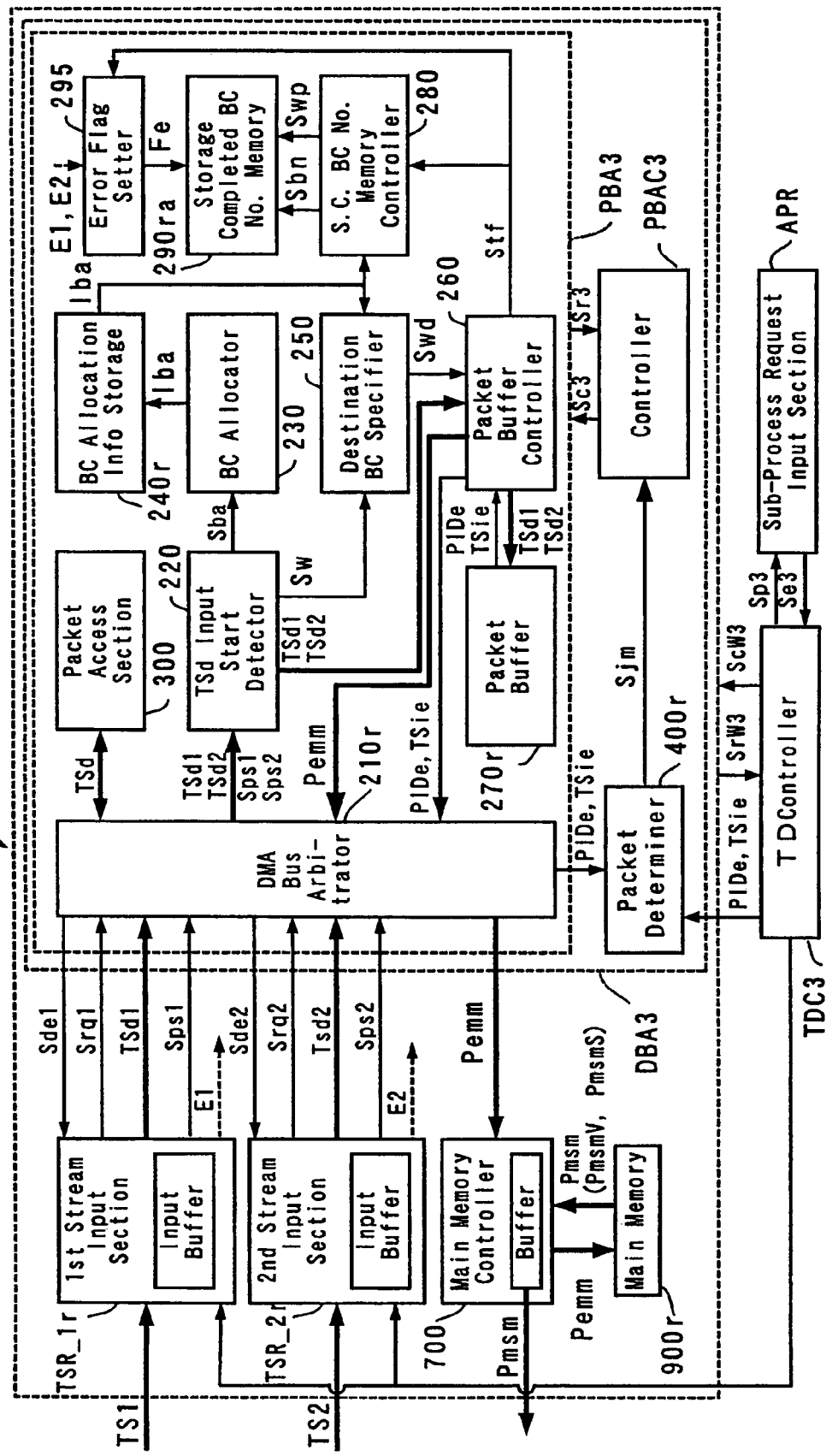
FIG. 27 is a block diagram showing the construction of a transport stream decoder having a data buffer incorporated herein according to a third embodiment of the present invention.

With reference to FIGS. 27, 28, 29, 30, 31, 32, and 33, described below is a data buffering apparatus according to a third embodiment of the present invention. Illustrated in FIG. 27 is a transport stream decoder TD3 having a data buffering apparatus DBA3 according to the third embodiment incorporated therein. In the third embodiment, as with the second embodiment, it is ensured that the plurality of inputted transport streams TS1 to TSε are respectively subjected to their specific processes. Additionally, in the third embodiment, the transport stream decoder TD3 takes measures against a case where the inputted transport stream TS has data error. Therefore, the transport stream decoder TD3 is basically the same in construction as the transport stream decoder TD2 illustrated in FIG. 15.

That is, the transport stream decoder TD3 is similar in construction to the transport stream decoder TD2 illustrated in FIG. 15, except the data buffering apparatus DBA2 is replaced with the data buffering apparatus DBA3, the stream input section TSR is replaced with a first stream input section TSR_1r and a second stream input section TSR_2r, and the TD controller TDC2 is replaced with a TD controller TDC3. The stream input sections TSR_1r to TSR_εr are provided as many as the number of transport streams TS simultaneously supplied to the transport stream decoder TD3. In the third embodiment, specifically described is a case where two transport streams TS are supplied.

Furthermore, the data buffering apparatus DBA3 is similar in construction to the data buffering apparatus DBA2 illustrated in FIG. 15, except that the packet buffering arbitrator PBA2 is replaced with a packet buffering arbitrator PBA3, and the controller PBAC2 is replaced with a controller PBAC3.

Still further, the packet buffering arbitrator PBA3 is similar in construction to the packet buffering arbitrator PBA2 illustrated in FIG. 15, except that the storage-completed BC No. memory 290r is replaced with storage-completed BC No. memory 290ra, and an error flag setter 295 is newly provided.

Prior to description of these newly provided components, described below is a basic concept of the transport stream decoder TD3 in the third embodiment. As with the second embodiment, exemplarily described in the third embodiment is the case where a predetermined process to be carried out on the selected packet data P corresponding to a plurality of programs contained in a plurality of transport streams is extraction of a plurality of programs from the plurality of transport streams TS1 to TSε. Furthermore, an object of the third embodiment is to efficiently control the packet buffer 270r even when the inputted transport stream TS has data error.

That is, the transport stream TS inputted to the transport stream decoder TD may have error in a unit of packet or smaller unit due to various factors on a transmission path. If such transport stream TS having error is buffered by the transport stream decoder TD1 or TD2 in a manner similar to that applied when normal data is buffered, the series of processing on the packet data P after buffering may fail. Even if not fail, processing on such error data is meaningless, thereby impairing operation efficiency of the entire transport stream decoder TD. An object of the third embodiment is to manage and free the buffer cell Bc that stores the packet data having data error by software, thereby preventing the above problem.

One method for freeing the buffer cell Bc is resetting the buffer cell Bc by hardware when data error is detected in the incoming transport stream TS. However, this method poses significant problems of adjusting timing with various data processing after buffering by a unit of the buffer cell Bc. Therefore, in the present invention, data error in the transport stream TS is detected by hardware, and then the corresponding buffer cell Bc is freed by software. In the third embodiment, as with the second embodiment, exemplarily described is the case where a plurality of transport streams TS are inputted. This is not restrictive and, needless to say, the description can be applied to a case where a single transport stream TS is inputted.

Referring back to FIG. 27, described in detail below are the components unique to the transport stream decoder TD3. The operations of the same components as those in the transport stream decoder TD2 are basically not described herein for avoiding redundancy.

The first stream input section TSR_1r and the second stream input section TSR_2r detect error in the incoming first transport stream TS1 and the incoming second transport stream TS2 have error, respectively, and output a first error signal E1 and a second error signal E2, respectively, to the error flag setter 295 in the data buffering apparatus DBA3. The operations of the first and second stream input sections TSR_1r and TSR_2r are similar to those of the first and second stream input sections TSR_1 and TSR_2, except that they can output first and second error signals E1 and E2, respectively.

Based on the first error signal E1 outputted from the first stream input section TSR_1r or the second error signal E2 outputted from the second stream input section TSR_2r, and also based on the transfer complete signal supplied from the packet buffer controller 260, the error flag setter 295 generates an error flag signal Fe. The error flag signal Fe is to set, in a flag storage area Fc provided on a storage-completed BC No. memory 290ra, an error flag indicating the buffer cell Bc that stores the packet data P having data error. The error flag setter 295 then outputs the generated error flag signal Fe to the storage-completed BC No. memory 290ra.

Figure 29:
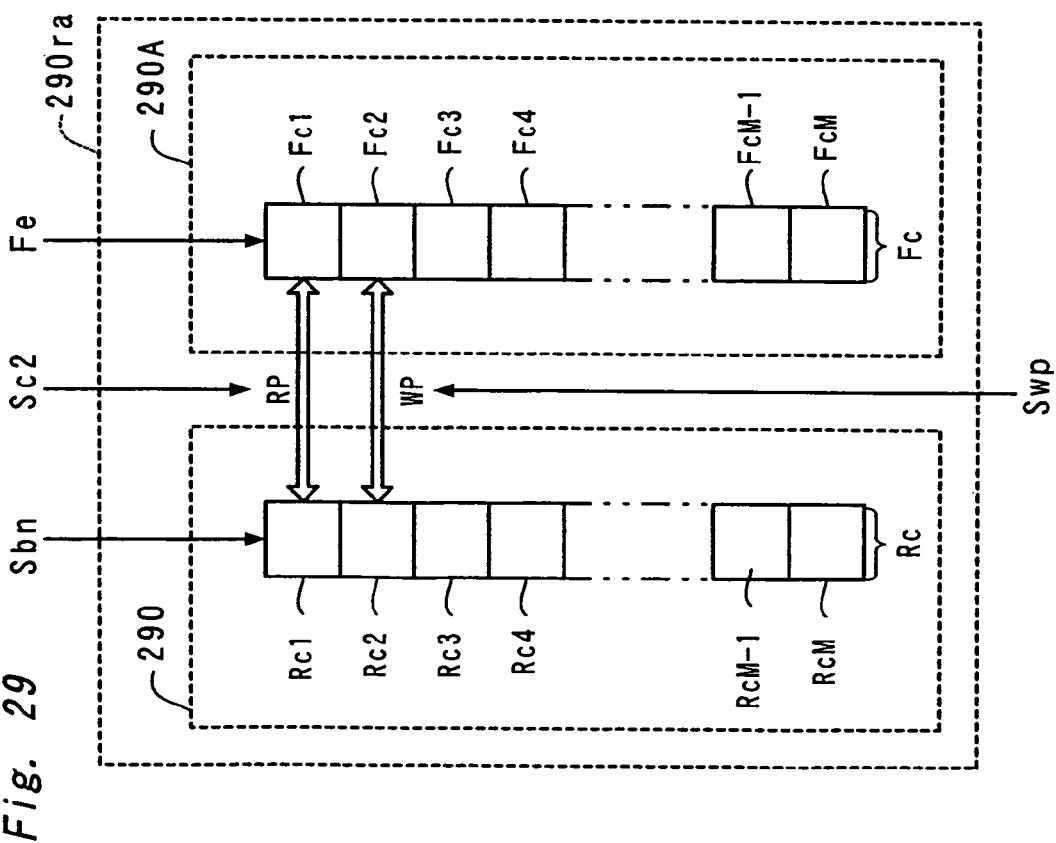
FIG. 29 is a block diagram showing the detailed construction of store-complete buffer cell number memory shown in FIG. 27.

With reference to FIG. 29, specifically described is the structure of the storage-completed BC No. memory 290ra. The storage-completed BC No. memory 290ra is similar in construction to the storage-completed BC No. memory 290 illustrated in FIG. 2, except that error flag memory 290A is added.

The error flag memory 290A has flag storage areas Fc (Fc1 to FcM) respectively corresponding to the BC specifying areas Rc1 to RcM of the storage-completed BC No. memory 290. As with the storage-completed BC No. memory 290, the error flag memory 290A is preferably implemented by ring memory, sequentially and circularly recording flag values in the flag storage areas Fc1 to FcM based on the error flag signal Fe supplied from the error flag setter 295.

The BC specified area Rcm to have the BC number Nbcn written therein and the flag storage area Fcm to have the flag value written therein based on the error flag signal Fe are indicated by the same write pointer WP. The BC specified area Rcm from which the written BC number Nbcn is to be read and the flag storage area Fcm from which the flag value is to be read are indicated by the same read pointer RP. The read pointer RP is advanced based on a control signal Sc3 outputted from a controller PBAC3.

Figure 30:
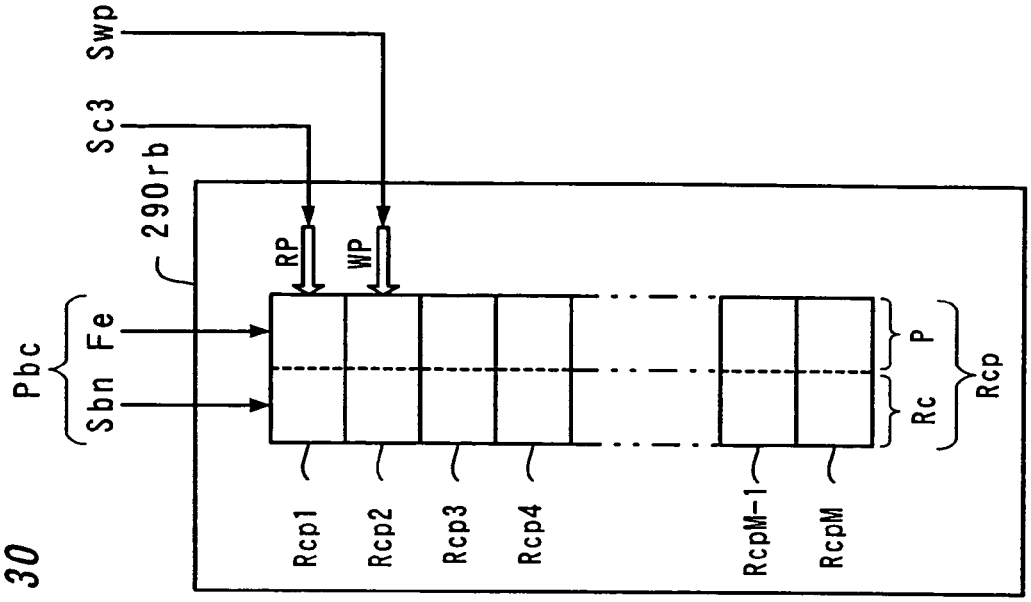
FIG. 30 is a block diagram showing the detailed construction of a modified example of the store-complete buffer cell number memory shown in FIG. 29.

Further referring to FIG. 30, described is an example modification of the storage-completed BC No. memory 290ra. To put it briefly, in storage-completed BC No. memory 290rb in the present example, the BC specifying areas Rc of the storage-completed BC No. memory 290 and the error flag memory 290A of the storage-completed BC No. memory 290ra are integrally constructed to form buffer cell (BC) attribute storage areas Rcp (Rcp1 to RcpM). Furthermore, the BC No. signal Sbn and the error flag signal Fe are integrally coupled, and recorded in the BC attribute storage area Rcp as attribute data Pbc indicating the state of the buffer cell Bc storing data. By managing the state of the buffer cell Bc managed with one type of data, it is possible to allocate and free the buffer cell Bc more efficiently.

The TD controller TDC3 controls the operation of the entire transport stream decoder TD3. The transport stream decoder TD3 generates a state signal SrW3 indicating the state of operation of each of the components for output to a TD controller TDC3. Based on the state signal SrW3, the TD controller TDC3 generates a control signal ScW3 for controlling the operation of each of the components of the transport stream decoder TD3, and outputs the control signal ScW3 to the transport stream decoder TD3. Generation of the state signal SrW3 and the control signal ScW3 and control of the transport stream decoder TD3 are known art, and therefore are not described herein.

Figure 28:
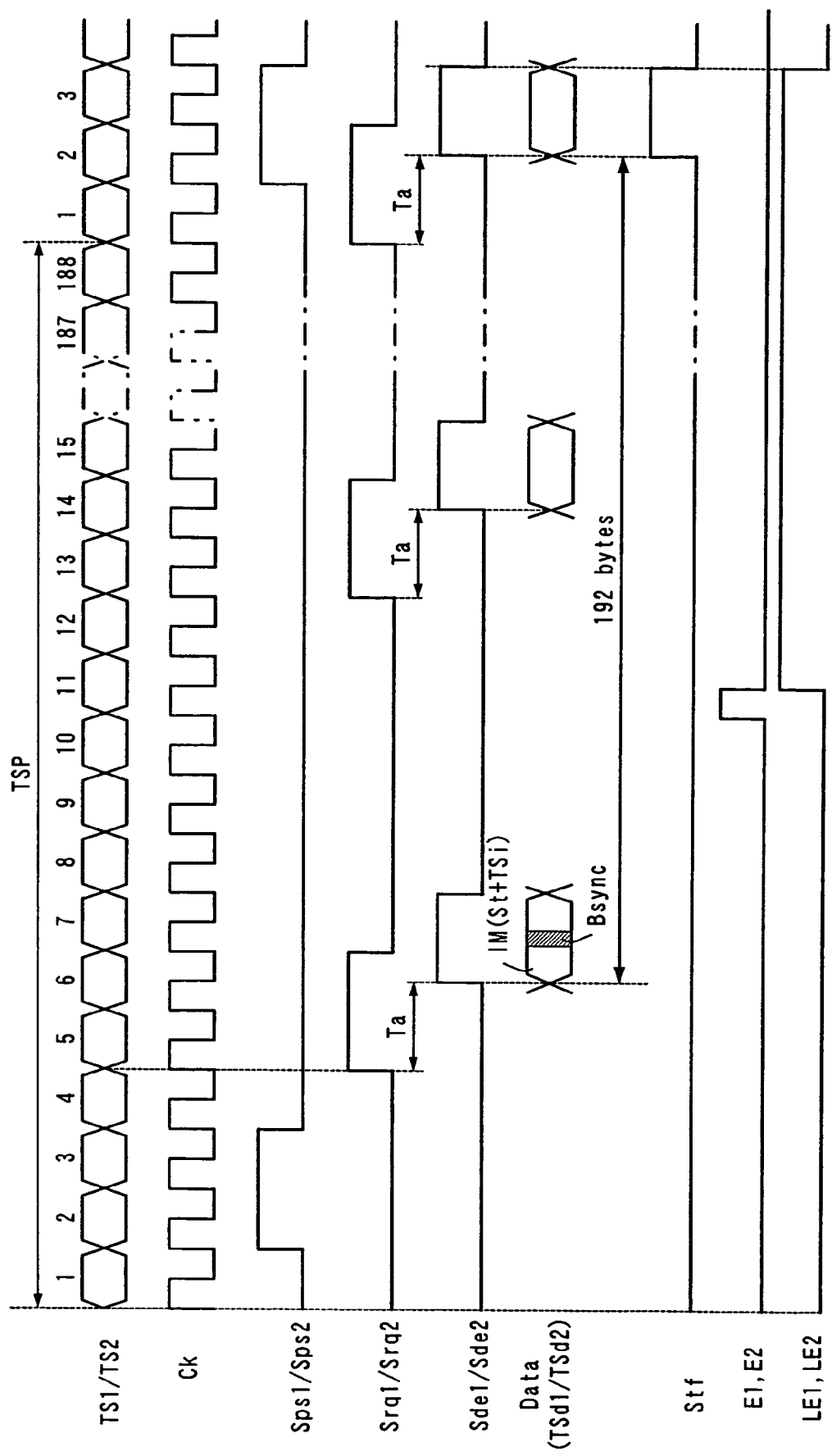
FIG. 28 is waveform diagram showing various signals in the transport stream decoder shown in FIG. 27.

With reference to a waveform chart illustrated in FIG. 28, briefly described next are the operations of the first stream input section TSR_1r, the second stream input section TSR_2r, the DMA bus arbitrator 210r, the packet buffer controller 260ra, and the error flag setter 295. In the drawing, only one typical waveform is illustrated for convenience, either one of the first and second transport streams TS1 and TS2, either one of the first and second packet head detection signals Sps1 and Sps2, either one of the first and second request signals Srq1 and Srq2, either one of the first and second data effective signals Sde1 and Sde2, either one of the first and second transfer units TSd1 and TSd2, either one of the first and second error signals E1 and E2, and either one of first and second latch error signals LE1 and LE2. However, these signals can inherently somewhat vary in timing and waveform. Specifically described below is only the first transport stream TS1, and the second transport stream TS2 is not described herein for avoiding redundancy.

As has been described with reference to FIG. 27, the first and second stream input sections TSR_1r and TSR_2r outputs eight bytes of the incoming packet data P as the first and second transfer units TSd1 and TSd2, respectively, to the DMA bus arbitrator 210r.

Based on the first packet head detection signal Sps1 and the first transfer unit TSd1 supplied from the DMA bus arbitrator 210r, the TSd input start detector 220 detects that input of the first transfer unit TSd1 has been started by the unit of packet data P. The TSd input start detector 220 also supplies the first transfer unit TSd1 to the packet buffer controller 260.

Similarly, based on the second packet head detection signal Sps2 and the second transfer unit TSd2 supplied from the DMA bus arbitrator 210r, the TSd input start detector 220 detects that input of the second transfer unit TSd2 has been started by the unit of packet data P. The TSd input start detector 220 also supplies the second transfer unit TSd2 to the packet buffer controller 260.

Whenever detecting the start of input of the first or second transfer unit TSd1 or TSd2 in the above described manner, the TSd input start detector 220 generates a BC request signal Sba for requesting the BC allocator 230 to allocate one of the buffer cells Bc of the packet buffer 270r for storing the incoming packet data P, and outputs the BC request signal Sba to the BC allocator 230. Furthermore, the TSd input start detector 220 generates a write enable signal Sw indicating that the writing in the allocated buffer cell can be started, and outputs the write enable signal Sw to the destination BC specifier 250.

Based on the write request signal Swd supplied from the destination BC specifier 250, the packet buffer controller 260 writes, the allocated buffer cell Bc of the packet buffer 270r, the first and second transfer units TSd1 and TSd2 coming through the DMA bus arbitrator 210r and the TSd input start detector 220.

After the packet data P has been written in the allocated buffer cell Bc in the above described manner, when the eleventh byte of the first transport stream TS2 has data error, the stream input section TSR1r generates a first error signal E1 for output to the error flag setter 295.

The error flag setter 295 generates a first latch error signal LE1, which is a binary signal that becomes HIGH when the error flag setter 295 receives the first error signal E1 and LOW when the error flag setter 295 receives the transfer complete signal Stf. Similarly, the error flag setter 295 generates a second latch error signal LE2, which is a binary signal that becomes HIGH when the error flag setter 295 receives the second error signal E2 and LOW when the error flag setter 295 receives the transfer complete signal Stf. These first and second latch error signals LE1 and LE2 are outputted as the error flag signal Fe to the storage-completed BC No. memory 290ra.

Figure 31:
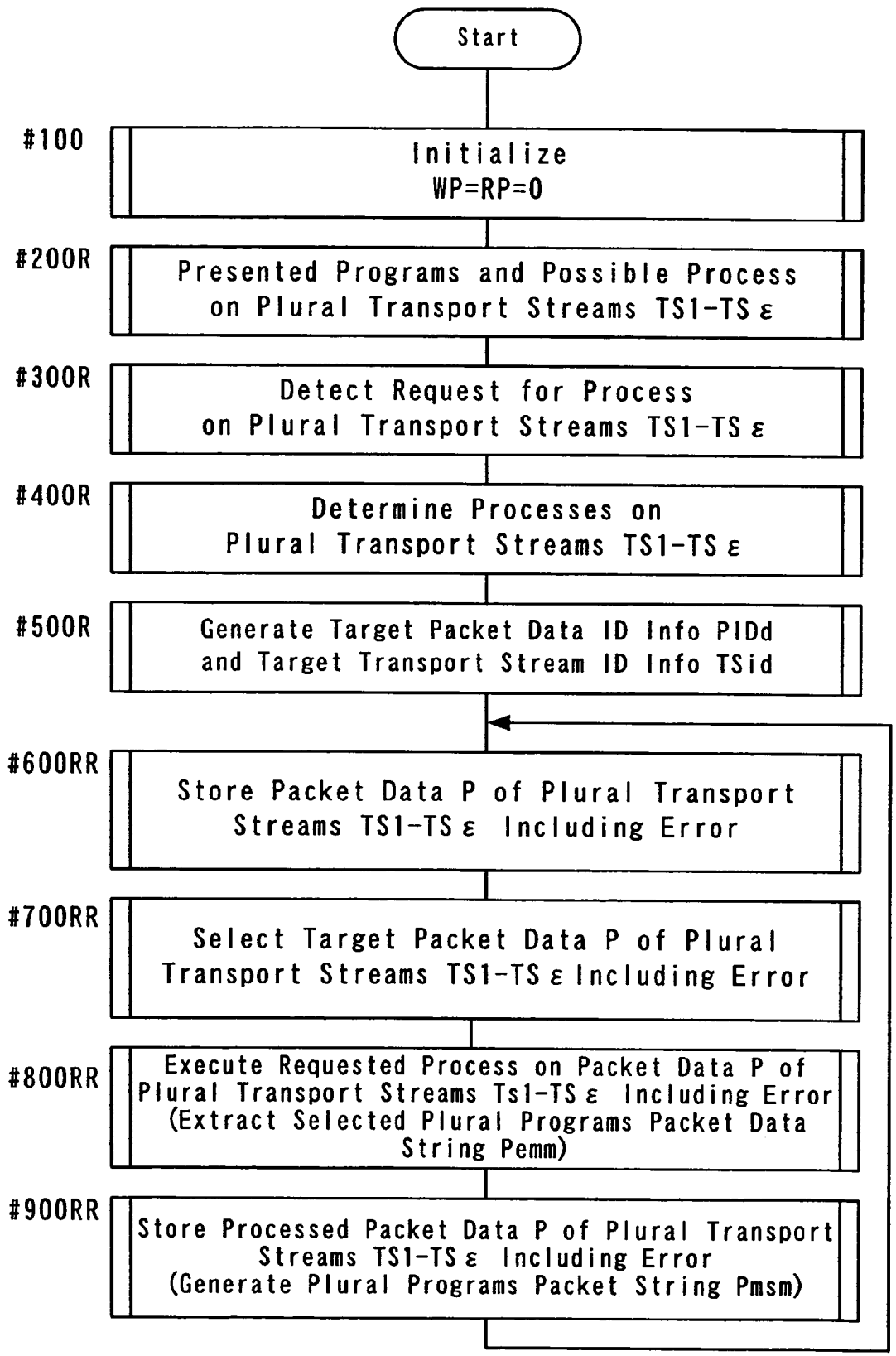
FIG. 31 is a flowchart showing the main operation of the transport stream decoder shown in FIG. 27.
Figure 32:
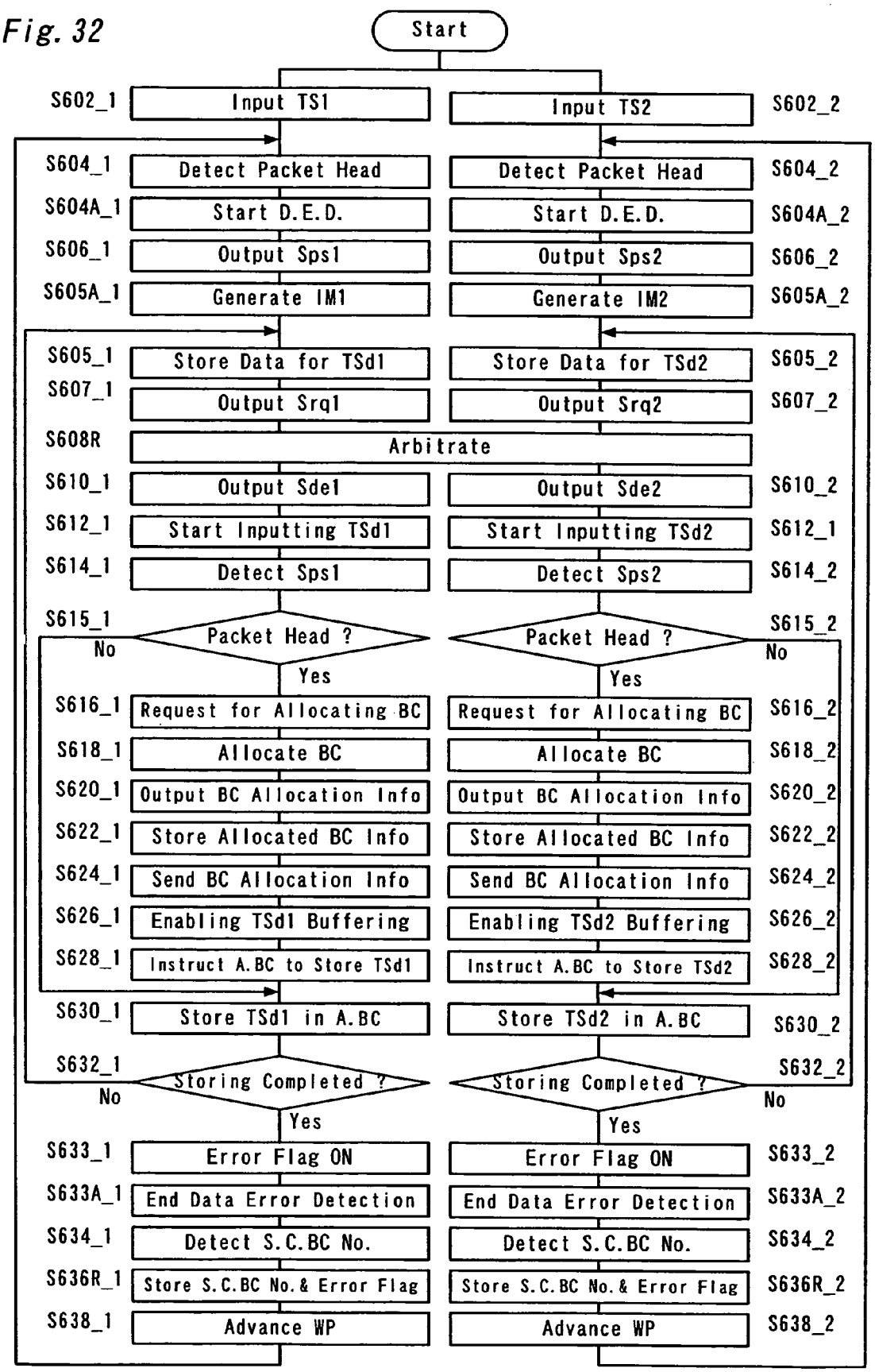
FIG. 32 is a flowchart showing the detailed operation in a subroutine for storing packet data P of a plural transport stream TS1 to TSϵ having data error shown in FIG. 27.

With reference to FIGS. 31 and 32, described in detail next is the operation of the transport stream decoder TD3. As illustrated in FIG. 31, the operation of the transport stream decoder TD2 is similar to that of the transport stream decoder TD2. However, the processes of the following four subroutines are changed as follows for the purpose of enabling control by the data buffering control apparatus DBA3 when any of plurality of transport streams TS1 to TSε has data error.

That is, subroutine step #600R for storing the packet data P of the plurality of transport streams TS to TSε is replaced with subroutine step #600RR for storing the packet data P of the plurality of transport streams TS to TSε including data error.

Subroutine step #700R for selecting the target packet data P of the plurality of transport streams TS to TSε is replaced with subroutine step #700RR for selecting the target packet data P of the plurality of transport streams TS to TSε including data error.

Subroutine step #800R for executing the requested process on the packet data P of the plurality of transport streams TS to TSε is replaced with subroutine step #800RR for executing the requested process on the packet data P of the plurality of transport streams TS to TSε including data error.

Subroutine step #900 for storing the processed packet data P of the single transport stream TS is replaced with subroutine step #900RR for storing the processed packet data P of the plurality of transport streams TS to TSε including data error.

Described below are steps #600RR to #900RR, mainly the operation unique to the above constructed transport stream decoder TD3. The same operations as those in the transport stream decoder TD2 are not described herein for avoiding redundancy.

With reference to FIG. 32, described in detail below is subroutine step #600RR for storing the packet data P of the plurality of transport streams TS to TSε including data error. As illustrated in FIG. 32, the operation of step #600RR is similar to that of step #600R carried out by the transport stream decoder TD2 illustrated in FIG. 18. However, for the purpose of enabling control by the data buffering control apparatus DBA3 when any of plurality of transport streams TS1 to TSϵ has error, one step is changed, and three new steps are provided for every transport stream TS as follows.

That is, between steps S604_1 and S606_1, new step S604A_1 for starting data error detection (denoted as "Start D.E.D" in FIG. 32) is provided for the first transport stream TS1. Similarly, between steps S604_2 and S606_2, new step S604A_2 for starting data error detection is provided for the second transport stream TS2.

Furthermore, between steps S632_1 and S634_1, new step S633_1 for setting the error flag ON/OFF and new step S633A_1 for ending data error detection are provided for the first transport stream TS1. Similarly, between steps S632_2 and S634_2, new step S633_2 for setting the error flag ON/OFF and new step S633A_2 for ending data error detection are provided for the second transport stream TS2.

Still further, step S636_1 for storing the storage-completed BC number for the first transport stream TS1 is changed to step S636R_1 for storing the storage-completed BC number and the error flag. Similarly, step S636_2 for storing the storage-completed BC number for the second transport stream TS2 is changed to step S636R_2 for storing the storage-completed BC number and the error flag. Described below are details of the operation unique to the transport stream decoder TD3 and a brief of the operation of the entire step #400RR. Note that, also in the third embodiment, two transport streams TS (ϵ=2), the first and second transport streams TS1 and TS2, are processed concurrently. Therefore, the process in each step is specifically described only for the first transport stream TS1. For the second transport stream TS2, the corresponding step numbers and components are enclosed in parentheses and added to those for the first transport stream TS1.

As with the transport stream decoder TD2, through steps S602_1 (S602_2) and S604_1 (S604_2), the head of the packet of the incoming transport stream TS is detected. The procedure then goes to the next step S604A_1 (S604A_2).

In step S604A_1 (S604A_2), the stream input section TSR_1r (TSR_2r) start data error detection in the incoming packet data P. The data error detection that starts in this step is continuously executed until it ends in step S633A_1 (S633A_2) concurrently with other steps S605_1 to S632_1 (S605_2 to S632_2). When data error is detected, an error signal E indicating the transport stream TS having the data error is generated for output.

After steps S606_1 to S630_1 (S606_2 to S630_2), If No in step S632_1 (S632_2), the request signal Srq1 (Srq2) is outputted by the first transfer unit TSd1 (the second transfer unit TSd2) from the first stream input section TSR_1r (the second stream input section TSR_2r) to the DMA bus arbitrator 210r in step S607_1 (S607_2). The DMA bus arbitrator 210r responds to the request signals and Srq2 for carrying out arbitration in step S608R. The DMA bus arbitrator 210 outputs a data effective signal Sde1 or Sde2 to the corresponding stream input section TSR_1 or TSR_2 in step S610_1 or S610_2. In step S614_1, the stream input section TSR_1 responds to the data effective signal Sde1 to start transfer of the next transfer unit TSd1 of the packet data P. In step S614_2, the stream input section TSR_2 responds to the data effective signal Sde2 to start transfer of the next transfer unit TSd2 of the packet data P. As such, step S606_1 to S630_1 (S606_2 to S630_2) are repeated until Yes is determined in step S632_1 (step S632_2).

During the above processing, the packet buffer controller 260 counts the number of bytes written in the buffer cell Bc for each transfer unit TSd1 and each transfer unit TSd2, detecting that storing the transfer unit TSd for one packet data in the buffer cell has been completed. Furthermore, the packet buffer controller 260 generates a transfer complete signal Stf for output to the storage-completed BC No. memory controller 280 and the error flag setter 295. The count number can be obtained by the data size of the packet data P of the incoming transport stream TS, the data size indicated by the transport stream structure information previously stored in the TD controller TDC3. Then, the procedure goes to the next step S633_1 (S633_2).

In step S633_1 (S633_2), the error flag setter 295 responds to the transfer complete signal Stf1 (Stf2) outputted from the packet buffer controller 260 to write the error flag value in the flag storage area Fcm indicated by the write pointer WP based on the error signal Eϵ (ϵ=1 or 2 in the third embodiment) outputted from the stream input section TSR_ϵ during steps S604_1 to S632_1 (S604_2 to S632_2). That is, if data error is detected in the packet data P being stored in the buffer cell Bc during steps S604_1 to S632_1 (S604_2 to S632_2), a value equivalent to "error flag ON" is written in the flag storage area Fcn when the transfer complete signal Stf is supplied.

On the other hand, if the packet data P is stored in the buffer cell Bc without any data error detected during steps S604_1 to S632_1 (S604_2 to S632_2), a value equivalent to "error flag OFF" is written in step S633_1 (S633_2) in the flag storage area Fcn when the transfer complete signal Stf is supplied. Note that if the initial value of the flag storage area Fcn is set "error flag OFF", nothing is written in the flag storage area Fcn in step S633_1 (S633_2). In this case, how to reset the flag storage area Fc with "error flag ON" written therein will be described later with reference to FIG. 33. The procedure then goes to the next step S633A_1 (S633A_2).

In step S633A_1 (S633A_2), data error detection in the incoming transport stream TS by the stream input section TSR_1r (TSR_2r) ends. The procedure then goes through the above step S634_1 (S634_2) to step S636R_1 (S636_R).

In step S636R_1 (S636R_2), the storage-completed BC No. memory 290ra records the BC number Nbc indicated by the BC No. signal Sbn in an area indicated by the write pointer WP. Similarly, the storage-completed BC No. memory 290ra writes the error flag value in the flag storage area Fcm indicated by the error flag signal Fe. The procedure then goes to the next step S638_1 (S638_2).

After the write pointer WP is advanced by one in step S638_1 (S638_2) in the above described manner, the procedure returns to step S604_1 (S604_2). As such, subroutine step #600RR is executed for storing the packet data P of the plurality of transport streams TS to TSϵ including data error.

With reference to a waveform chart illustrated in FIG. 28, described below are the operation of the respective components for writing the error flag value in the above step S633A_1 (S633A_2). In an example illustrated in FIG. 28, a period when the second byte of the first packet data P of the transport stream TS1 (TS2) to the third byte of the second packet data P thereof corresponds to a period during steps S604_1 (S604_2) to S632_1 (S632_2) in FIG. 32. The stream input section TSR detects data error in the eleventh byte of the first packet data P, and then outputs the error signal E to the error flag setter 295. Since an arbitration period Ta is varied, the above period may be varied within a range determined by the pulses of Sps and Stf.

The error flag setter 295 latches the error signal E for generating and holding an latch error signal LE. Then, if the latch error signal LE and the transfer complete signal Stf are both HIGH when the transfer complete signal Stf is supplied, the error flag setter 295 generates the error flag signal Fe for writing "error flag ON" in the flag storage area Fc of the storage-completed BC No. memory 290ra.

On the other hand, if no error is detected in the incoming transport stream TS, the latch error signal LE is LOW when the transfer complete signal Stf is supplied. Therefore, the error flag setter 295 does not generate the error flag signal Fe for writing "error flag ON" in the flag storage area Fc of the storage-completed BC No. memory 290ra.

As such, even if any of an arbitrary number of simultaneously-supplied transport streams TS, it is possible to identify and manage whether there is data error by a unit of packet data P stored in the buffer cell Bcn of the packet buffer 270. Consequently by discarding or receiving again a data error portion contained in the incoming transport stream TS, information carried on the transport stream TS can be correctly acquired.

Furthermore, writing the error flag value in response to the transfer complete signal Stf is carried out in a case where the plurality of transport streams TS1 to TSε are simultaneously supplied, as in the third embodiment. Such writing in response to the transfer complete signal Stf is carried out for preventing the following possible problem. That is, due to difference in input rate among different transport streams TS, buffering of one packet data P that arrived later may be completed earlier than buffering of another packet data arrived earlier. In this case, even if data error is detected in the packet that arrived earlier, "error flag ON" may be wrongly written in the flag storage area Fc corresponding to the buffer cell Bc storing the packet data that had arrived later but has been buffered earlier. This possible problem can be prevented by carrying out writing in response to the transfer complete signal Stf.

Figure 33:
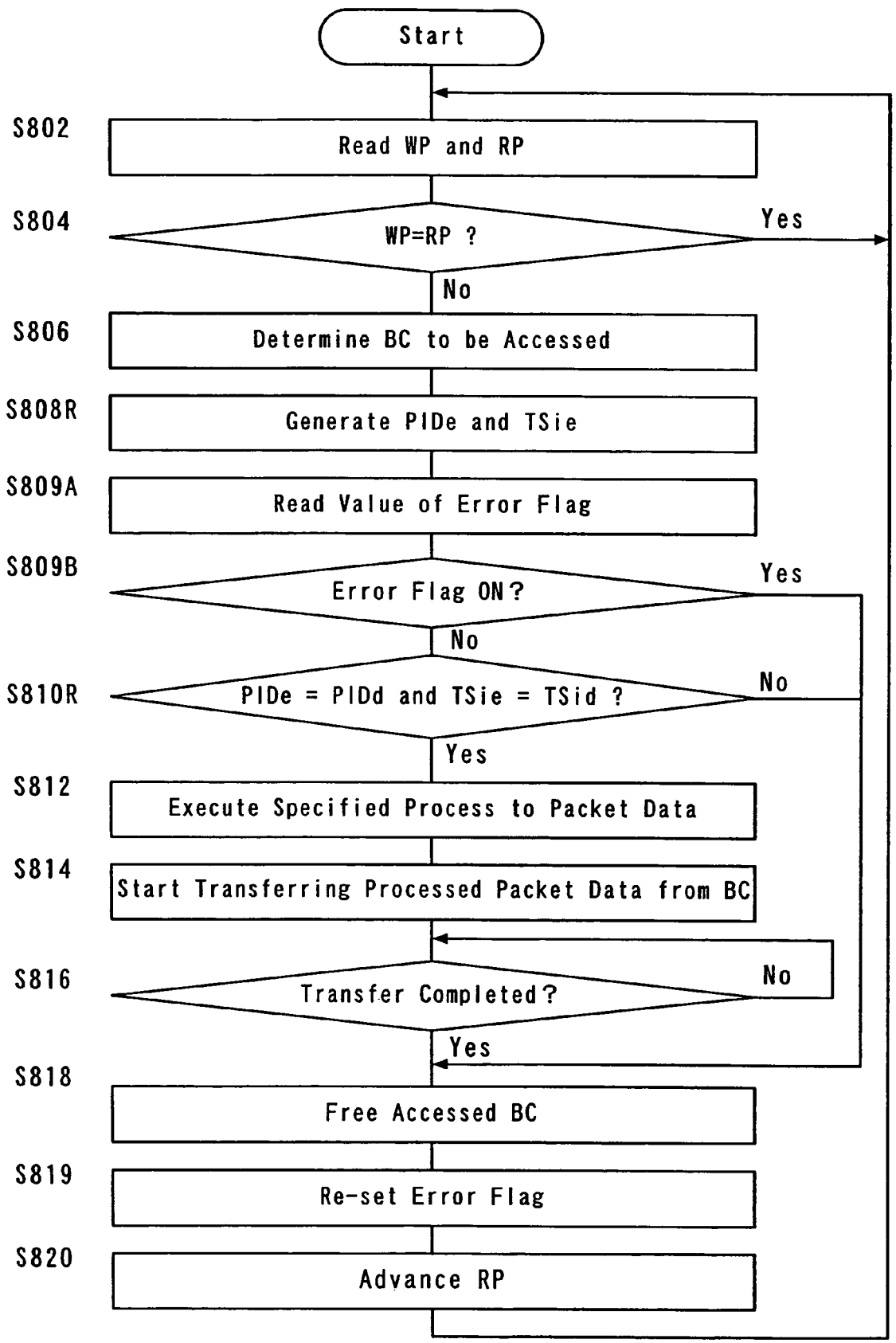
FIG. 33 is a subroutine for executing a process of requesting to the packet data P of the plural transport stream TS to TSϵ.

With reference to a flowchart FIG. 33, described in detail below is subroutine step #800RR for executing the requested process on the packet data P of the plurality of transport streams TS to TSε including data error. As illustrated in FIG. 22, the operation in step #800RR is similar to that in step #800R carried out by the transport stream decoder TD2 in FIG. 19. However, for the purpose of enabling control by the data buffering control apparatus DBA3 when any of plurality of transport streams TS1 to TSε has data error, the processes of the following three steps are provided as follows.

That is, between steps S808R and S810R, new step S809A is provided for reading the error flag value, and also new step S809B is provided for determining whether the error flag is ON. Furthermore, between steps S818 and S820, new step S819 is provided for resetting the error flag. Briefly described below is the operation of the entire step #800RR, mainly the operation unique to the third embodiment.

Through the above steps S802 to S808R, the management information IM is read from the buffer cell Bc determined as storing the packet data P to be processed (target packet data). Then, the buffer packet ID information PIDe and the transport stream ID information TSie of the stored packet data P. The procedure then goes to the next step S809A.

In step S809A, the error flag value is read from the flag storage area Fc indicated by the read pointer RP. The procedure then goes to the next step S809B.

In step S809B, based on the read error flag value, it is determined that the error flag is ON. If Yes, that is, if it is determined that the target packet data P contains error, the procedure skips the above steps S810R, S812, S814, and S816 to step S818, where the buffer cell Bc is freed for buffering the subsequent packet data P.

If No in step S809B, that is, if it is determined that the target packet data P does not contain error, the procedure goes through the above steps S810R, S812, S814, and S816 to step S818. In other words, if the target packet data P is actually to be processed (Yes in S810R), the process determined in step #400R is executed in step S812. Then, the processed packet data P is outputted from the data buffering apparatus DBA3 in step S816. Then, the relevant buffer cell Bc is freed in step S818. If the target packet data P is not to be processed (No in step S810R), the relevant buffer cell Bc is freed right away in step S818.

In step S819, the TD controller TDC3 sets the error flag value of the flag storage area Fc indicated by the read pointer RP as LOW, thereby resetting the error flag (setting the error flag OFF). Then, in step S820, the TD controller TDC3 advances the value indicated by the read pointer RP by one in the storage-completed BC No. memory 290. The procedure then returns the above described step S802.

As with the second embodiment, each packet data P contained the inputted plurality of transport streams TS1 to TSε is provided with the transport stream identifier TSi and the time stamp St, thereby enabling each packet data P to be surely identified with a combination of the packet identifier PID. With this, it is possible to selectively carry out the user-desired process on the plurality of programs contained in the sequentially inputted plurality of transport streams. However, if any transport stream TS has error, such problems may arise as that the processing after buffering the packet data P may fail, or the operation efficiency of the entire transport stream decoder TD may be reduced. Therefore, in the third embodiment, the buffer cell Bc that stores the packet data P having data error is managed and freed by software, thereby preventing the above problems.

Also in the third embodiment, it is evident that the transport stream decoder TD3 can be applied to the plurality of transport streams TS1 to TSε having the packet structure as stipulated in ISO/IEC 13818-1 (MPEG2 system).

As described above, a transport stream decoder is supplied with a plurality of transport streams each multiplexed with program contents of a plurality of channels and each composed of a plurality of types of packet data. In such transport stream decoder, according to the present invention, arbitrary packet data can be selectively extracted from an arbitrary transport stream. Consequently, it is possible to provide an interface capable of carrying out a user-desired process on a transport stream by a unit of packet data.

The invention claimed is:

1. A packet data processing determination apparatus used for a transport stream processing apparatus that carries out a predetermined process on an incoming transport stream composed of a plurality of sequential packet data each provided with identification information, the packet data processing determination apparatus for individually determining whether each packet data composing the transport stream is a subject of a previously specified process so that the transport stream processing apparatus can carry out the predetermined process by a unit of packet data, the packet data processing determination apparatus comprising:

identification information input means for inputting target packet data identification information for identifying a packet data to be processed;

packet data storage means for storing the packet data for a predetermined period of time in an order in which the packet data come;

stored packet data identifying means for reading the identification information provided to the packet data stored in the packet data storage means; and target packet data determining means for comparing the read identification information with the target packet data identification information and generating a process-target determination signal indicative of whether the stored packet data is the subject of the previously specified process.

2. The packet data processing determination apparatus according to claim 1, wherein when the process-target determination signal indicates that the stored packet data is not the subject of the previously specified process, the packet data storage means is freed for storing another packet data.

3. The packet data processing determination apparatus according to claim 2, further comprising specified-process-completed detecting means for detecting completion of the previously specified process carried out by the transport stream processing apparatus on the packet data stored in the packet data storage means, wherein after completion of the previously specified process is detected, the packet data storage means is freed for storing another packet data.

4. The packet data processing determination apparatus according to claim 3, wherein the packet data storage means comprises:
a plurality of buffer cells for storing the sequential packet data;
buffer cell allocating means for allocating one of the plurality of buffer cells for storing one of the sequential packet data;
buffer cell freeing means for freeing the buffer cell allocated by the buffer cell allocating means for storing another packet data; and
buffer cell allocation information storage means for storing buffer cell allocation information indicating states of allocation of the respective buffer cells, wherein the packet data allocating means determines, based on the buffer cell allocation information, which one of the plurality of buffer cells is allocated for storing subsequent packet data.

5. The packet data processing determination apparatus according to claim 4, wherein a storing buffer cell pointer is provided in the plurality of buffer cells for indicating the buffer cell that stores the packet data,
an access-target buffer cell pointer is provided in the plurality of buffer cells for indicating the buffer cell that stores the packet data from which the identification information is to be read by the stored packet data identifying means, and
the buffer cell allocating means does not allocate, for packet data storage, the buffer cell indicated by either one of the storing buffer cell pointer and the access-target buffer cell pointer.

6. The packet data processing determination apparatus according to claim 5, further comprising first access limiting means for limiting access to the buffer cell from the stored packet data identifying means based on the storing buffer cell pointer and the access-target buffer cell pointer.

7. The packet data processing determination apparatus according to claim 6, wherein the first access limiting means prohibits the stored packet data identifying means from accessing the buffer cell while the storing buffer cell pointer indicates the same buffer cell as the buffer cell indicated by the access-target buffer cell pointer.

8. The packet data processing determination apparatus according to claim 6, wherein the first access limiting means permits the stored packet data identifying means to access the buffer cell indicated by the access-target buffer cell pointer while the storing buffer cell pointer indicates a buffer cell different from the buffer cell indicated by the access-target buffer cell pointer.

9. The packet data processing determination apparatus according to claim 5, wherein when the process-target determination signal indicates that the packet data stored in the buffer cell is not the subject of the previously specified process, the buffer cell freeing means frees the buffer cell, and the access-target buffer cell pointer indicates a buffer cell different from the freed buffer cell.

10. The packet data processing determination apparatus according to claim 5, wherein after the specified-process-completed detecting means detects the completion of the previously specified process carried out by the transport stream processing apparatus on the packet data stored in the buffer cell, the buffer cell freeing means frees the buffer cell, and the access-target buffer cell pointer indicates a buffer cell different from the freed buffer cell.

11. The packet data processing determination apparatus according to claim 5, wherein the plurality of buffer cells are each provided with unique buffer cell identification information,
the buffer cell allocation information storage means comprises a buffer cell allocation information area for storing binary information indicating either one of a first value and a second value that are related to the buffer cell identification information, and
the buffer cell allocating means
allocates the buffer cell by writing the first value in the buffer cell allocation information area, and
frees the buffer cell by writing the second value in the buffer cell allocation information area.

12. The packet data processing determination apparatus according to claim 1, wherein each of the plurality of packet data composing the transport stream is provided with the identification information unique to a packet data group to which the packet data belongs based on ISO/IEC 13818-1, and
the target packet data identification information indicates the identification information of the packet data group.

13. The packet data processing determination apparatus according to claim 1, further comprising packet data management information generating means for generating management information uniquely identifying each of the plurality of packet data composing a plurality of the incoming transport stream, and providing the generated management information to the packet data, wherein based on the identification information and the management information, it is determined whether each of the plurality of packet data having the same identification information but composing different transport streams is the subject of the previously specified process.

14. The packet data processing determination apparatus according to claim 13, wherein the management information is stream identification information assigned to each of the incoming transport streams.

15. The packet data processing determination apparatus according to claim 13, wherein the management information further includes a time stamp indicating a time when the packet data is inputted.

16. The packet data processing determination apparatus according to claim 6, further comprising:
    data error detecting means for detecting data error contained in any of the incoming transport streams, and generating an error detection signals;
    error flag means for indicating, based on the error detection signal, the buffer cell that stores the packet data having the data error; and
    second access limiting means for limiting, based on the indication by the error flag means, access to the buffer cell by the stored packet data identifying means.

17. The packet data processing determination apparatus according to claim 16, wherein
    the second access limiting means prohibits the stored packet data identifying means from accessing to the buffer cell indicated by the access-target buffer cell pointer while the storing buffer cell pointer indicates a buffer cell different from the buffer cell indicated by the access-target buffer cell pointer and also by the error flag means, and the buffer cell freeing means frees the buffer cell.

18. A method of determining packet data processing used for a transport stream processing apparatus that carries out a predetermined process on an incoming transport stream composed of a plurality of sequential packet data each provided with identification information, the method for individually determining whether each packet data composing the transport stream is a subject of a previously specified process so that the transport stream processing apparatus can carry out predetermined process by a unit of packet data, the method comprising:
    a step of inputting target packet data identification information for identifying a packet data to be processed;
    a step of storing the packet data in packet data storage means for a predetermined period of time in an order in which the packet data come;
    a stored packet data identifying step of reading the identification information provided to the stored packet data; and
    a target packet data determining step of comparing the read identification information with the target packet data identification information, and generating a process-target determination signal indicative of whether the stored packet data is the subject of the previously specified process.

19. The packet data processing determination method according to claim 18, further comprising a first freeing step of freeing the packet data storage means that stores the packet data indicated by the process-target determination signal as not the subject of the previously specified process.

20. The packet data processing determination method according to claim 19, further comprising:
    a completion detecting step of detecting that completion of the previously specified process carried out by the transport stream processing apparatus on the packet data stored in the packet data storage means; and
    a second freeing step of freeing, after completion of the previously specified process is detected, the packet data storage means for storing another packet data.

21. The packet data processing determination method according to claim 20, wherein
    the packet data storage means comprises a plurality of buffer cells for storing the sequential packet data, and the method further comprises:
    a step of storing buffer cell allocation information indicating states of allocation of the respective buffer cells;
    a buffer cell allocating step of determining, based on the buffer cell allocation information, which one of the plurality of buffer cells is allocated for storing subsequent packet data; and
    a buffer cell freeing step of freeing the allocated buffer cell for storing another packet data.

22. The packet data processing determination method according to claim 21, wherein
    a storing buffer cell pointer is provided in the plurality of buffer cells for indicating the buffer cell that stores the packet data,
    an access-target buffer cell pointer is provided in the plurality of buffer cells for indicating the buffer cell that stores the packet data from which the identification information is to be read in the stored packet data identifying step, and
    in the buffer cell allocating step the buffer cell indicated by either one of the storing buffer cell pointer and the access-target buffer cell pointer is not allocated for packet data storage.

23. The packet data processing determination method according to claim 21, further comprising a first access limiting step of limiting execution of the stored packet data identifying step based on the indications by the storing buffer cell pointer and the access-target buffer cell pointer.

24. The packet data processing determination method according to claim 23, wherein
    the first access limiting step prohibits the stored packet data identifying step from being executed while the storing buffer cell pointer indicates the same buffer cell as the buffer cell indicated by the access-target buffer cell pointer.

25. The packet data processing determination method according to claim 23, wherein
    the first access limiting step permits the stored packet data identifying step to be executed while the storing buffer cell pointer indicates a buffer cell different from the buffer cell indicated by the access-target buffer cell pointer.

26. The packet data processing determination method according to claim 22, further comprising a first access-target buffer cell pointer controlling step of causing the access-target buffer cell pointer to indicate a buffer cell different from the freed buffer cell when the process-target determination signal indicates that the packet data stored in the buffer cell is not the subject of the previously defined process.

27. The packet data processing determination method according to claim 22, further comprising a second access-target buffer cell pointer controlling step of, after the completion of the previously specified process is detected in the completion detecting step and after the buffer cell is freed in the buffer cell freeing step, causing the access-target buffer cell pointer to indicate a buffer cell different from the freed buffer cell.

28. The packet data processing determination method according to claim 22, wherein
    the plurality of buffer cells are each provided with unique buffer cell identification information, and
    the method further comprises a buffer cell allocation information storing step of storing binary information indicating either one of a first value and a second value that are related to the buffer cell identification information, and when the first value is stored, the corresponding buffer cell is allocated, and when the second value is stored, the corresponding buffer cell is freed.

29. The packet data processing determination method according to claim 18, further comprising a step of generating management information uniquely identifying each of the plurality of packet data composing a plurality of the incoming transport streams, and providing the generated management information to the packet data, wherein based on the identification information and the management information, it is determined whether each of the plurality of packet data having the same identification information but composing different transport streams is the subject of the previously specified process.

30. The packet data processing determination method according to claim 29, further comprising:

a step of detecting data error contained in the incoming transport stream, and generating an error detection signal;

a data error buffer cell indicating step of indicating, based on the error detection signal, the buffer cell that stores the packet data having the data error; and a second access limiting step of limiting execution of the stored packet data identifying step on the buffer cell indicated in the data error buffer cell indicating step.

* * * * *